(12) United States Patent
Fukuda et al.

(10) Patent No.: US 11,443,583 B2
(45) Date of Patent: Sep. 13, 2022

(54) AUTOMATIC VENDING MACHINE

(71) Applicants: FUJI ELECTRIC CO., LTD., Kawasaki (JP); THE COCA-COLA COMPANY, Atlanta, GA (US)

(72) Inventors: Katsuhiko Fukuda, Yokkaichi (JP); Tsutomu Iwako, Yokkaichi (JP); Yasuo Nakazato, Koshigaya (JP); Yasuhiro Yamazaki, Kumagaya (JP); Takashi Nishiyama, Tokyo (JP)

(73) Assignees: FUJI ELECTRIC CO., LTD., Kawasaki (JP); THE COCA-COLA COMPANY, Atlanta, GA (US)

( * ) Notice: Subject to any disclaimer, the term of this patent is extended or adjusted under 35 U.S.C. 154(b) by 171 days.

(21) Appl. No.: 16/888,934

(22) Filed: Jun. 1, 2020

(65) Prior Publication Data
US 2020/0302730 A1 Sep. 24, 2020

Related U.S. Application Data

(63) Continuation of application No. PCT/JP2018/041992, filed on Nov. 13, 2018.

(30) Foreign Application Priority Data

Dec. 7, 2017 (JP) .............................. JP2017-235070
Apr. 17, 2018 (JP) .............................. JP2018-079051

(51) Int. Cl.
*G07F 11/28* (2006.01)
*G06Q 20/18* (2012.01)

(52) U.S. Cl.
CPC ............. *G07F 11/28* (2013.01); *G06Q 20/18* (2013.01)

(58) Field of Classification Search
None
See application file for complete search history.

(56) References Cited

U.S. PATENT DOCUMENTS 6,230,930 B1 * 5/2001 Sorensen ................ G07F 11/42
 221/131
6,283,324 B1 * 9/2001 Jenkins .................... B65G 1/08
 221/192

(Continued)

FOREIGN PATENT DOCUMENTS

JP H11-283098 A 10/1999
JP H11-328522 A 11/1999

(Continued)

OTHER PUBLICATIONS

PCT/ISA/210 of PCT/JP2018/041992, dated Feb. 19, 2019.

*Primary Examiner* — Gene O Crawford
*Assistant Examiner* — Ayodeji T Ojofeitimi
(74) *Attorney, Agent, or Firm* — Manabu Kanesaka

(57) ABSTRACT

An automatic vending machine includes: a product housing rack including product housing shelves each including a product housing path, and a product discharger; a first stopper configured to be movable between a protrusion position and a retract position, and to tilt such that a free end side of a holding portion is positioned at a product discharge port; a second stopper configured to be movable between a retract position and a protrusion position, and to press a vending product when protruding; a link configured to move each of the first and the second stopper to the protrusion and the retract position; and a driver configured to drive the link, wherein the second stopper includes ribs formed on a surface facing the product housing path, the ribs being configured to extend from a base end part toward a holding portion of the second stopper.

4 Claims, 40 Drawing Sheets

(56) References Cited

U.S. PATENT DOCUMENTS

| | | | | |
|---|---|---|---|---|
| 8,757,433 B2* | 6/2014 | Machers | ............... | G07F 11/20 |
| | | | | 221/92 |
| 2007/0084875 A1* | 4/2007 | Percy | ................. | G07F 11/42 |
| | | | | 221/258 |
| 2007/0084877 A1* | 4/2007 | Albert | ................. | G07F 11/16 |
| | | | | 221/289 |
| 2011/0147402 A1* | 6/2011 | Valota | ................. | G07F 11/42 |
| | | | | 221/1 |

FOREIGN PATENT DOCUMENTS

| | | |
|---|---|---|
| JP | 2005-032077 A | 2/2005 |
| JP | 2012-118901 A | 6/2012 |
| JP | 2012-118902 A | 6/2012 |

\* cited by examiner

AUTOMATIC VENDING MACHINE

CROSS-REFERENCE TO RELATED APPLICATION(S)

This application is a continuation of International Application No. PCT/JP2018/041992, filed on Nov. 13, 2018, which claims the benefit of priority of the prior Japanese Patent Application No. 2017-235070, filed on Dec. 7, 2017, and the prior Japanese Patent Application No. 2018-079051, filed on Apr. 17, 2018, the entire contents of which are incorporated herein by reference.

BACKGROUND

The present disclosure relates to an automatic vending machine.

An automatic vending machine includes a product housing rack. (also referred to as a slant rack) including product housing shelves disposed at a plurality of rungs in the up-down direction and each including a product housing path (also referred to as a product column) housing a plurality of products arrayed in the sideways posture in line in the front-and-rear direction in a body cabinet. Each product housing shelf disposed in the product housing rack is tilted at a predetermined slope so that a product discharge port of the product housing path is lower. A partition member extending in the front-and-rear direction and partitioning an upper surface of the product housing shelf in a width direction (right-left direction) to define the product housing path is installed on the product housing shelf. A product discharge device configured to separate and discharge each product housed in the sideways posture in the product housing path is provided at the product discharge port of each product housing path partitioned by the partition member (for example, Japanese Patent Application Laid-open No. 2012-118902).

The product discharge device disclosed in Japanese Patent Application Laid-open No. 2012-118902 is disposed above the product housing path and includes: a first stopper member capable of freely appearing in the product housing path and provided to be movable between a protrusion position where the first stopper member protrudes in the product housing path to hold a product of the first vending order (product at the rearmost end; also referred to as a vending product) and a retracted position where the first stopper member is retracted from the product housing path to release holding of the vending product; a second stopper member capable of freely appearing in the product housing path and provided to be movable between a retracted position where the second stopper member is retracted from the product housing path and a protrusion position where the second stopper member protrudes in the product housing path to hold a product of the second vending order (product following the product at the rearmost end; also referred to as a next vending product) following the vending product; a link mechanism configured to move each of the first stopper member and the second stopper member to the protrusion position and the retracted position; and a drive device (solenoid or motor) configured to drive the link mechanism, and at vending standby, the first stopper member is caused to protrude in the product housing path to hold the vending product while the second stopper member is retracted from the product housing path, and the drive device is driven based on a vending command to cause the second stopper member to protrude in the product housing path through the link mechanism to hold the next vending product and simultaneously cause the first stopper member to retract from the product housing path to deliver the vending product.

Each product housing shelf disposed in the product housing rack in the slant rack disclosed in Japanese Patent Application Laid-open No. 2012-118902 is tilted at a predetermined slope so that the product discharge port of the product housing path is lower. The tilt angle of the product housing shelf is typically determined to be relatively small since the number of product housing shelves disposed in the product housing rack having a defined height dimension decreases as the tilt angle increases. When the tilt angle of the product housing shelf is small, the vending product held in a stationary state by the first stopper member of the product discharge device disposed near the product discharge port of the product housing shelf and above the product housing path takes a longer time to start rolling toward a discharge path when the held state is canceled by the first stopper member retracted from the product housing path at product vending. In such a case, simultaneously with the retraction of the first stopper member from the product housing path, the second stopper member protruding in the product housing path presses the vending product to promote rolling of the vending product, which contributes to discharge of the vending product. In this case, friction resistance when the second stopper member contacts the vending product is preferably small because the vending product potentially cannot move being sandwiched between the second stopper member and the product housing shelf when the friction resistance is large. However, a site at which the second stopper member in the conventional product discharge device contacts the vending product is formed as a flat surface, and thus contact with the vending product is made along a line in the longitudinal direction of the vending product, which ads to larger contact area. Particularly in a case where a product container is made of thin plastic, the container deforms when the second stopper member contacts the vending product and the contact area (friction resistance) increases. As the area of contact between the second stopper member and the vending product increases in this manner, the vending product is more likely to be unable to move being sandwiched between the second stopper member and the product housing shelf, and as a result, stable product discharge operation cannot be performed and vending needs to be stopped.

When the product discharge device is disposed near the product discharge port of the product housing shelf and above the product housing path, the following problem occurs. Specifically, when a first stopper member 52 protrudes in a product housing path 43 from above the product housing path 43 as illustrated in a comparative example at the lower part of FIG. 32, the total length of the product housing path 43 can be effectively used to increase the number of products housed in the product housing path 43 by having such a tilt that a leading end side (free end side) of a holding portion 521 holding a product is positioned at a product discharge port 45 relative to a base end side (rotational pivot side) of a holding portion 521 of the first stopper member 52. Accordingly, a product (also referred to as a small-diameter product) having such a size that the product is separated from the base end side (rotational pivot side) of the holding portion 521 of the first stopper member 52 contacts closer to a free end separated from the base end part side of the holding portion 521 of the first stopper member 52 protruding in the product housing path 43, and thus the vending product can be positioned close to the product discharge port 45, thereby increasing the number of products housed in the product housing path 43. However, when the standby position of the vending product is simply moved closer to the product discharge port side, the position of a product (next vending product) of the second vending order following the vending product moves to the product discharge port side together with the standby position of the vending product, and thus protrusion of a second stopper member 53 temporarily holding the product (next vending product) of the second vending order in the product housing path 43 is delayed at vending of a small-diameter product, in particular, which causes delivery of a plurality of products.

However, a product (also referred to as a large-diameter product) having such a size that the product is near the base end side of the first stopper member 52 contacts closer to the base end of the holding portion of the first stopper member 52 protruding in the product housing path 43, and thus cannot be moved closer to the product discharge port 45 side, but is positioned on a product insertion port 44 side instead. Accordingly, the number of large-diameter products housed in the product housing path 43 decreases. When a "space" sufficient to place but slightly insufficient to house a product on the product insertion port side in the product housing path 43 is available, a product is often placed in the space to increase the number of housed products as much as possible. In this case, a product at the end of line (product on the product insertion port side) protrudes on the front side out of the product insertion port and interferes with a heat-insulating inner door that blocks a product storage. The product at the end of line can be removed when the interference with the product is noticed at closing of the heat-insulating inner door, but when the heat-insulating inner door is closed while the interference with the product is unnoticed, an unexpected situation may occur in which excessive force acts on the first stopper member 52, thereby damaging the first stopper member 52 or other components.

There is a need for an automatic vending machine capable of performing stable product discharge operation. Moreover, there is a need for an automatic vending machine capable of increasing the number of products housed in a product housing path.

SUMMARY

In some embodiments, an automatic vending machine includes: a product housing rack including: product housing shelves tilted such that a product discharge port is lower than a product insertion port, the product housing shelves being disposed at multiple rungs in a vertical direction and each including a product housing path defined to house products arrayed in a sideways posture in line in a front-and-rear direction; and a product discharger provided near the product discharge port of each product housing shelf and at an upper side of the product housing path, the product discharger being configured to separate and discharge each product housed in the product housing path; a first stopper that is able to appear in each product housing path from the upper side of the product housing path, the first stopper being configured: to be movable between a protrusion position where the first stopper protrudes in the product housing path to hold a product of the first vending order, that is a vending product, and a retract position where the first stopper is retracted from the product housing path to release holding of the vending product; and to tilt such that a free end side of a holding portion of the first stopper, the holding portion of the first stopper being configured to hold the product, is positioned at the product discharge port relative to rotational pivot side when protruding in the product housing path; a second stopper that is able to appear in each product housing path from the upper side of the product housing path, the second stopper being configured: to be movable between a retract position where the second stopper is retracted from the product housing path and a protrusion position where the second stopper protrudes in the product housing path to hold a product of the second vending order, that is a next vending product, following the vending product; and to press the vending product when protruding in the product housing path; a link configured to move each of the first stopper and the second stopper to the protrusion position and the retract position; and a driver configured to drive the link, wherein the second stopper includes ribs formed on a surface facing the product housing path, the ribs being configured to extend from a base end part toward a holding portion of the second stopper.

In some embodiments, an automatic vending machine includes: a product housing rack including: product housing shelves tilted such that a product discharge port is lower than a product insertion port, the product housing shelves being disposed at multiple rungs in a vertical direction and each including a product housing path defined to house products arrayed in a sideways posture in line in a front-and-rear direction; and a product discharger provided near the product discharge port of each product housing shelf and at an upper side of the product housing path, the product discharger being configured to separate and discharge each product housed in the product housing path; a first stopper that is able to appear in each product housing path from the upper side of the product housing path, the first stopper being configured: to be movable between a protrusion position where the first stopper protrudes in the product housing path to hold a product of the first vending order, that is a vending product, and a retract position where the first stopper is retracted from the product housing path to release holding of the vending product; and to tilt such that a free end side of a holding portion of the first stopper, the holding portion of the first stopper being configured to hold the product, is positioned at the product discharge port relative to rotational pivot side when protruding in the product housing path; a second stopper that is able to appear in each product housing path from the upper side of the product housing path, the second stopper being configured: to be movable between a retract position where the second stopper is retracted from the product housing path and a protrusion position where the second stopper protrudes in the product housing path to hold a product of the second vending order, that is a next vending product, following the vending product; and to press the vending product when protruding in the product housing path; a link configured to move each of the first stopper and the second stopper to the protrusion position and the retract position; and a driver configured to drive the link, wherein the first stopper includes: a bearing into which a rotation shaft as the rotational pivot is inserted; the holding portion configured to hold the product; and a product receiving portion formed to have a longitudinal section in a concave shape that is recessed to a rear side of a line connecting a base end and a leading end of the holding portion.

In some embodiments, an automatic vending machine includes: a product housing rack including: product housing shelves tilted such that a product discharge port is lower than a product insertion port, the product housing shelves being disposed at multiple rungs in a vertical direction and each including a product housing path defined to house products arrayed in a sideways posture in line in a front-and-rear direction; and a product discharger provided near the product discharge port of each product housing shelf and at an upper side of the product housing path, the product discharger being configured to separate and discharge each product housed in the product housing path; a first stopper that is able to appear in each product housing path from the upper side of the product housing path, the first stopper being configured: to be movable between a protrusion position where the first stopper protrudes in the product housing path to hold a product of the first vending order, that is a vending product, and a retract position where the first stopper is retracted from the product housing path to release holding of the vending product; and to tilt such that a free end side of a holding portion of the first stopper, the holding portion of the first stopper being configured to hold the product, is positioned at the product discharge port relative to rotational pivot side when protruding in the product housing path; a second stopper that is able to appear in each product housing path from the upper side of the product housing path, the second stopper being configured: to be movable between a retract position where the second stopper is retracted from the product housing path and a protrusion position where the second stopper protrudes in the product housing path to hold a product of the second vending order, that is a next vending product, following the vending product; and to press the vending product when protruding in the product housing path; a link configured to move each of the first stopper and the second stopper to the protrusion position and the retract position; and a driver configured to drive the link, wherein a holding portion of the second stopper is formed as a convex portion in a substantially trapezoid shape including a flat part facing the product housing path.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 4A is a perspective view of a state in which the product housing rack is removed from the guide; and FIG. 4B is a perspective view of a state in which the product housing rack is suspended from the guide;

FIG. 6A is an exploded diagram thereof; FIG. 6B is an assembly diagram of FIG. 6A; FIG. 6C is an enlarged view of Part A in FIG. 6A; and FIG. 6D is an enlarged view of Part B of FIG. 6A;

FIG. 7A is a perspective view when viewed obliquely to the right from the upper side; and FIG. 7B is a back surface perspective view of FIG. 7A;

FIG. 9A is an exploded diagram thereof; and FIG. 9B is an assembly diagram of FIG. 9A;

FIG. 10A is an upper surface perspective view; and FIG. 10B is a back surface perspective view of FIG. 10A;

FIG. 11A is a perspective view when viewed obliquely to the right from the upper side on a rear side; and FIG. 11B is an exploded perspective view of FIG. 11A;

FIG. 23A is a perspective view when viewed obliquely to the right from the upper side; and FIG. 23B is a perspective view of FIG. 23A when viewed from the back surface;

FIG. 24A is an exploded diagram of a state in which a bearing member is disassembled from the mechanism unit holder; and FIG. 24B is a side view of the bearing member;

FIG. 26A is a perspective view when viewed from above; and FIG. 26B is a perspective view of FIG. 26A when viewed from the back surface;

FIG. 27A is a perspective view illustrating a linking state of a link member and a guide; and FIG. 27B is a perspective view of a state in which the link in FIG. 27A is canceled;

FIGS. 28A, 28B and 280 illustrate a wiring guide: FIG. 28A is a perspective view when viewed from above; F. M. 28B is a perspective view of FIG. 28A when viewed from the back surface.

FIG. 30A is a main-part plan view at vending standby; and FIG. 30B is a main-part plan view at vending;

FIG. 39A is a cross-sectional view of the second stopper member of a first embodiment when viewed from a side surface; FIG. 39B is a cross-sectional view of the second stopper member of a second embodiment when viewed from the side surface; and FIG. 39C is a perspective view of the second stopper member of the second embodiment when viewed from the back surface;

FIG. 42A is an operation state diagram in the process of starting product discharge in the first embodiment; and FIG. 42B illustrates an operation state diagram in the process of starting product discharge in the second embodiment, FIGS. 42A and 42B further include vector diagrams of delivery force on a vending product.

DETAILED DESCRIPTION

The following describes a product discharge device of an automatic vending machine according to each embodiment of the present disclosure in detail with reference to the accompanying drawings.

First Embodiment

Figure 1:
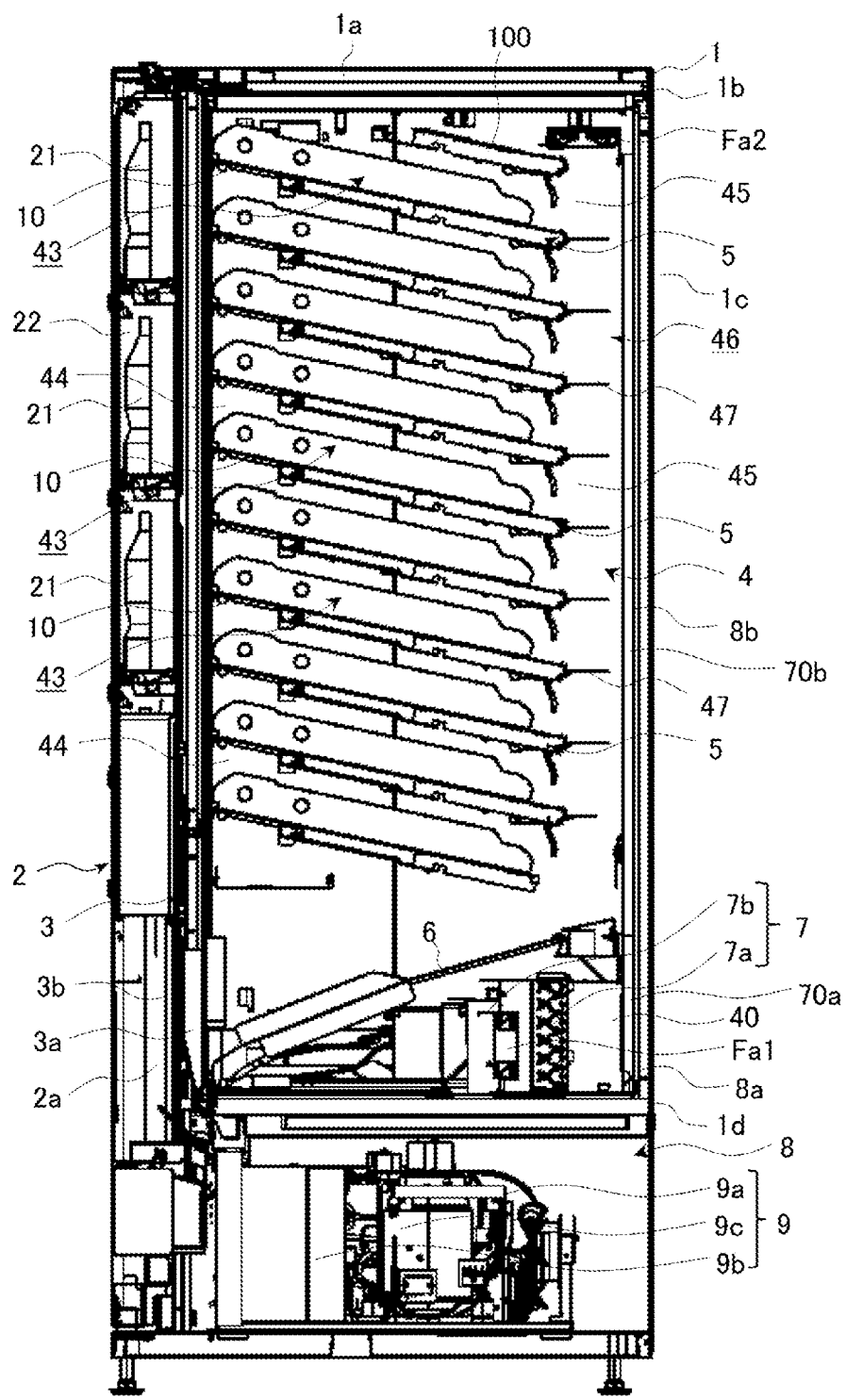
FIG. 1 is a schematic side view of an automatic vending machine as a target of the present disclosure.
Figure 2:
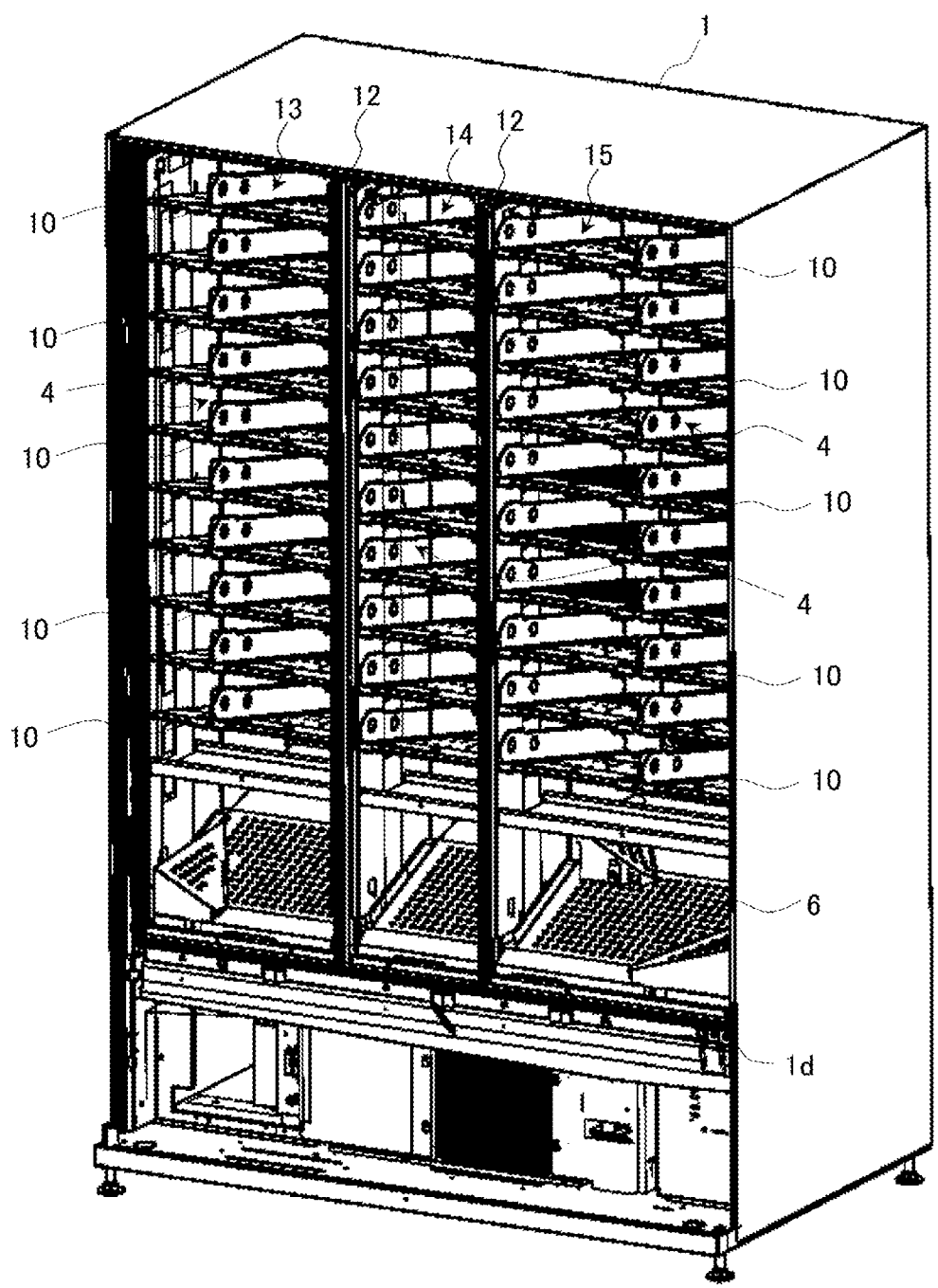
FIG. 2 is a perspective view of a state in which an outer door is removed from the automatic vending machine in FIG. 1 when viewed obliquely to the right from above.

FIG. 1 is a schematic side view of an automatic vending machine configured to vend canned drinks and plastic bottle drinks as an exemplary automatic vending machine as a target of the present disclosure, and FIG. 2 is a perspective view of a state in which an outer door is removed from the automatic vending machine in FIG. 1 when viewed obliquely to the right from the upper side. The right and left sides are the right and left sides when the automatic vending machine is viewed from a front surface side.

As illustrated in FIG. 1, the automatic vending machine includes a body cabinet 1 formed as a heat-insulating housing having an opened front surface, and an outer door 2 supported to the front surface of the body cabinet 1 to block the front surface opening of the body cabinet 1, and the outer door 2 is provided with a product take-out port 2a. The body cabinet 1 is produced as a heat-insulating housing in which heat-insulating panels made of urethane foam are disposed inside of a steel plate outer box, in other words, on a top wall 1a, right and left sidewalls 1b, a back wall 1c, and a bottom wall 1d, a space surrounded by the heat-insulating panels disposed on the top wall 1a, the right and left sidewalls 1b, the back wall 1c, and the bottom wall 1d is formed as a product storage, and a lower part of the product storage is formed as a machine room 8. The inside of the product storage surrounded by the heat-insulating panels in the body cabinet 1 is partitioned into three product housing rooms 13, 14, and 15 in the right-left direction by heat-insulating partition walls 12, 12 (refer to FIG. 2). A product housing rack 4 including product housing shelves 10 disposed at multiple rungs in the up-down direction is housed and installed in each of the product housing rooms 13, 14, and 15. A front surface of the product storage in the body cabinet 1 is blocked by a heat-insulating inner door 3 supported to the body cabinet 1 by a hinge mechanism, and the heat-insulating inner door 3 is provided with an inner-door discharge port 3a including a take-out port flapper 3b that is pressed and opened by a product being sent out of the product storage. The take-out port flapper 3b suspends with its upper end pivotally supported, blocks the inner-door discharge port 3a by its own weight to prevent outflow of cool air or warm air, and is pressed and opened by a product being discharged through a product discharge shoot. 6 so that the product is sent to the product take-out port 2a of the outer door 2.

The product housing rack 4 includes a pair of right and left rack side plates 41, 41 each made of a thin steel plate having a rectangular flat plate shape, and the product housing shelves 10 are installed across the pair of right and left rack side plates 41, 41. The product housing shelves 10 are installed across the right and left rack side plates 41, 41 at multiple rungs (10 rungs in the present embodiment) in the up-down direction and each tilted at a predetermined slope so that its front side as a product insertion port 44 is higher and its rear side as a product discharge port 45 is lower. A mock lock member 100 is installed across the pair of right and left rack side plates 41, 41 above the uppermost product housing shelf 10. Upper ends of the right and left rack side plates 41, 41 can be engaged with and removed from a pair of right and left guide clasps 16, 16 (refer to FIGS. 3 and 4 as well) laid on a ceiling surface of the product storage, and the right and left rack side plates 41, 41 are engaged with the guide clasps 16, 16 laid on the ceiling of the product storage when the product housing rack 4 is housed in the product storage. Each of the pair of right and left guide clasps 16, 16 is made of a thick steel plate, includes a horizontal surface 16a and a vertical surface 16b, and is laid on the ceiling surface of the product storage when a front side part of the horizontal surface 16a and a rear side part of the vertical surface 16b are locked and fixed to reinforcement members (not illustrated) extending in the right-left direction and disposed at front and back parts of a ceiling surface of the body cabinet 1. Lower ends of the vertical surfaces of the pair of right and left guide clasps 16, 16 are provided with rail parts 16c each bent in a hook shape in the facing direction so that the right and left rack side plates 41, 41 are engaged with the rail parts 16c. A lock piece 16d (refer to FIGS. 4A and 4B) is formed at a front end of the left guide clasp 16 among the right and left guide clasps 16, 16 and is provided with a screw hole.

Figure 3:
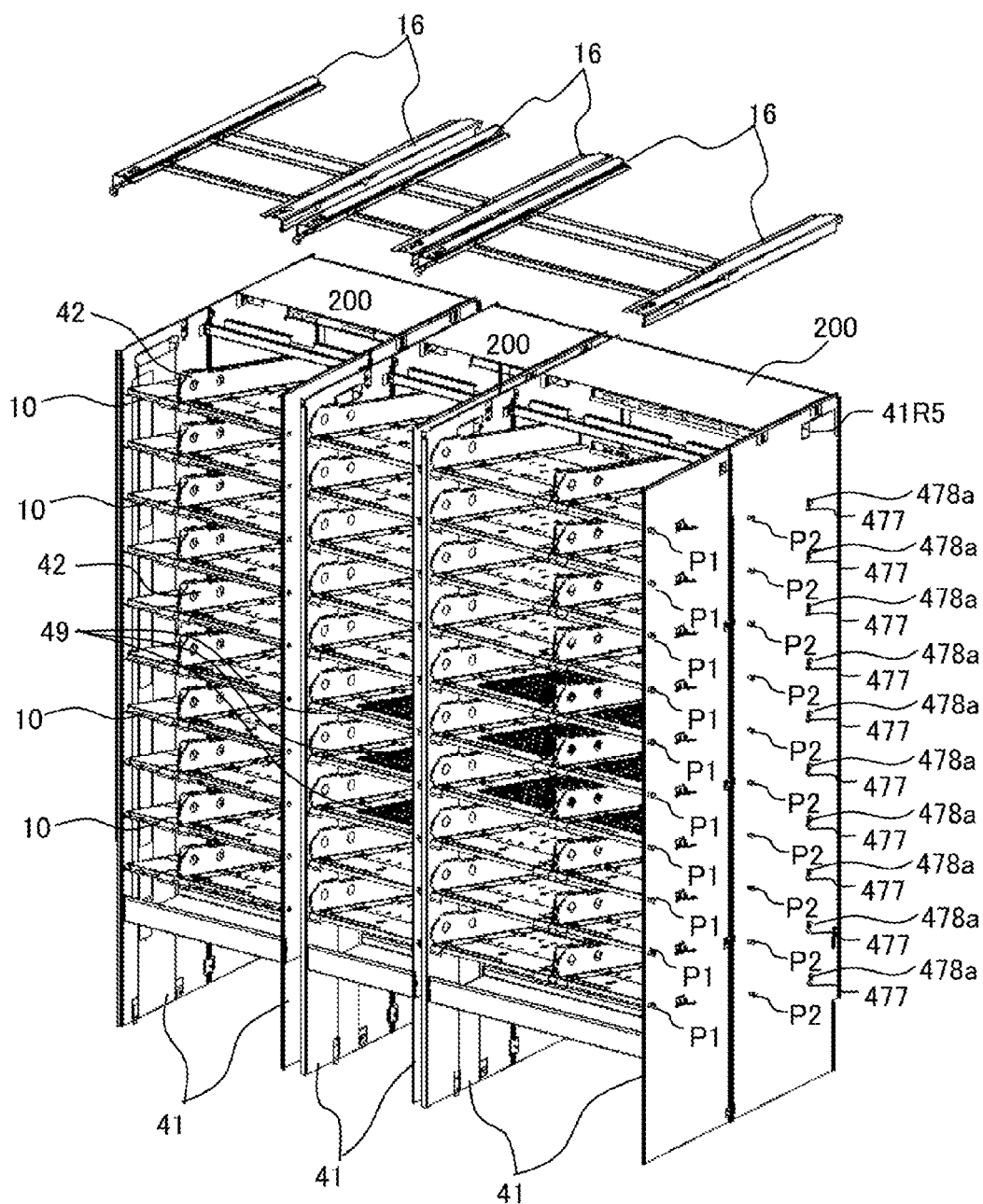
FIG. 3 is a perspective view of a product housing rack and a guide in FIG. 1 when viewed obliquely to the right from above.

As illustrated in FIG. 3, a plurality of partition members 42 are mounted on the product housing shelves 10. The partition members 42 define product housing paths 43 (product columns) that each house a plurality of products arrayed in the sideways posture in line in the front-and-rear direction. A product discharge device 5 disposed near the product discharge port 45 in the product housing path 43 defined in each product housing shelf 10 and above the product housing path 43, in the present embodiment, on a lower surface side of the product housing shelf 10 on the upper rung side and configured to separate and discharge each product housed in the product housing path 43 is directly attached to a back surface of the product housing shelf 10. In addition, an attachment (not illustrated) for adjusting the interval between the product discharge device 5 and a path surface of the product housing path 43 is laid on the product housing shelf 10 as necessary. The meck lock member 100 is installed across the pair of right and left rack side plates 41, 41 above the uppermost product housing path 43 to attach the product discharge device 5 configured to separate each product housed in the uppermost product housing path 43.

An internal upper fan Fa2 is deployed above a rear end of the meck lock member 100. A space above the rear end of the meck lock member 100 is a dead space when the meck lock member 100 is tilted at a predetermined slope so that its rear side is lower than its front side, and this dead space is used to deploy the internal upper fan Fa2. The internal upper fan Fa2 sends downward internal air moving up through an upper duct member 70b and is installed across the pair of right and left rack side plates 41, 41. In addition, a shield member 200 is provided above the internal upper fan Fa2 with an interval therebetween. The shield member 200 is installed across the pair of right and left rack side plates 41, 41 as well. The shield member 200 is disposed so that its rear side part faces an upper end opening of the upper duct member 70b, thereby preventing internal air moving up through the upper duct member 70b from directly contacting the top wall 1a of the body cabinet 1. Since the shield member 200 is provided, internal air (cool air) moving up through the upper duct member 70b can be prevented from directly contacting the top wall 1a of the body cabinet 1 to cause dew condensation on the inside (the top wall 1a) due to temperature difference between the inside and the outside, particularly when products are cooled.

Rear ends (product discharge ports 45) of the product housing shelves 10 disposed at multiple rungs in each product housing rack 4 are positioned on an identical vertical line, and the space between each product discharge port 45 and the upper duct member 70b is formed as a product fall path 46 through which a product falls. Each product fall path 46 is provided with a posture control plate 47 having a rotation center near a rear side part of each product housing shelf 10 and is configured to rotate between a protrusion position where the posture control plate 47 protrudes in the product fall path 46 and a retract position where the posture control plate 47 is pressed and opened by a falling product and retracted from the product fall path 46.

The posture control plate 47 is pressed by a coil spring 470 (refer to FIGS. 11A and 11F) to protrude toward the product fall path 46, and has a function to correct the posture of a product falling through the product fall path 46 to the sideways posture and to reduce the fall speed of the product by absorbing the fall energy thereof when pressed and opened by the product and being retracted from the product fall path 46. The posture control plate 47 is installed across the pair of right and left rack side plates 41, 41, in addition, a rack fixation clasp 49 is firmly fixed to front-end lower parts of the pair of right and left rack side plates 41, 41. The rack fixation clasp 49 is screwed to a body-side rack fixation clasp (not illustrated) bridged across the front surface opening of the body cabinet 1 after the product housing rack 4 is housed in the product storage, and stops swinging of the product housing rack 4 in cooperation with the body-side rack fixation clasp.

The product discharge shoot 6 that is tilted in a forward and downward posture to link a lower region of the product fall path 46 and the inner-door discharge port 3a provided to the heat-insulating inner door 3 and has a plate surface through which a plurality of vent holes are perforated, and a cooling-heating unit 7 configured to cool or heat each product housed in the product housing rack 4 to store the product in a cold or hot state are disposed at a lower part of the product housing rack 4, and the product housing rack 4, the product discharge shoot 6, and the cooling-heating unit 7 are deployed in the stated order from the top in the product storage.

The cooling-heating unit 7 is disposed in a space behind the product discharge shoot 6, that is tilted in a forward and downward posture. The cooling-heating unit 7 includes an evaporator 7a, a heater 7b, and an internal lower fan Fa1, and the evaporator 7a, the heater 7b, and the internal lower fan Fa1 are arranged side by side in the front-and-rear direction in the order of the heater 7b, the internal lower fan Fa1, the evaporator 7a from the front side. The rotation speed of the internal lower fan Fa1 can be changed through voltage control and PWM control of a fan drive motor. The evaporator 7a, the internal lower fan Fa1, and the heater 7b are each disposed in a wind tunnel surrounding and protecting the device, and a wind tunnel 40 for a spacer is provided continuously with the wind tunnel for the heater 7b. The wind tunnels of the evaporator 7a, the internal lower fan Fa1, and the heater 7b, and the wind tunnel 40 are continuous in a tunnel shape as a whole, and in the following description, the wind tunnel 40 represents the wind tunnels of the evaporator 7a, the internal lower fan Fa1, the heater 7b, in other words, is referred to as the wind tunnel 40 of the cooling-heating unit 7. A lower duct member 70a is provided continuously with the wind tunnel 40 of the cooling-heating unit 7. The lower duct member 70a is disposed along a product storage back surface (the back wall 1c of the body cabinet 1) and includes an entrance side opening 74 (refer to FIG. 16) facing the exit of the wind tunnel 40, and an exit side opening 78 (refer to FIG. 16) that communicates with the lower region of the product fall path 46. The upper duct member 70b communicates with the exit side opening 78 of the lower duct member 70a.

In addition, a refrigerator condensing unit 9 that forms a refrigeration cycle together with the evaporator 7a of the cooling-heating unit 7 is disposed in the machine room 8 at a lower part of the body cabinet 1. The refrigerator condensing unit 9 includes a compressor 9a, a condenser 9b, an outside fan 9c, and an expansion valve (not illustrated), and the condenser 9b disposed outside the product storage and the evaporator 7a disposed inside the product storage are connected with each other through a refrigerant pipe via the expansion valve.

In addition to a product display room 22 in which a plurality of product samples 21 corresponding to the product columns are displayed, components (not illustrated) necessary for product automatic vending upon money insertion, such as a product selection button for specifying a product to be purchased, a coin insertion port through which a coin as a price is input, a bill insertion port through which a bill as a price is inserted, a coin refund port for taking out a coin in change or a coin refunded in response to a refund command, a refund lever for instructing change or refund of an inserted coin are disposed at a front surface of the outer door 2, and in addition, for example, a handle of a door lock mechanism configured to close and lock the outer door 2 to the body cabinet 1 is provided.

Figure 5:
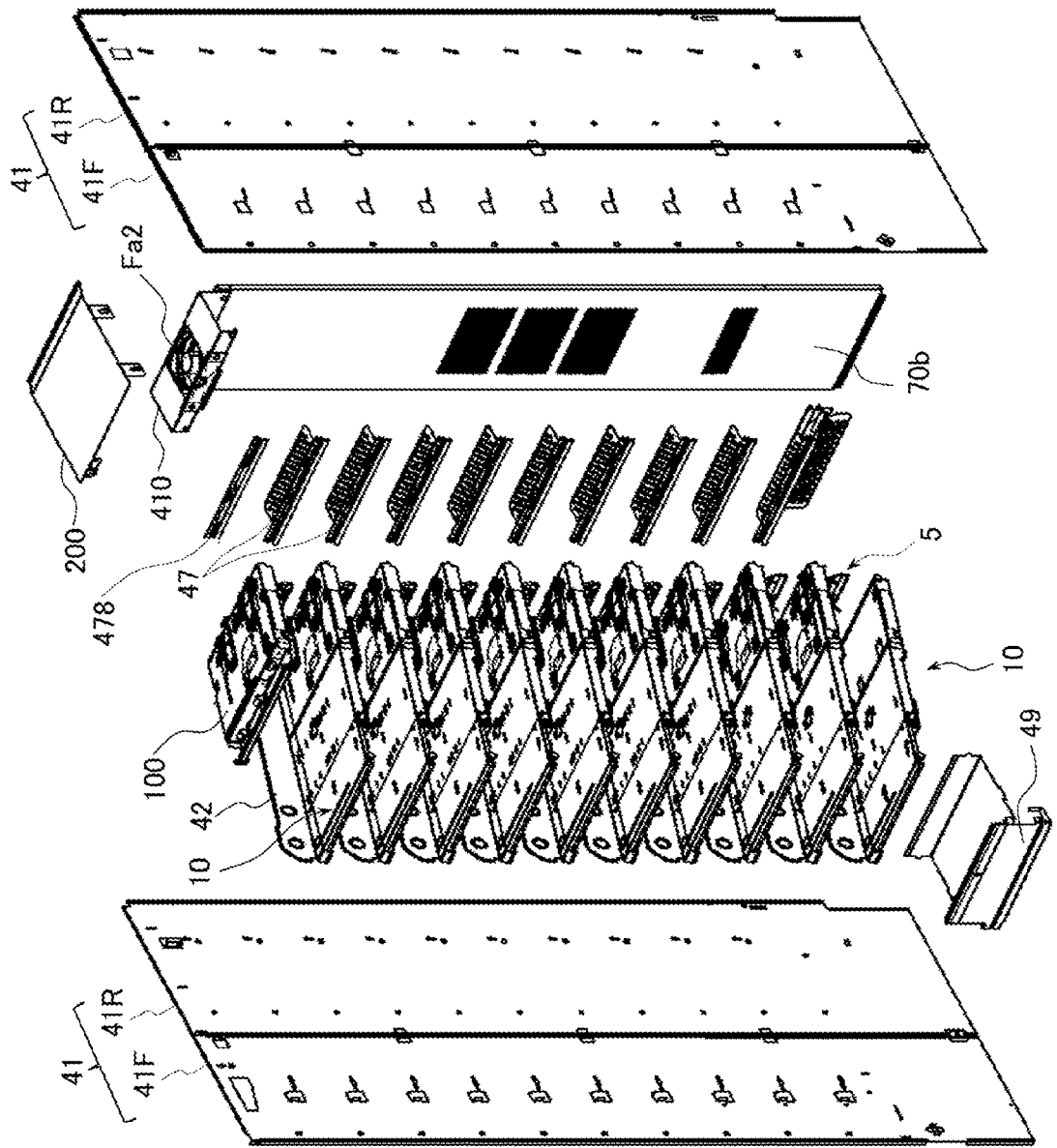
FIG. 5 is an exploded diagram of the product housing rack.

The product housing racks 4 housed and installed in the respective product housing rooms 13, 14, and 15 partitioned by the heat-insulating partition walls 12, 12 (refer to FIG. 2) in the product storage surrounded by the heat-insulating panels of the body cabinet 1 have substantially identical configurations, and thus the product housing rack 4 for the product housing room 14 is described below as a representative. FIG. 5 is an exploded perspective view of the product housing rack 4 housed and installed in the product housing room 14. The product housing rack 4 includes the product housing shelves 10 that are disposed at multiple rungs in the up-down direction and to the back surface of each of which the product discharge device 5 is directly attached, the posture control plates 47 deployed near the rear ends of the product housing shelves 10, the upper duct member 70b that guides cool air cooled or warm air heated by the cooling-heating unit 7 to an upper part of the inside, the internal upper fan Fa2 configured to send downward internal air moving up through the upper duct member 70b, the shield member 200 that prevents internal air moving up through the upper duct member 70b from directly contacting the top wall 1a of the body cabinet 1, and the pair of right and left rack side plates 41, 41 across which, for example, the meck lock member 100 is installed.

The pair of right and left rack side plates 41, 41 are each divided into a front side rack member 41F and a rear side rack member 41R. The front side rack member 41F and the rear side rack member 41R are each made of a thin steel plate having a rectangular flat plate shape. The pair of right and left rack side plates 41, 41 are symmetric in the right-left direction, and thus the rack side plate 41 on the left side in FIG. 5 is described below as a representative. FIGS. 6A, 6B, 6C and 6D illustrate the rack side plate 41 on the left side in FIG. 5. As understood from FIGS. 6A, 6B, 6C and 6D, front flanges 41F1 and 41R1 and rear flanges 41F2 and 41R2 for reinforcement are bent inward and formed along front edges and rear edges of the front side rack member 41F and the rear side rack member 41R. Engagement parts 41F3 and 41R3 (refer to FIGS. 4A and 4B as well) bent outward in a hook shape are provided at upper edges of the front side rack member 41F and the rear side rack member 41R. The engagement parts 41F3 and 41R3 engage with the hook-shaped rail parts 16c of the pair of right and left guide clasps 16, 16 laid on the ceiling surface of the product storage illustrated in FIGS. 4A and 4B.

Figure 6A:
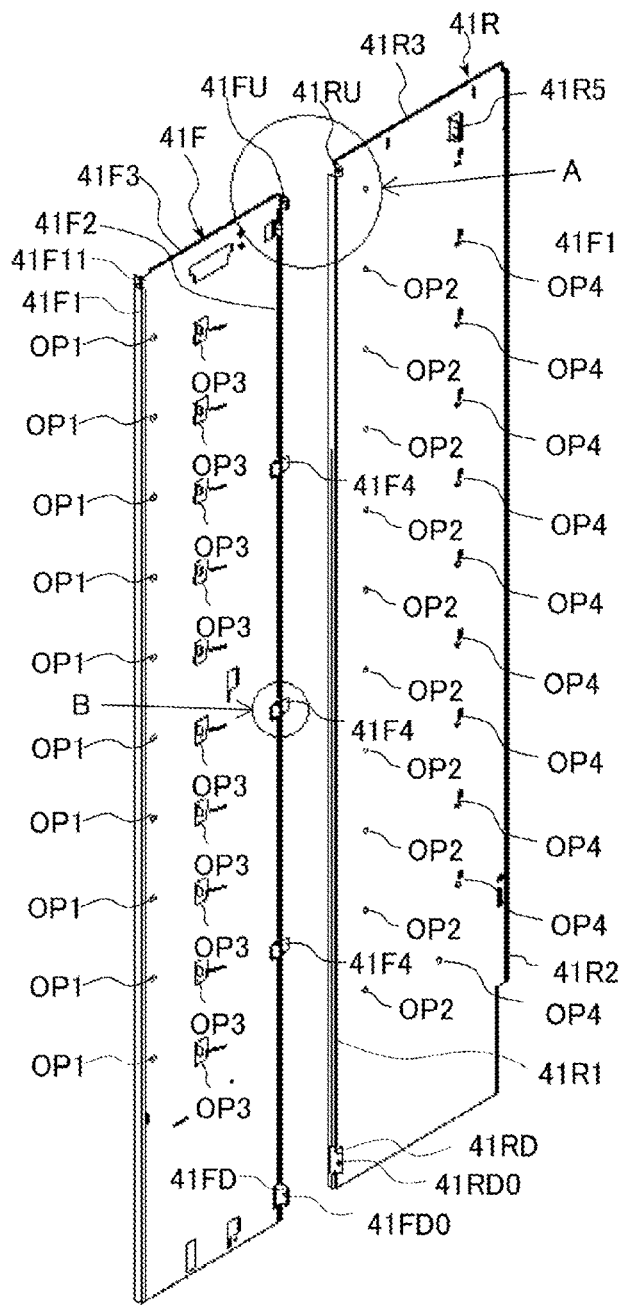
FIGS. 6A, 6B, 6C and 6D illustrate a rack side plate.
Figure 6B:
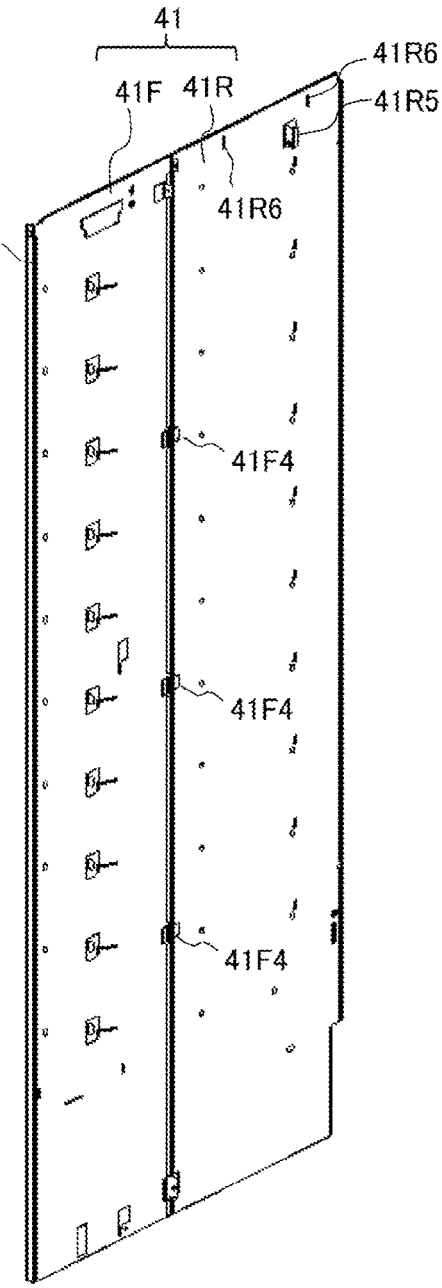
Figure 6C:
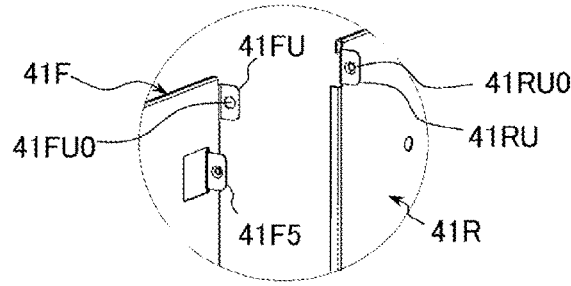
Figure 6D:
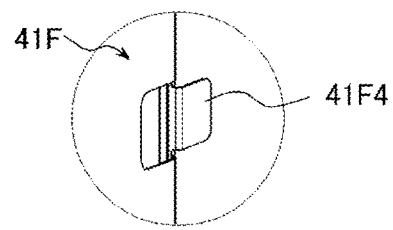

Engagement pieces 41FU and 41FD are formed by cutting and erecting at upper and lower end parts of the rear flange 41F2 of the front side rack member 41F, and engagement pieces 41RU and 41RD are formed by cutting and erecting at upper and lower end parts of the front flange 41R1 of the rear side rack member 41R to face the engagement pieces 41FU and 41FD. FIG. 6C is an enlarged view of Part A in FIG. 6A, and the engagement piece 41RU is formed at the upper end part of the front flange 41R1 of the rear side rack member 41R to face the engagement piece 41FU formed at the upper end part of the rear flange 41F2 of the front side rack member 41F. As understood from FIG. 6C, screw holes 41FU0 and 41RU0 are perforated through the engagement piece 41FU and the engagement piece 41RU. Screw holes 41FD0, 41RD0 are perforated through the engagement piece 41FD formed at the lower end part of the rear flange 41F2 of the front side rack member 41F and the engagement piece 41RD formed at the lower end part of the front flange 41R1 of the rear side rack member 41R. In addition, three tongue pieces 41F4 are formed by cutting and erecting in a middle region of the rear flange 41F2 of the front side rack member 41F in the up-down direction. Part B in FIGS. 6A, 6B, 6C and 6D, in other words, the tongue piece 41F4 at the center among the three tongue pieces 41F4 is illustrated in an enlarged manner in FIG. 6D. As understood from this drawing, the tongue piece 41F4 extends rearward.

A protrusion 41F11 protruding upward is formed on the upper end side of the front flange 41F1 of the front side rack member 41F, and a screw insertion hole is drilled through the protrusion 41F11. In addition, ten pin insertion holes OP1 arranged in the up-down direction are drilled at positions on a plate surface of the front side rack member 41F closer to the front end, and ten wiring insertion holes OP3 (to be described in detail with reference to FIG. 38) arranged in the up-down direction are drilled at substantially middle positions of the plate surface of the front side rack member 41F in the front-and-rear direction. In addition, ten pin insertion holes OP2 arranged in the up-down direction are drilled at positions on a plate surface of the rear side rack member 41R closer to the front end, and ten holder attachment holes OP4 arranged in the up-down direction are drilled at positions on the plate surface of the rear side rack member 41R closer to the rear side.

Figure 4A:
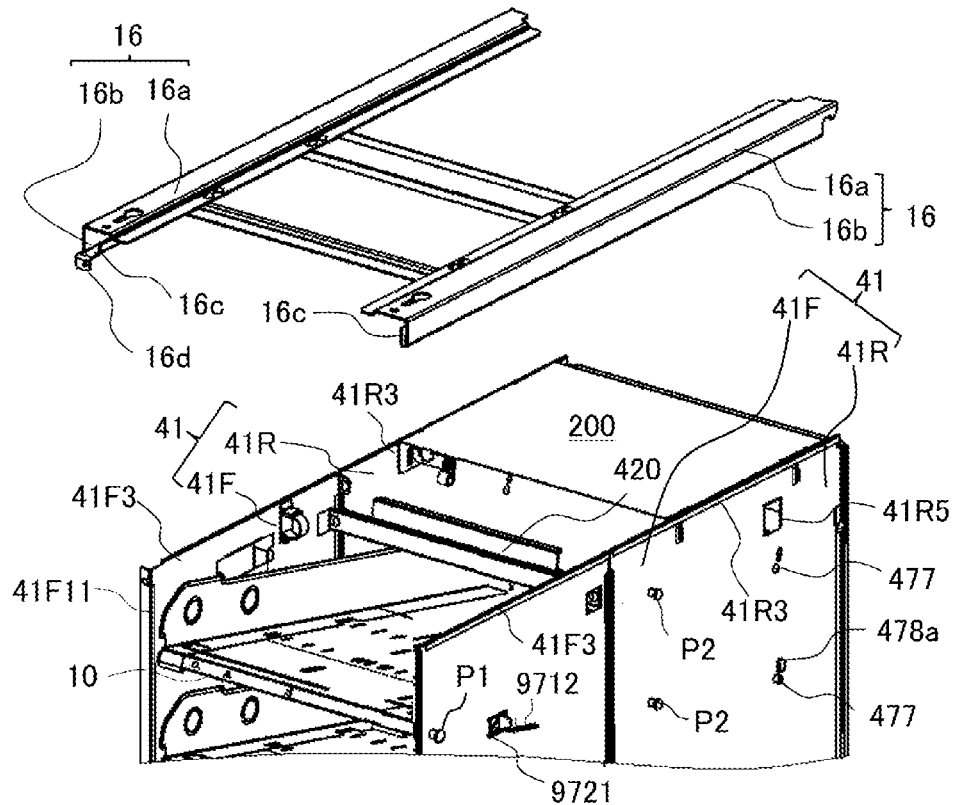
FIGS. 4A and 4B illustrate the guide and an upper part of the product housing rack in FIG. 3 in an enlarged manner.
Figure 4B:
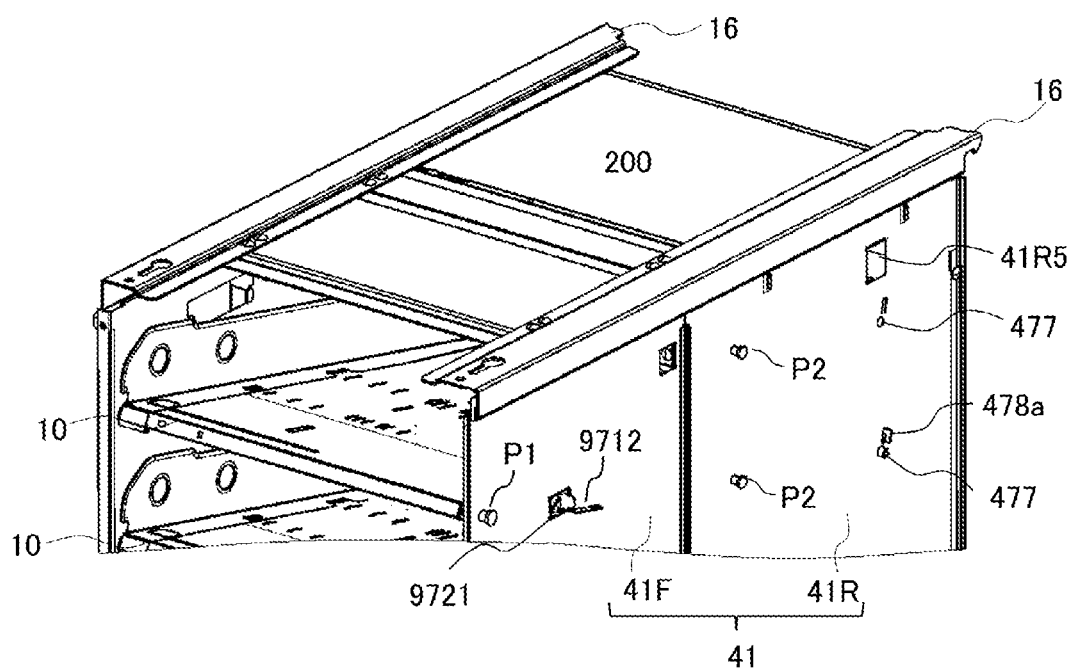

The front side rack member 41F and the rear side rack member 41R are integrated into the rack side plate 41 by butting the rear flange 41F2 of the front side rack member 41F and the front flange 41R1 of the rear side rack member 41R while putting the three tongue pieces 41F4 formed at the rear flange 41F2 of the front side rack member 41F along the inner side of the plate surface of the rear side rack member 41R, by facing the engagement pieces 41FU and 41FD formed at the upper and lower end parts of the rear flange 41F2 of the front side rack member 41F to the engagement pieces 41RU and 41RD formed at the upper and lower end parts of the front flange 41R1 of the rear side rack member 41R, by screwing screws into the screw hole 41FU0 of the engagement piece 41FU formed at the upper end part of the front side rack member 41F and the screw hole 41RU0 of the engagement piece 41RU formed at the upper end part of the rear side rack member 41R, and screws into the screw hole 41FD0 of the engagement piece 41FD formed at the lower end part of the front side rack member 41F and the screw hole 41RD0 of the engagement piece 41RD formed at the lower end part of the rear side rack member 41R, and by fastening the screws. Upper parts of the front side rack members 41F, 41F on the rear side are coupled with each other by a coupling member 420 installed across the front side rack members 41F, 41F so that the separation distance therebetween is maintained constant. As illustrated in FIGS. 4A and 4B, the coupling member 420 is screwed to a lock piece 41F5 (refer to FIG. 6C as well) formed by cutting and erecting near the upper part of the front side rack member 41F on the rear side.

The interval between the right and left rack side plates 41, 41 when the product housing shelves 10 and the like are installed across the right and left rack side plates 41, 41 each formed by integrating the front side rack member 41F and the rear side rack member 41R is a constant interval that is substantially equal to the interval between the hook-shaped rail parts 16c, 16c of the pair of right and left guide clasps 16, 16 laid on the ceiling surface of the product storage illustrated in FIGS. 4A and 4B. The right and left rack side plates 41, 41 are housed into the product storage by fitting the engagement parts 41R3, 41R3 to the rail parts 16c, 16c while facing rear ends of the hook-shaped engagement parts 41R3, 41R3 of the right and left rear side rack members 41R to front ends of the hook-shaped rail parts 16c, 16c of the pair of right and left guide clasps 16, 16 laid on the ceiling surface of the product storage, pressing the rack side plates 41, 41 into the product storage toward the rear side, subsequently fitting the hook-shaped engagement parts 41F3, 41F3 of the right and left front side rack members 41F, 41F into the rail parts 16c, 16c, and pressing the rack side plates 41, 41 into the product storage. The pressing of the right and left rack side plates 41, 41 into the product storage is performed until the protrusion 41F11 formed at the upper end of the front flange 41F1 of the front side rack member 41F of the rack side plate 41 on the left side contacts the lock piece 16d (refer to FIGS. 4A and 4B) provided at the front end of the guide clasp 16 on the left side among the pair of right and left guide clasps 16, 16. When the protrusion 41F11 contacts the lock piece 16d (refer to FIGS. 4A and 4B), the right and left rack side plates 41, 41 are completely housed in the product storage in suspended states while engagement parts 43F3 and 43R3 of the front side rack members 41F and the rear side rack members 41R of the right and left rack side plates 41, 41 are engaged with the hook-shaped rail parts 16c, 16c of the pair of right and left guide clasps 16, 16. Then, the protrusion 41F11 and the lock piece 16d are firmly fixed with each other by screws to regulate movement of the right and left rack side plates 41, 41 in the front-and-rear direction.

Figure 7A:
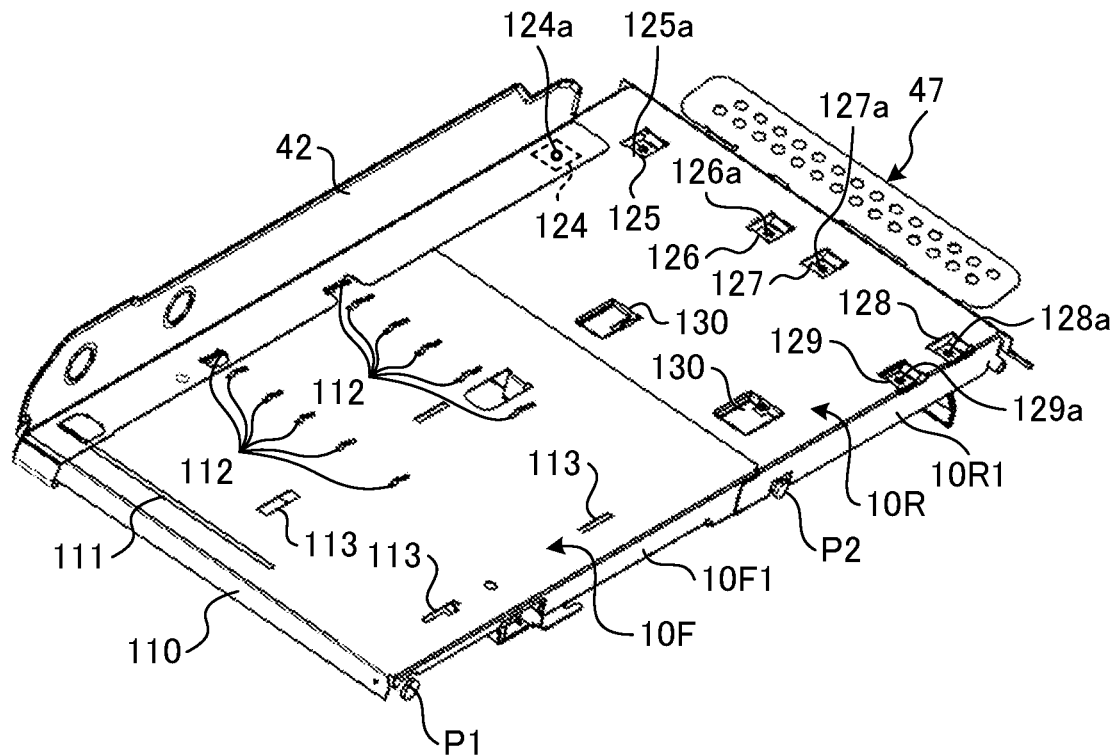
FIGS. 7A and 7B illustrate a product housing shelf to which a product discharge device is directly attached.
Figure 7B:
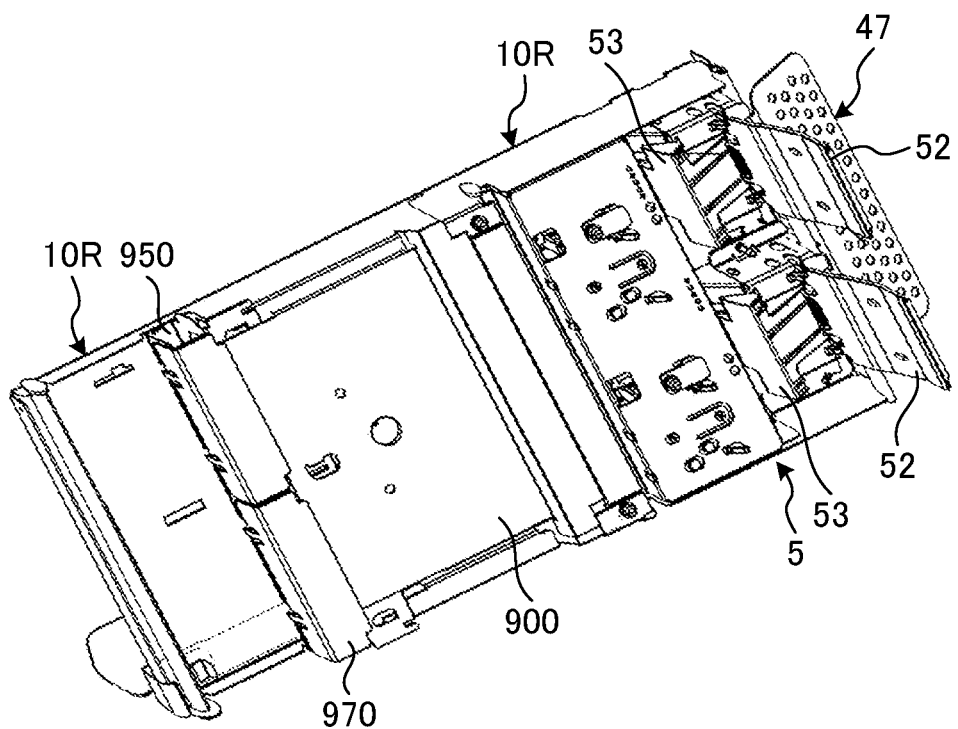
Figure 8:
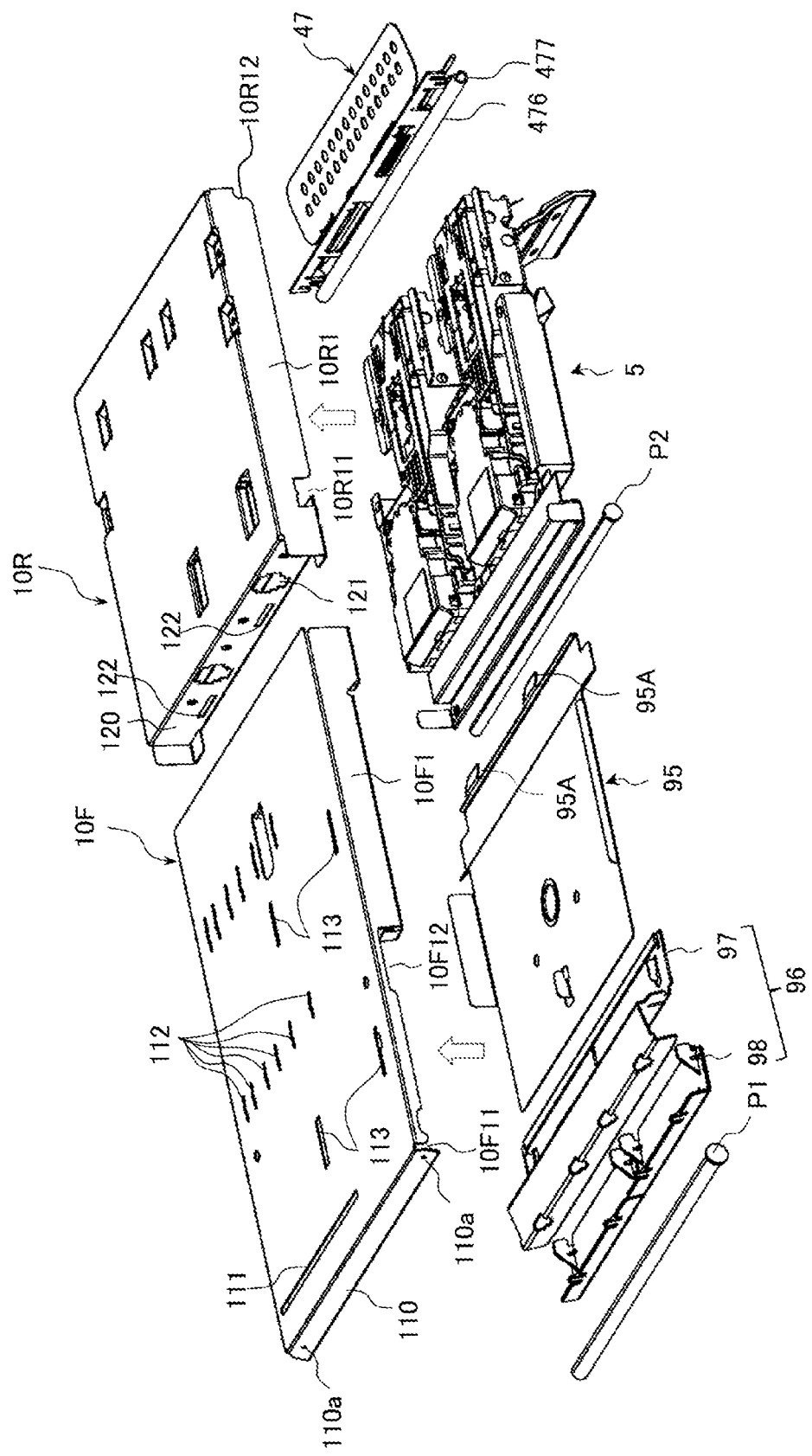
FIG. 8 is an exploded diagram of the product housing shelf in FIGS. 7A and 7B.
Figure 9A:
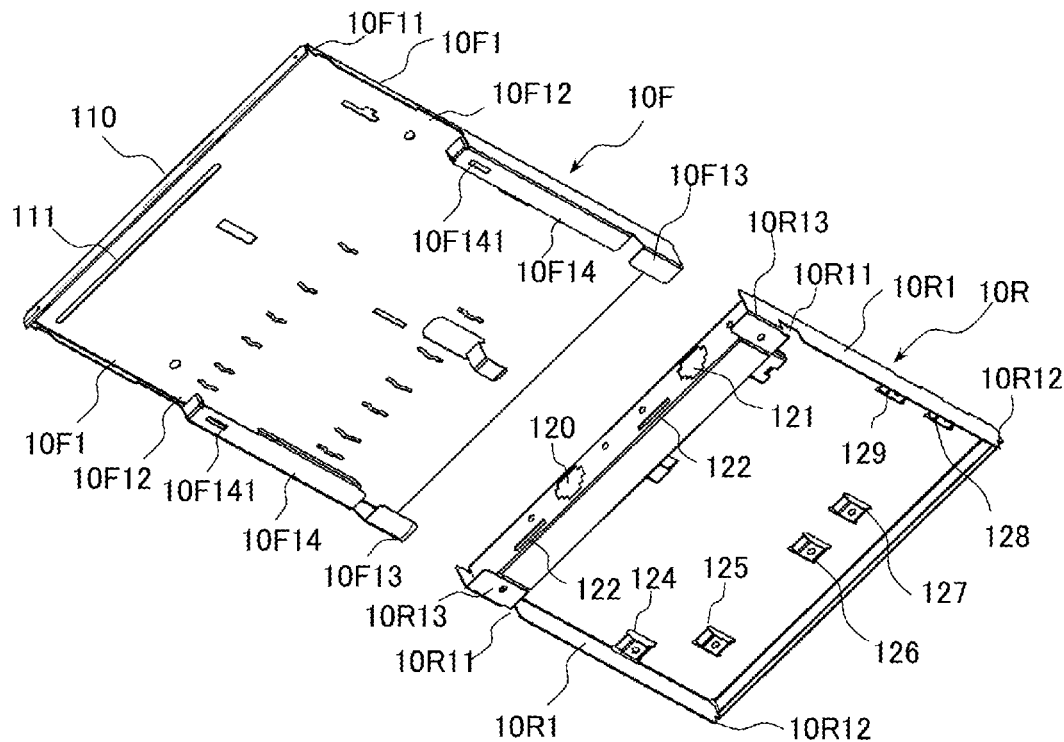
FIGS. 9A and 9B illustrate the state of the product housing shelf in FIGS. 7A and 7B when viewed obliquely to the right from the lower side on a back surface side.
Figure 9B:
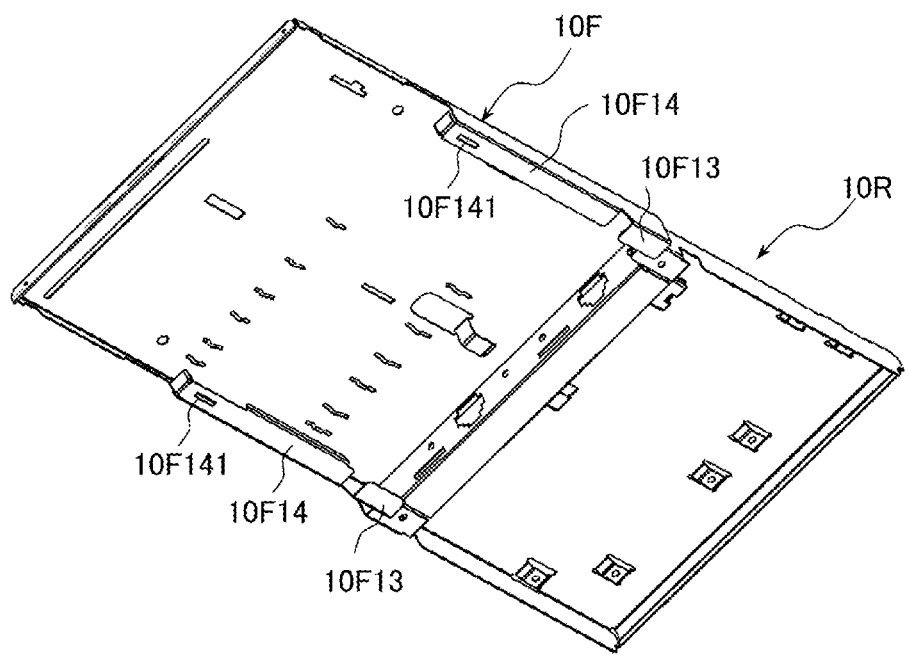

As illustrated in FIGS. 7 to 9, each product housing shelf 10 includes a front side shelf member 10F and a rear side shelf member 10R that are divided in the front-and-rear direction. FIGS. 7A and 7B are perspective views of the product housing shelf 10 in FIG. 5, FIG. 8 is an exploded perspective view of FIGS. 7A and 7B, and FIGS. 9A and 9B are back views of the front side shelf member 10F and the rear side shelf member 10R. The front side shelf member 10F is mainly for adjustment of the partition members 42, and a cover member 95 and a wire pullout member 96 are disposed on a back surface side thereof. The rear side shelf member 10R is mainly for attachment of the product discharge device 5, and the product discharge device 5 is directly attached to a back surface thereof. The front side shelf member 10F and the rear side shelf member 10R are each made of a thin steel plate having a rectangular flat plate shape. The front side shelf member 10F and the rear side shelf member 10R are reinforced by flanges 10F1, 10F1 and flanges 10R1, 10R1, respectively, bent downward from right and left side edges of rectangular plate surfaces. The width between the right and left flanges 10R1, 10R1 of the rear side shelf member 10R in the right-left direction is slightly wider than the width between the right and left flanges 10F1, 10F1 of the front side shelf member 10F in the right-left direction so that the right and left flanges 10F1, 10F1 of the front side shelf member 10F can be sandwiched between the right and left flanges 10R1, 10R1 of the rear side shelf member 10R.

A suspending part 110 is formed by bending downward a front end part of the front side shelf member 10F, and screw holes 110a, 110a (refer to FIG. 8) are formed at right and left end parts of the suspending part 110. In addition, a guiding groove 111 formed as a slit positioned closer to the front side of the plate surface and extending in the right-left direction, front and rear setting grooves 112 formed as slits positioned on the rear side of the guiding groove 111, extending in the front-and-rear direction, and drilled side by side in six lines in the right-left direction, and four slit mounting grooves 113 for attaching an attachment (not illustrated) mounted on the product housing shelf 10 as necessary are drilled through the plate surface of the front side shelf member 10F. The suspending part 110, the guiding groove 111, and the front and rear setting grooves 112 are for mounting and adjustment of the partition members 42.

Pin insertion grooves 10F11 (refer to FIGS. 8 and 9) are cut out at front ends of the right and left flanges 10F1 of the front side shelf member 10F to form predetermined void spaces to the suspending part 110, and engagement grooves 10F12 (refer to FIGS. 8 and 9) of the wire pullout member 96 are cut out at middle sites of the flanges 10F1 in the front-and-rear direction. A pin P1 (refer to FIG. 3 as well) installed across the right and left rack side plates 41, 41 to support the product housing shelf 10 (the front side shelf member 10F) is inserted into the pin insertion grooves 10F11. Both ends of the wire pullout member 96 are inserted into the engagement grooves 10F12. In addition, rear ends of the right and left flanges 10F1 of the front side shelf member 10F are cut out at positions slightly on the front side of a rear edge of the plate surface of the front side shelf member 10F. In other words, the rear edge of the plate surface of the front side shelf member 10F is positioned on the rear side of the rear ends of the right and left flanges 10F1 of the front side shelf member 10F. Contact pieces 10F13, 10F13 (refer to FIGS. 9A and 9B) are bent inward and formed at free ends of the right and left flanges 10F1, 10F1 of the front side shelf member 10F on the rear end side. The contact pieces 10F13, 10F13 are used for coupling with the rear side shelf member 10R. Lock piece parts 10F14, 10F14 that are lower than the contact pieces 10F13, 10F13 are provided in front side regions of the contact pieces 10F13, 10F13 of the right and left flanges 10F1, 10F1, and slit lock grooves 10F141, 10F141 extending in the front-and-rear direction are formed closer to front sides of the lock piece parts 10F14, 10F14. Hook pieces 9713 (refer to FIG. 36) of the wire pullout member 96 are inserted into the lock grooves 10F141, 10F141 of the lock piece parts 10F14, 10F14.

A suspending part 120 is formed by bending downward a front end part of the rear side shelf member 10R on the rear side of the front ends of the right and left flanges 10R1, 10R1. The suspending part 120 is provided with a coupler attachment hole 121 on which a coupler (not illustrated) connected with control signal lines to, for example, a drive device and a sold-out sensing switch (micro switch) of the product discharge device 5 is mounted, and engagement holes 122, 122 into which engagement pieces 95A, 95A of the cover member 95 are inserted. The rectangular plate surface of the rear side shelf member 10R is provided with six fixation parts 124 to 129 at positions closer to the back side of the plate surface, and a pair of right and left openings 130, 130 at positions on the front side of the rear side shelf member 10R and the right side in the right-left direction. The six fixation parts 124 to 129 are formed as recessed parts through extrusion of the plate surface on the rear surface side, and screw insertion holes 124*a* to 129*a* are drilled through bottom surfaces of the recessed parts. The six fixation parts 124 to 129 are disposed symmetrically with respect to a middle line between the fixation part 126 and the fixation part 127 in the right-left direction. The fixation parts 124 to 129 are for direct mounting of the product discharge device 5. The pair of right and left openings 130, 130 are for attaching an attachment (not illustrated) mounted on the product housing shelf 10 as necessary.

In addition, pin insertion grooves 10R11, 10R11 (refer to FIGS. 8 and 9) are cut out in rectangular shapes at edge parts of the right and left flanges 10R1, 10R1 of the rear side shelf member 10R on the front side, and curl engagement parts 10R12, 10R12 are cut out in arc shapes at the rear ends of the right and left flanges 10R1, 10R1. A pin P2 (refer to FIG. 3 as well) installed across the right and left rack side plates 41, 41 to support the product housing shelf 10 (the rear side shelf member 10R) is inserted into the pin insertion grooves 10R11, 10R11. The curl engagement parts 10R12, 10R12 contact a cylindrical part 477 formed at a holder 476 holding the posture control plate 47 and are installed across the right and left rack side plates 41, 41. The posture control plate 47 and the holder 476 will be described later with reference to FIGS. 11A and 11B.

As described above, the front ends of the right and left flanges 10R1, 10R1 of the rear side shelf member 10R are positioned on the front side of the front end part of the plate surface of the rear side shelf member 10R. Placement pieces 10R13, 10R13 (refer to FIGS. 9A and 9B) are bent inward and formed at free ends of the right and left flanges 10R1, 10R1 on the front end side. The placement pieces 10R13, 10R13 are used for coupling with the front side shelf member 10F with the contact pieces 10F13, 10F13 of the front side shelf member 10F by being placed thereon.

As described above, the width between the right and left flanges 10R1, 10R1 of the rear side shelf member 10R in the right-left direction is slightly wider than the width between the right and left flanges 10F1, 10F1 of the front side shelf member 10F in the right-left direction so that the right and left flanges 10F1, 10F1 of the front side shelf member 10F can be sandwiched between the right and left flanges 10R1, 10R1 of the rear side shelf member 10R. Thus, the front side shelf member 10F and the rear side shelf member 10R are coupled with each other by fitting rear side parts of the right and left flanges 10F1, 10F1 of the front side shelf member 10F to front end parts of the right and left flanges 10R1, 10R1 of the rear side shelf member 10R and then placing the contact pieces 10F13, 10F13 of the front side shelf member 10F on the placement pieces 10R13, 10R13 of the rear side shelf member 10R in an overlapping manner. In this case, the rear edge of the plate surface of the front side shelf member 10F is placed on the plate surface of the rear side shelf member 10R to prevent a product rolling or sliding on the plate surface of the front side shelf member 10F from colliding with the front end part of the rear side shelf member 10R.

As illustrated in FIG. 3, the front side shelf member 10F and the rear side shelf member 10R are attached to the pair of right and left rack side plates 41, 41. In other words, after the holder 476 holding the posture control plate 47 is disposed between the pair of right and left rack side plates 41, 41, both ends of the cylindrical part 477 and right and left lock pieces 478*a* of the holder 476 are inserted into the holder attachment holes OP4 (described in detail with reference to FIGS. 11A and 11B) provided to the pair of right and left rack side plates 41, 41 and installed across the pair of right and left rack side plates 41, 41, and then the pins P1 and P2 are inserted into the pin insertion holes OP1 and OP2 from outside the rack side plate 41 on the right side and installed across the right and left rack side plates 41, 41. Then, the arc-shaped curl engagement parts 10R12, 10R12 formed at the rear ends of the right and left flanges 10R1, 10R1 of the rear side shelf member 10R are engaged with the cylindrical part 477 formed at the holder 476, and the pin insertion grooves 10R11, 10R11 formed closer to the front side of the right and left flanges 10R1, 10R1 are engaged with the pin P2. Thereafter, the rear side parts of the right and left flanges 10F1, 10F1 of the front side shelf member 10F are fitted to the right and left flanges 10R1, 10R1 of the front end part of the rear side shelf member 10R, and then the contact pieces 10F13, 10F13 of the front side shelf member 10F are placed on the placement pieces 10R13, 10R13 of the rear side shelf member 10R in an overlapping manner, and the pin insertion grooves 10F11, 10F1 formed at the front ends of the right and left flanges 10F1, 10F1 are engaged with the pin P1. Accordingly, the front side shelf member 10F and the rear side shelf member 10R are installed across the right and left rack side plates 41, 41 while being coupled with each other.

The front side shelf member 10F can be removed through a procedure opposite to the above-described procedure of attachment to the rack side plate 41, and when product clogging has occurred in the product housing path 43, particularly when product clogging has occurred on the product discharge port 45 side in the product housing path 43 on which the product discharge device 5 is disposed, the product clogging can be resolved by removing the front side shelf member 10F.

The partition members 42 extend in the front-and-rear direction and are mounted on the product housing shelf 10 to define the product housing paths 43, and in the example illustrated in FIG. 5 (the product housing rack 4 housed and installed in the product housing room 14), one partition member 42 is used.

Figure 10A:
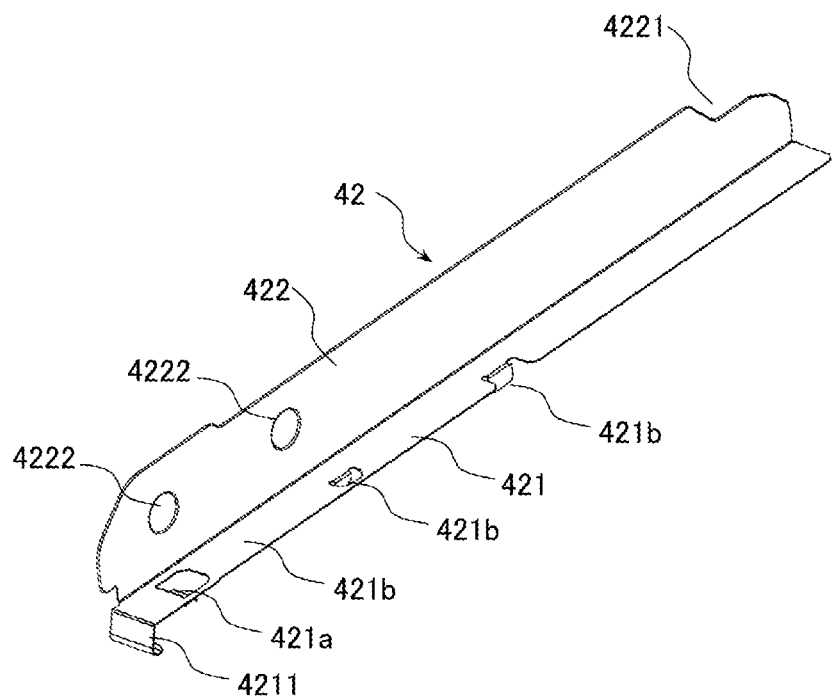
FIGS. 10A and 10B illustrate a partition member.
Figure 10B:
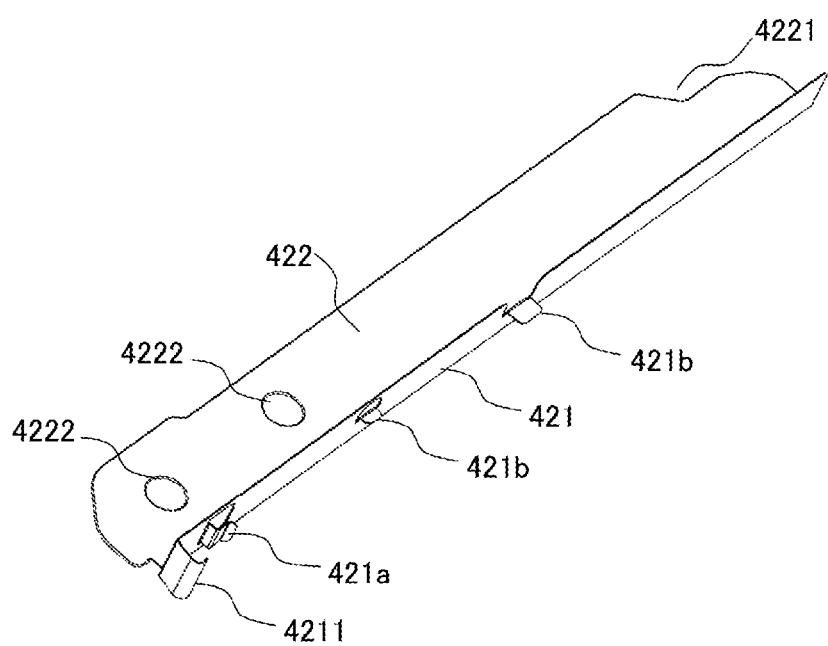

FIGS. 10A and 10B illustrate the partition member 42: FIG. 10A is a perspective view when viewed obliquely to the right from the upper side; and FIG. 10B is a perspective view when viewed obliquely to the right from the lower side. The partition member 42 is made of a thin steel plate bent in an L shape and includes a product placement part 421 parallel to the plate surface (path surface) of the product housing shelf 10 made of the front side shelf member 10F and the rear side shelf member 10R, and a regulation part 422 perpendicular to the path surface. An engagement part 4211 having an L shape surrounding the suspending part 110 of the front side shelf member 10F at the front end is formed at a front end of the product placement part 421. The suspending part 110 of the front side shelf member 10F is wrapped and loosely fitted in the engagement part 4211. In addition, a hook piece 421*a* protruding toward the back surface side is formed closer to a front side of a plate surface of the product placement part 421 by cutting and erecting. The hook piece 421*a* is formed in a manner corresponding to the guiding groove 111 formed as a slit extending in the right-left direction closer to the front side of the plate surface of the front side shelf member 10F, and is engaged with the guiding groove 111 through loose fitting by placing a leading end of the hook piece 421*a* below the plate surface of the front side shelf member 10F while bending the plate surface downward by pressing an edge part of the guiding groove 111 on the rear side from above. In addition, a pair of front and rear engagement clicks 421*b*, 421*b* protruding toward the back surface side are formed by cutting and erecting on the rear side of the hook piece 421a of the product placement part 421. The engagement clicks 421b, 421b are formed in substantially inverted trapezoid shapes when viewed from a side surface. The pair of front and rear engagement clicks 421b, 421b can be engaged with and removed from the front and rear setting grooves 112, 112 formed at the plate surface of the front side shelf member 10F. A step is formed by a cutout 4221 on a rear end side of the regulation part 422 to avoid interference with a stopper member 52 of the product discharge device 5 to be described later, and a finger hook hole 4222 into which a finger is hooked is formed on the front side of the step.

Each partition member 42 is mounted on the product housing shelf 10 as illustrated in FIGS. 7A and 7B through assembly to the product housing shelf 10 as follows. Specifically, while the hook piece 421a formed at the product placement part 421 of the partition member 42 is positioned above the product housing shelves 10 (the front side shelf member 10F and the rear side shelf member 10R) and on the front side of the guiding groove 111 formed at the plate surface of the front side shelf member 10F, the edge part of the guiding groove 111 on the rear side is pressed from above to bend the plate surface downward, and then the leading end of the hook piece 421a is placed below the plate surface of the front side shelf member 10F. In this state, a base end part (perpendicular part) of the hook piece 421a is positioned on the front side of the guiding groove 111 and the product placement part 421 of the partition member 42 is separated from the plate surface of the product housing shelf 10, and thus the partition member 42 is moved toward the rear side so that the base end part (perpendicular part) of the hook piece 421a moves to the position of the guiding groove 111. Once the base end part (perpendicular part) of the hook piece 421a reaches the position of the guiding groove 111, the base end part (perpendicular part) of the hook piece 421a can be fitted into the guiding groove 111, and accordingly, the product placement part 421 approaches the plate surface of the product housing shelf 10 as the partition member 42 is moved downward together with the hook piece 421a. In this case, while the engagement part 4211 is bent toward the front side to prevent interference of a leading end (leg piece of the L shape in the short direction) of the L-shaped engagement part 4211 of the partition member 42 with the front end of the front side shelf member 10F, the partition member 42 is moved downward until the product placement part 421 reaches the plate surface of the product housing shelf 10. When the product placement part 421 reaches the plate surface of the product housing shelf 10, the leading end (leg piece of the L shape in the short direction) of the engagement part 4211 reaches below the suspending part 110 of the front side shelf member 10F. When external force applied to the engagement part 4211 is canceled in this state, the engagement part 4211 is restored to wrap around the suspending part 110 of the front side shelf member 10F from the front side.

When the pair of front and rear engagement clicks 421b, 421b of the product placement part 421 do not face the front and rear setting grooves 112, 112 formed at the plate surface of the front side shelf member 10F (when the pair of front and rear engagement clicks 421b, 421b contact the plate surface of the front side shelf member 10F) after the product placement part 421 of the partition member 42 has approached the plate surface of the product housing shelf 10, the partition member 42 is slid in the right-left direction to face the pair of front and rear engagement clicks 421b, 421b to the setting grooves 112, 112 and is engaged to mount the product placement part 421 of the partition member 42 on the plate surface of the product housing shelf 10 (the front side shelf member 10F and the rear side shelf member 10R) in a close contact state.

The partition member 42 is mounted on the product housing shelf 10 to define the product housing path 43 and extends in the front-and-rear direction, and its set position on the product housing shelf 10 is changed to change the path width (width in the right-left direction) of the product housing path 43. FIGS. 7A and 7B illustrate a case in which the partition members 42 are set on the left end sides of the product housing shelf 10 (are set to the setting grooves 112, 112 on the left end side among the front and rear setting grooves 112, 112 formed at the plate surface of the front side shelf member 10F), and in this case, the product housing path 43 corresponding to long-size products is defined in the product housing shelf 10. When the set position of a partition member 42 set on the left end side of the product housing shelf 10 is to be changed in this state, a finger (for example, a thumb) is pressed against the suspending part 110 at the front end of the partition member 42 and another finger (for example, an index finger) is hooked into the finger hook hole 4222 provided at the regulation part 422 of the partition member 42, and in this state, external force for lifting up the partition member 42 upward is applied by the finger being hooked into the finger hook hole 4222. Accordingly, the corner (corner of the L shape) of the L-shaped engagement part 4211 of the partition member 42, which is disposed to wrap around the suspending part 110 of the front side shelf member 10F, contacts a lower end of the suspending part 110, and the partition member 42 rotates with this contact point as a pivot so that the rear end side thereof is lifted off, and as a result, the product placement part 421 becomes separated from the plate surface of the product housing shelf 10 (the front side shelf member 10F and the rear side shelf member 10R) and moves up. The rotation of the partition member 42 is restricted when the leading end of the hook piece 421a (leading end of a horizontal part) contacts the back surface of the front side shelf member 10F. While the rotation is restricted in this manner, the pair of front and rear engagement clicks 421b, 421b provided at the product placement part 421 are removed from the front and rear setting grooves 112, 112 formed at the plate surface of the front side shelf member 10F. While being maintained in the rotated state, the partition member 42 is slid to the right side to a predetermined set position (for example, the fifth setting grooves 112, 112 from the left). When the external force applied to the partition member 42 is canceled after the partition member 42 is moved to a predetermined installation position, the partition member 42 rotates downward and the pair of front and rear engagement clicks 421b, 421b provided at the product placement part 421 engage with the predetermined setting grooves 112, 112. Accordingly, the product placement part 421 of the partition member 42 closely contacts the plate surface of the product housing shelf 10 to define two product housing paths 43, 43 each positioned between the regulation part 422 of the partition member 42 and the corresponding one of the right and left rack side plates 41, 41. In this case, the two product housing paths 43, 43 each have a width in accordance with a half-size product having a length that is substantially half the length of a long-size product.

Figure 11A:
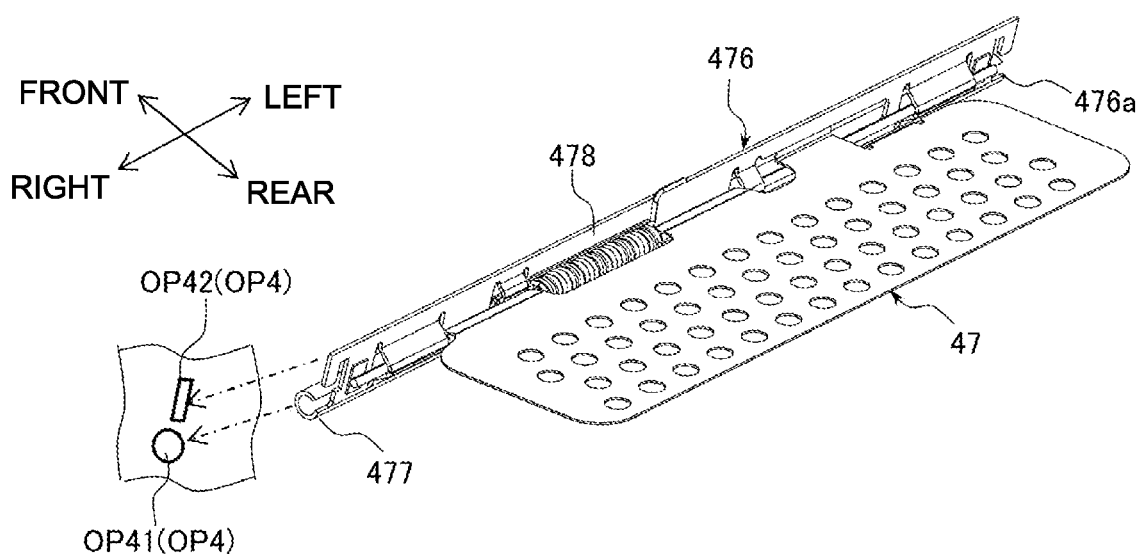
FIGS. 11A and 11B illustrate a posture control plate.
Figure 11B:
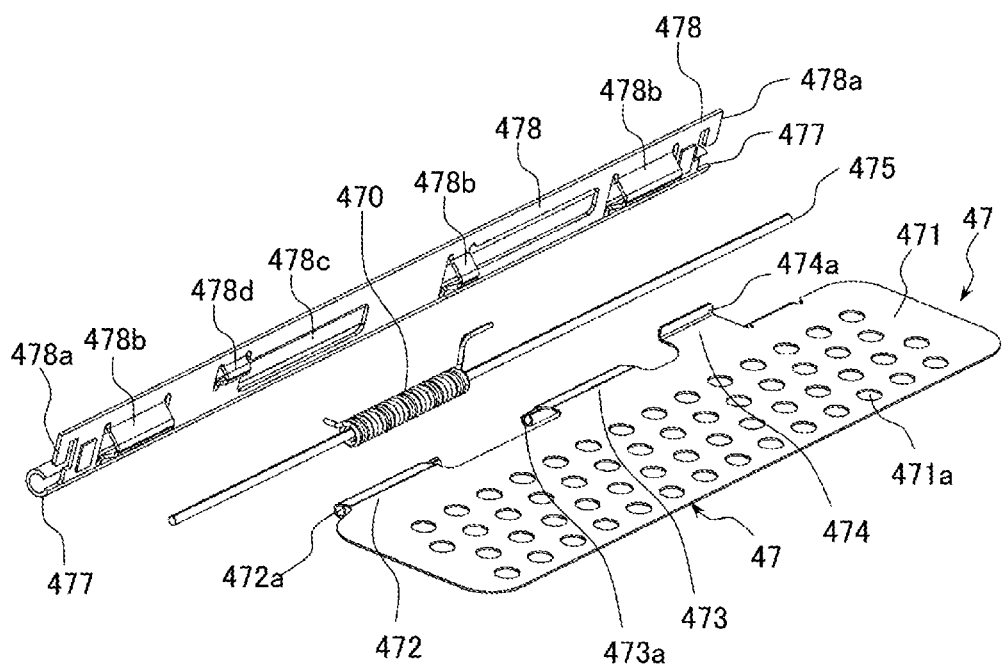

The following describes the posture control plate 47 deployed near the rear ends of the product housing shelves 10 (rear end of the rear side shelf member 10R) with respect to FIGS. 11A and 11B. FIG. 11A is a perspective view of a state in which the posture control plate 47 is assembled to the holder 476; and FIG. 11B is an exploded diagram of FIG. 11A.

As illustrated in FIGS. 11A and 11B, the posture control plate 47 is formed by fabricating a flat plate made of a thin steel plate and includes a contact part 471, support parts 472 and 473, and a stopper part 474. The contact part 471 contacts a product falling through the product fall path 46 and includes a contact surface having a substantially rectangular flat plate shape, and a plurality of vent holes 471a are drilled through the contact surface. The support parts 472 and 473 and the stopper part 474 extend from the contact part 471 and are divided into three. The support parts 472 and 473 extend in curved shapes so that free end sides thereof are separated downward from the flat surface of the contact part 471, and the stopper part 474 extends on a flat surface identical to the flat surface of the contact part 471. A first shaft 472a and a second shaft 473a are formed at the support parts 472 and 473 by rolling the free end sides of the support parts 472 and 473 into hollow cylindrical shapes (curl shapes). A shaft member 475 having a bar shape is inserted into the first shaft 472a and the second shaft 473a, and the coil spring 470 into which the shaft member 475 is inserted is disposed between the support parts 472 and 473 divided into two. A stopper piece 474a is formed on a free end side of the stopper part 474 and bent at a right angle from a flat surface of the stopper part 474 (identical to the flat surface of the contact part 471). The stopper piece 474a is positioned higher than the first shaft 472a and the second shaft 473a, when the contact part 471 of the posture control plate 47 is in the horizontal state.

The holder 476 holding the posture control plate 47 is formed by fabricating a flat plate made of a thin steel plate and having a strip shape (flat plate shape elongated in the right-left direction), and includes the cylindrical part 477 as a long-side part side rounded in a hollow cylindrical shape (curl shape), and a flat plate part 478. The lock pieces 478a, 478a are formed at right and left ends of the flat plate part 478 by slits having dimensions larger than the plate thickness of each rack side plate 41. In addition, triangular bearings 478b, 478b, 478b protruding on the rear side by extrusion are formed at right and left sides and a central part of the flat plate part 478, an opening 478c is formed between the bearing 478b on the right side (the left side in the case of FIGS. 11A and 11B) and the bearing 478b at the central part, and a triangular lock part 478d is formed on the obliquely right upper side of the opening 478c in a front view. Each of the triangular bearings 478b, 478b, 478b holds the shaft member 475 and is formed as an insertion hole having a triangular shape with a plate surface of the flat plate part 478 as the base when viewed from a side surface by providing slits on its right and left sides and pressing out the bearing toward the rear side, and the shaft member 475 is inserted into the insertion hole. The lock part 478d locks one end of the coil spring 470 and is formed as a lock hole having a triangular shape with the plate surface of the flat plate part 478 as the base when viewed from a side surface by forming slits on its right and left sides and pressing out the lock part 478d. The opening 478c is formed in a size with which the coil spring 470 can be disposed in the opening.

In attachment of the posture control plate 47 to the holder 476, first, the coil spring 470 is disposed in the opening 478c of the holder 476. In this case, pressing force is applied to the coil spring 470 in advance, and while one end thereof is inserted and locked in the lock part 478d of the holder 476, the other end is made to contact with the flat plate part 478 of the holder 476 and is temporarily fixed by an adhesive tape or the like while the pressing force is maintained. Thereafter, the first shaft 472a of the posture control plate 47 is positioned between the bearing 478b of the holder 476 on the right side (the left side in the case of FIGS. 11A and 11B) and the bearing 478b at the central part, and the second shaft 473a of the posture control plate 47 is positioned between the bearing 478b of the holder 476 at the central part and the bearing 478b on the left side (the right side in the case of FIGS. 11A and 11B). In this case, central lines of the coil spring 470 and the first shaft 472a and the second shaft 473a of the posture control plate 47 are positioned on a line identical to those of the insertion holes of the bearings 478b, 478b, 478b of the holder 476. In this state, the shaft member 475 is inserted into the bearing 478b of the holder 476 on the right side (the left side in the case of FIGS. 11A and 11B) from outside, and sequentially inserted into the first shaft 472a of the posture control plate 47, the coil spring 470, the second shaft 473a of the posture control plate 47, the bearing 478b of the holder 476 at the central part, and the bearing 478b of the holder 476 on the left side. Accordingly, the shaft member 475 is held in the bearings 478b, 478b, 478b of the holder 476, and the posture control plate 47 is integrated with the holder 476 through the shaft member 475. Thereafter, the other end of the coil spring 470, the one end of which is locked to the lock part 478d of the holder 476, is placed and locked below the support part 473 of the posture control plate 47 while the coil spring 470 is compressed toward the one end side. Accordingly, the posture control plate 47 receives application of pressing force by the coil spring 470 and rotational force that rotates the posture control plate 47 in an anticlockwise direction about the shaft member 475 when viewed from the right side surface. The rotation of the posture control plate 47 is regulated when the stopper piece 474a of the posture control plate 47 contacts the flat plate part 478 of the holder 476. Then, while the rotation of the posture control plate 47 is regulated, the contact part 471 of the posture control plate 47 has a posture at a substantially right angle to the flat plate part 478 of the holder 476.

The holder 476 on which the posture control plate 47 is mounted is inserted into the ten holder attachment holes OP4 (refer to FIGS. 6A, 6B, 6C and 6D) formed in the up-down direction at rear-side positions on the plate surfaces of the rear side rack members 41R of the right and left rack side plates 41 and is installed across the right and left rack side plates 41. FIGS. 11A and 11B illustrate the holder attachment holes OP4 in an enlarged manner, and the holder attachment holes OP4 include a circular hole OP41 into which an end part of the cylindrical part 477 of the holder 476 is inserted, and a rectangular hole OP42 into which the lock piece 478a formed at each end of the flat plate part 478 is inserted. The holder 476 is installed across the right and left rack side plates 41, 41 by inserting the end part of the cylindrical part 477 of the holder 476 into the circular hole OP41 and simultaneously inserting the lock piece 478a of the holder 476 into the rectangular hole OP42 and then bending, along the plate surface of the rear side rack member 41R, the lock piece 478a protruding outside the rear side rack member 41R. While the holder 476 is installed across the right and left rack side plates 41, 41, the posture control plate 47 is in a standby state at a protrusion position where the posture control plate 47 protrudes in the product fall path 46 by the pressing force of the coil spring 470. Then, the posture control plate 47 is pressed and opened by a product falling through the product fall path 46 and retracted from the product fall path 46, and then automatically returns to the protrusion position where the posture control plate 47 protrudes in the product fall path 46 by the pressing force of the coil spring 470.

The meck lock member 100 (refer to FIGS. 1 and 5) disposed above the product housing path 43 defined in the uppermost product housing shelf 10 is for attachment of the product discharge device 5, which separates each product housed in the product housing path 43, to the uppermost product housing shelf 10. The meck lock member 100 uses the rear side shelf member 10R as the product housing shelf 10 in the present embodiment.

Figure 12:
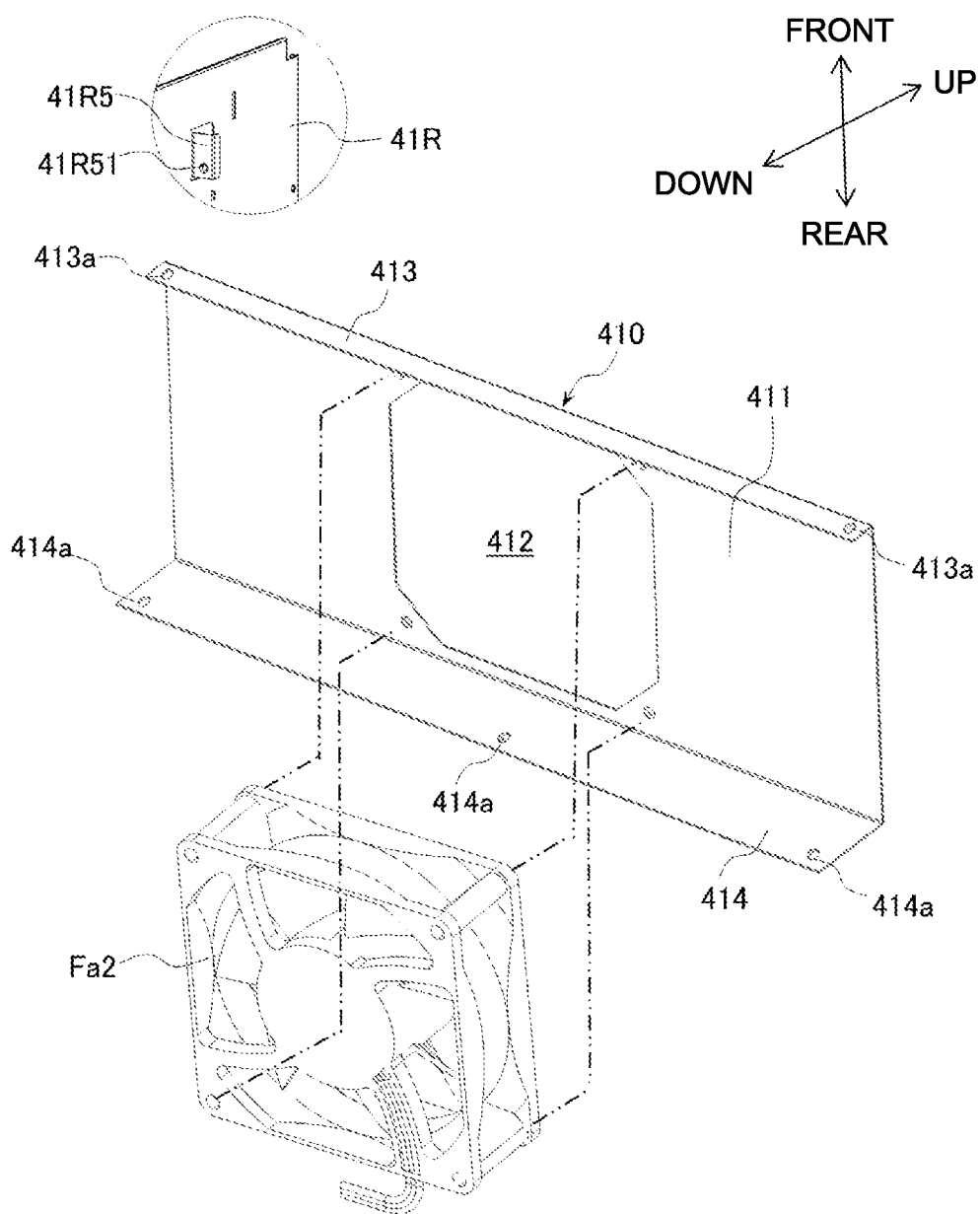
FIG. 12 is an exploded diagram of an internal upper fan and an attachment member.

The internal upper fan Fa2 disposed above the rear end of the meck lock member 100 is a box fan. As illustrated in FIG. 5, the internal upper fan Fa2 is attached to an attachment member 410 made of a thin steel plate while facing downward, and is installed across the pair of right and left rack side plates 41, 41 through the attachment member 410. As illustrated in FIG. 12, the attachment member 410 is provided with an opening 412 at a substantially center position on a base 411 corresponding to the width between the pair of right and left rack side plates 41, 41. A front flange 413 and a rear flange 414 are formed at front and rear ends of the base 411 by bending. Screw holes 413a, 413a are provided at right and left ends of the front flange 413. Lock pieces 41R5 (refer to FIGS. 4 and 6) cut and erected inward are formed at the rear side rack members 41R of the pair of right and left rack side plates 41, 41 in a manner corresponding to the screw holes 413a, 413a, and the lock pieces 41R5 are provided with screw insertion holes 41R51 (illustrated in an enlarged manner in FIG. 12). The rear flange 414 is provided with a plurality of screw insertion holes 414a distributed in the right-left direction. The internal upper fan Fa2 is positioned and screwed to the opening 412 of the base 411 of the attachment member 410, and accordingly, integrally fixed to the attachment member 410.

Figure 13:
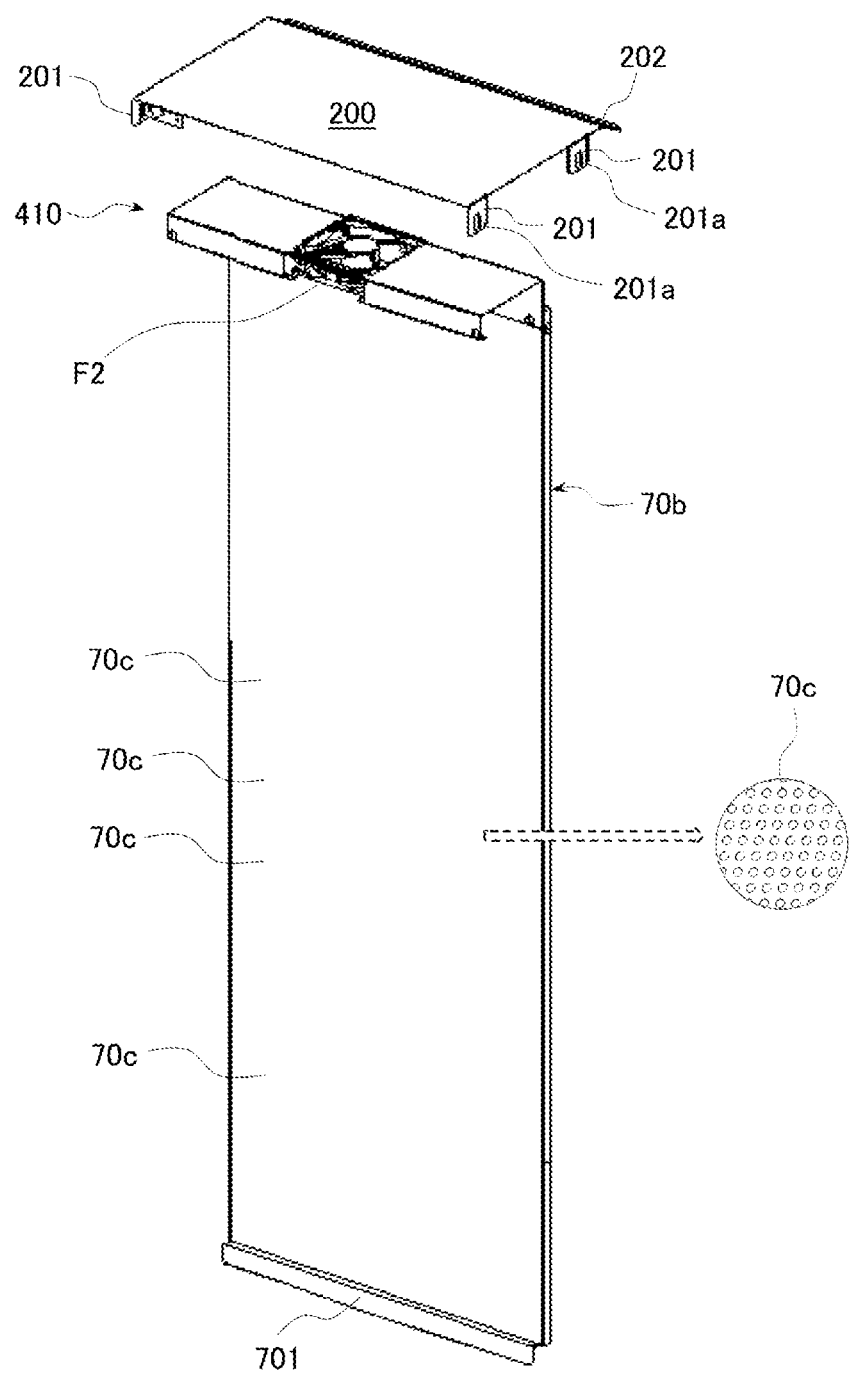
FIG. 13 is an exploded diagram illustrating the internal upper fan and a duct member (upper duct member)

As illustrated in FIG. 13, the rear flange 414 of the attachment member 410 to which the internal upper fan Fa2 is assembled is screwed to an upper part of the upper duct member 70b through the screw insertion holes 414a. The upper duct member 70b is made of a thin steel plate having a U-shaped cross-section extending in the up-down direction, and is installed across the pair of right and left rack side plates 41, 41 along the back wall 1c of the body cabinet 1. Specifically, the width of the upper duct member 70b in the right-left direction is equivalent to the width between the pair of right and left rack side plates 41, 41. The upper duct member 70b is installed across the pair of right and left rack side plates 41, 41 by screwing right and left leg pieces (flanges) of the U shape to the rear side rack members 41R of the pair of right and left rack side plates 41, 41. In addition, a plurality of ventilation holes 70c are drilled in a distributed manner from a central region of a plate surface of the upper duct member 70b in the up-down direction to a lower region. The central region of the plate surface of the upper duct member 70b in the up-down direction corresponds to a substantially middle part (in the present embodiment, the fifth product housing shelf 10 from the bottom) of the product housing shelves 10 disposed at multiple rungs in the up-down direction, and the ventilation holes 70c are provided in a manner corresponding to the product housing shelves 10 lower than the middle part among the product housing shelves 10 disposed at multiple rungs in the up-down direction. As illustrated in an enlarged manner in FIG. 13, the ventilation holes 70c are formed as circular holes perforated through the plate surface. An engagement piece 701 including a step is provided at a lower end of the plate surface of the upper duct member 70b. The engagement piece 701 faces the front surface of an upper part of the lower duct member 70a, and a cushion (not illustrated) is bonded to the engagement piece 701 for close contact with the front surface of the upper part of the lower duct member 70a.

The internal upper fan Fa2 is installed across the pair of right and left rack side plates 41, 41 by screwing the rear flange 414 of the attachment member 410 to the upper part of the upper duct member 70b installed across the pair of right and left rack side plates 41, 41, and then facing the screw holes 413a, 413a provided at the right and left ends of the front flange 413 of the attachment member 410 to the screw insertion holes 41R51, 41R51 provided to the lock pieces 41R5, 41R5 (refer to FIGS. 4 and 6) cut and erected inward at the rear side rack members 41R of the pair of right and left rack side plates 41, 41, and screwing screws into the holes.

FIG. 13 also illustrates the shield member 200 positioned above the internal upper fan Fa2 with an interval therebetween. The shield member 200 prevents internal air moving up through the upper duct member 70b from directly contacting the top wall 1a of the body cabinet 1. The shield member 200 is made of a thin steel plate having a rectangular flat plate shape of a width substantially equal to the width between the pair of right and left rack side plates 41, 41. A pair of front and rear attachment pieces 201 bent to extend downward are provided at right and left ends of the shield member 200. Engagement pieces 201a are formed at the attachment pieces 201 by cutting and erecting. The shield member 200 is disposed between the pair of right and left rack side plates 41, 41 and then installed across the pair of right and left rack side plates 41, 41 by inserting the engagement pieces 201a provided to the pair of front and rear attachment pieces 201 into lock holes 41R6 (refer to FIG. 6B) provided to the rear side rack members 41R of the pair of right and left rack side plates 41, 41, and bending the engagement pieces 201a protruding outside the rear side rack member 41R. A guide plate 202 tilted downward is integrally provided at a rear end of the shield member 200 to guide, to the front side, internal air moving up through the upper duct member 70b.

Figure 14:
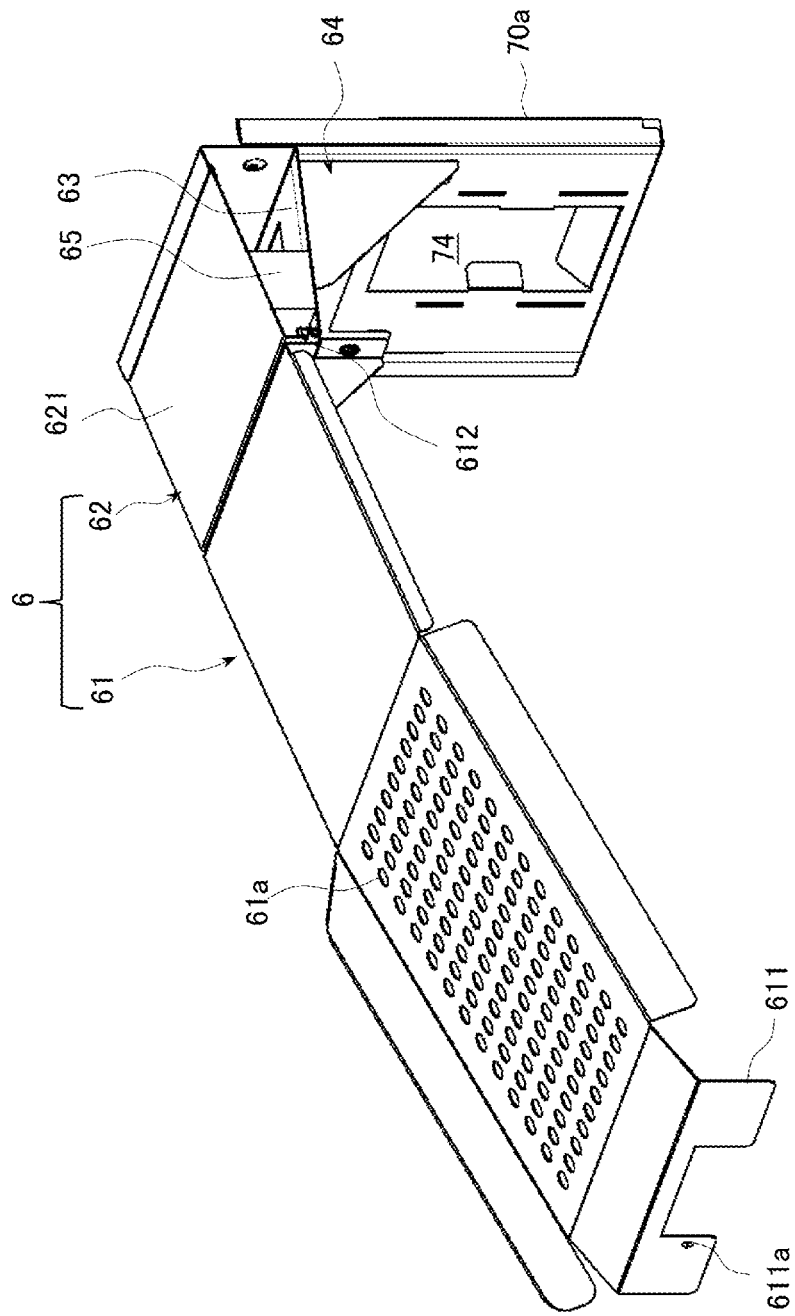
FIG. 14 is a perspective view of a product discharge shooter and a lower duct member in FIG. 1 when viewed obliquely to the right from the upper side.
Figure 15:
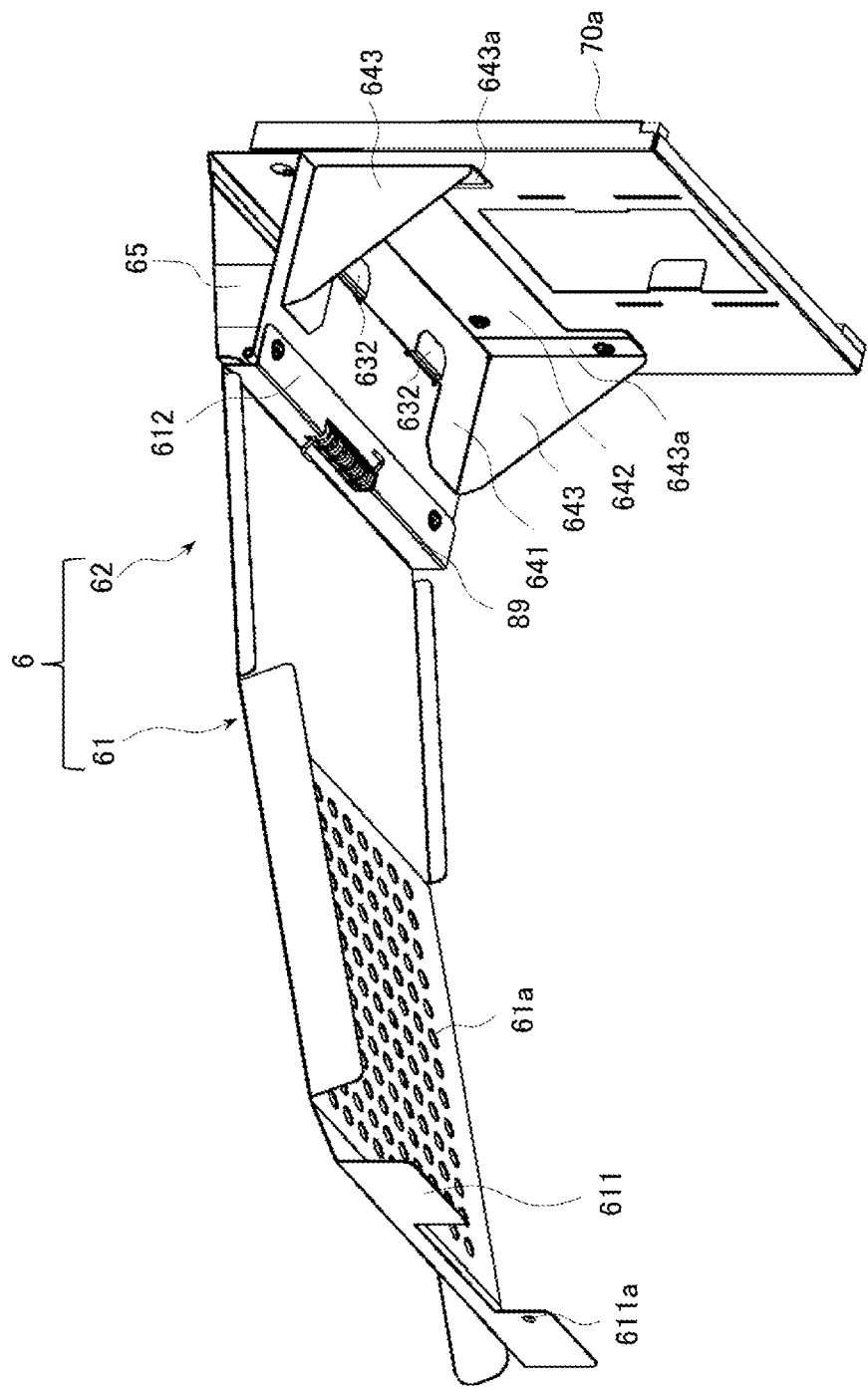
FIG. 15 is a perspective view of the product discharge shooter and the lower duct member in FIG. 14 when viewed from the back surface side.

FIGS. 14 to 17 illustrate the product discharge shoot 6 disposed at the lower part of the product housing rack 4 and the lower duct member 70a continuous with the wind tunnel 40 of the cooling-heating unit 7 (refer to FIG. 1). As illustrated in FIG. 14, the product discharge shoot 6 includes a main shoot 61 and a sub shoot 62 that are each made of a steel plate, the sub shoot 62 is continuous on the rear side of the main shoot 61, and a plate surface of the sub shoot 62 is higher than a plate surface of the main shoot 61.

A plurality of vent holes 61a are perforated through the plate surface of the main shoot 61. The vent holes 61a are perforated at a middle part and a front part side of the main shoot 61 except for a rear part side thereof. A fixation part 611 bent downward is formed at a front end of the main shoot 61. The fixation part 611 extends along the front wall of the body cabinet 1 and is screwed to the front wall of the body cabinet 1 through a screw insertion hole 611a formed at a plate surface thereof. In addition, an attachment part 612 (refer to FIGS. 15 and 16) bent downward and rearward is formed at a rear end of the main shoot 61. The attachment part 612 is screwed and locked to the front side of a lower surface of a fixation clasp 63 locked to a reinforcement clasp 64 screwed to the lower duct member 70a.

The fixation clasp 63 is placed on the reinforcement clasp 64 screwed to the lower duct member 70a, and two hook pieces 632, 632 are formed at a plate surface thereof. In addition, a pair of right and left shaft insertion parts 63a, 63a (refer to FIG. 16) having hollow cylindrical shapes (curl shapes) protrude upward at right and left ends of a front edge of the fixation clasp 63. In addition, a cover part 6311 bent forward is formed at an upper part of a rear flange 631 of the fixation clasp 63.

The reinforcement clasp 64 includes a top plate 641, a back plate 642, and right and left side plates 643, 643 including flanges 643a. When opened, the reinforcement clasp 64 has the shape of a human having arms with loose sleeves, and the head, shank, and arms of the human correspond to the top plate 641, the back plate 642, and the right and left side plates 643 whereas the arm sleeves correspond to flanges of right and left sidewalls. In the reinforcement clasp 64, the flanges 643a of the right and left side plates 643, 643 are welded to the back plate 642 so that the top plate 641 is substantially horizontal. The top plate 641 and the back plate 642 are formed in recessed shapes so that the two hook pieces 632, 632 of the fixation clasp 63 are engaged with the recess of the top plate 641. The back plate 642 is formed in the recessed shape to prevent blockage of the entrance side opening 74 formed at a front surface wall 71 of the lower duct member 70a to be described later.

Figure 16:
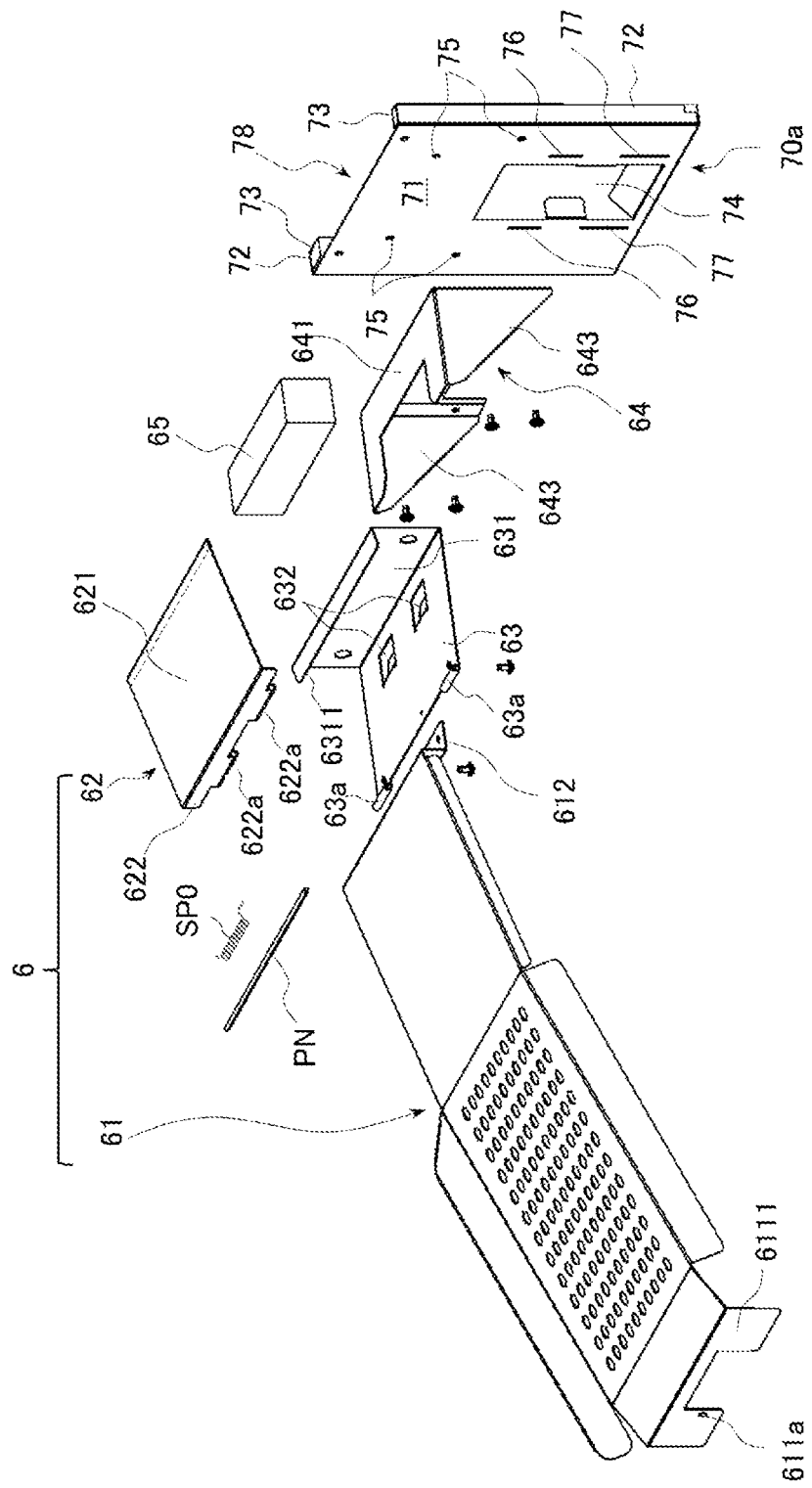
FIG. 16 is an exploded diagram illustrating the configuration of the product discharge shooter and the lower duct member in FIG. 14.
Figure 17:
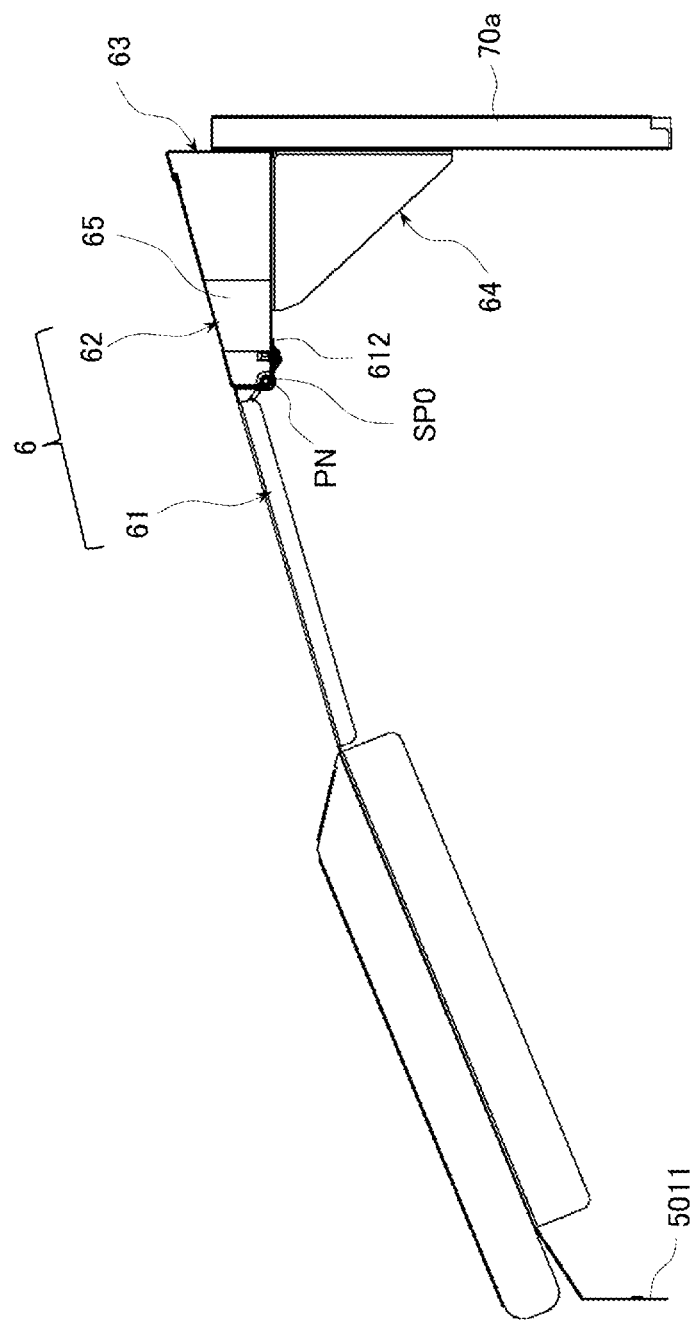
FIG. 17 is a side view of the product discharge shooter and the lower duct member in FIG. 14.

The sub shoot 62 continuous on the rear side of the main shoot 61 is formed as a plate including a landing surface 621 having a rectangular shape of a width substantially equal to the width of the main shoot 61. As illustrated in FIG. 16, a pair of right and left shaft insertion parts 622a, 622a having hollow cylindrical shapes (curl shapes) protrude downward at a lower edge of a flange 622 bent downward from a front edge of the landing surface 621 of the sub shoot 62. The pair of right and left curl-shaped shaft insertion parts 622a, 622a are positioned between the pair of right and left curl-shaped shaft insertion parts 63a, 63a formed at the front edge of the fixation clasp 63. The sub shoot 62 is swingably coupled with the fixation clasp 63 by positioning the pair of right and left curl-shaped shaft insertion parts 622a, 622a between the pair of right and left curl-shaped shaft insertion parts 63a, 63a of the fixation clasp 63 and then inserting a pin PN (refer to FIG. 16) into the members. A torsional coil spring SP0 (refer to FIG. 16) is wound around the pin PN. The torsional coil spring SP0 has one end locked to the fixation clasp 63 and the other end locked to the sub shoot 62, thereby applying pressing force to the sub shoot 62 in a direction separating from the fixation clasp 63. Accordingly, the sub shoot 62 receives the pressing force of the torsional coil spring SP0 and swings in the up-down direction with the pin PN as a pivot. Upward swing of the sub shoot 62 is regulated when a rear end of the sub shoot 62 contacts the cover part 6311 bent forward at an upper part of the rear flange 631 of the fixation clasp 63. In this manner, the position where the upward swing is regulated is a moved-up standby position of the sub shoot 62. Accordingly, the sub shoot 62 is formed as a movable type to which the pressing force of the torsional coil spring SP0 is applied so that the sub shoot 62 returns to the moved-up standby position. Although it is ideal that the landing surface 621 of the sub shoot 62 is flush with the plate surface of the main shoot 61 at the moved-up standby position of the sub shoot 62, the landing surface 621 of the sub shoot 62 is positioned slightly higher than the plate surface of the main shoot 61 to prevent the landing surface 621 of the sub shoot 62 from becoming lower than the plate surface of the main shoot 61 due to assembly error or the like. The torsional coil spring SP0 preferably has relatively weak pressing force sufficient to return the sub shoot 62 to the moved-up standby position but not to bounce a product falling on the rear end side of the sub shoot 62.

A cushion 65 is disposed between the sub shoot 62 and a plate surface of the fixation clasp 63. As illustrated in FIG. 16, the cushion 65 has a rectangular column shape and is bonded to the fixation clasp 63. The cushion 65 is preferably made of low-rebounding foamed rubber.

In this manner, the sub shoot 62 is moved up by the pressing force of the torsional coil spring SP0 in the standby state, and the product discharge shoot 6 returns to the standby position while the rear end of the sub shoot 62 is in contact with the cover part 6311 bent forward at the upper part of the rear flange 631 of the fixation clasp 63. The cushion 65 bonded to the fixation clasp 63 absorbs an impact load when a product falls on the sub shoot 62.

As illustrated in FIG. 16, the lower duct member 70a is made of a thin steel plate formed in a recessed cross-section shape and includes the front surface wall 71 having a rectangular flat plate shape and right and left sidewalls 72, 72, and cushions 73, 73 are bonded to inner sides of the right and left sidewalls 72, 72. Near a substantially central lower part of the front surface wall 71, the entrance side opening 74 communicating with the exit of the wind tunnel 40 is formed, and a pair of upper and lower screw holes 75, 75 to which the reinforcement clasp 64 is fixed are formed. In addition, a pair of upper and lower slit lock grooves 76 and 77 to which the wind tunnel 40 is locked are formed at right and left ends of the entrance side opening 74.

Figure 18:
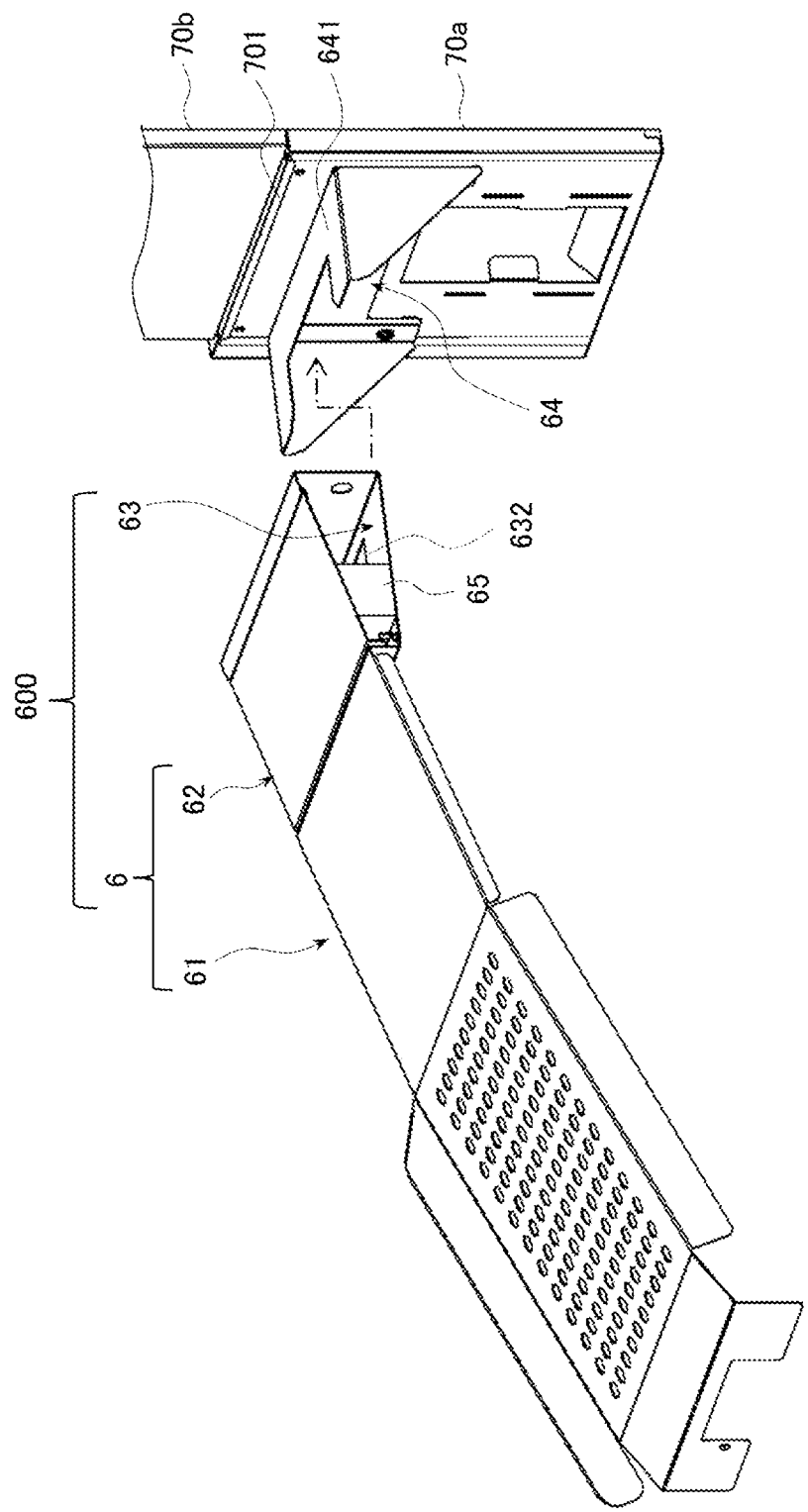
FIG. 18 is a main-part perspective view illustrating coupling of the lower duct member and the upper duct member and assembly of the product discharge shooter.

The lower duct member 70a is disposed such that its lower end is placed on the bottom wall 1d of the body cabinet 1 and the right and left sidewalls 72, 72 are bonded to the back wall 1c of the body cabinet 1 by a double-sided adhesive tape, a space surrounded by the front surface wall 71 and the right and left sidewalls 72, 72 of the lower duct member 70a and the back wall 1c of the body cabinet 1 is a path through which internal air flows, and its upper end is the exit side opening 78 communicating with a lower end of the upper duct member 70b. FIG. 18 illustrates the upper duct member 70b, and the engagement piece 701 provided at the lower end of the upper duct member 70b is disposed in an overlapping manner at a front surface upper part of the front surface wall 71 of the lower duct member 70a disposed along the back wall 1c of the body cabinet 1. Accordingly, the upper duct member 70b communicates with the exit side opening 78 of the lower duct member 70a.

The upper duct member 70b is installed across the right and left rack side plates 41, 41, and when the fixation clasp 63 is coupled with the reinforcement clasp 64 at the timing of housing the product housing rack 4 in the product storage, the product housing rack 4 (the upper duct member 70b) cannot be housed in the product storage due to interference with the fixation clasp 63. Thus, the fixation clasp 63 is configured as a module integrated with the product discharge shoot 6, and the product discharge shoot 6 as a module is disposed after the product housing rack 4 is housed in the product storage. Specifically, as illustrated in FIG. 18, the fixation clasp 63 to which the cushion 65 is bonded is coupled with the sub shoot 62 when the pin PN around which the torsional coil spring SP0 is wound is inserted into the shaft insertion parts 63a, 63a and the shaft insertion parts 622a, 622a of the sub shoot 62, and the fixation clasp 63 is coupled with the main shoot 61 while the attachment part 612 formed at the rear end of the main shoot 61 is locked to a front side lower surface of the fixation clasp 63 by screwing, and accordingly, the fixation clasp 63 is formed as a module that is a shoot unit 600 together with the product discharge shoot 6. The reinforcement clasp 64 is screwed to the lower duct member 70a and disposed in the product storage in advance when the lower duct member 70a is disposed along the back wall 1c of the body cabinet 1 in a process before the product housing rack 4 is housed in the product storage. Then, the product housing rack 4 is housed in the product storage, and then the shoot unit 600 is disposed in the product storage when the two hook pieces 632, 632 provided to the fixation clasp 63 are engaged with a recess of the top plate 641 of the reinforcement clasp 64 fixed to the lower duct member 70a, and the fixation part 611 provided at the front end of the main shoot 61 is screwed to the front wall of the body cabinet 1.

In this manner, since the fixation clasp 63 is placed on the top plate 641 of the reinforcement clasp 64 by engaging the two hook pieces 632, 632 provided to the plate surface of the fixation clasp 63 with the top plate 641 of the reinforcement clasp 64 and is separable from the reinforcement clasp 64 by removing the two hook pieces 632, 632 from the top plate 641, the product discharge shoot 6 that can absorb an impact load when a product falls on the sub shoot 62 through the cushion 65 bonded to the fixation clasp 63 and the torsional coil spring SP0 wound around the pin PN coupling the fixation clasp 63 and the sub shoot 62 can be appropriately provided.

The sub shoot 62 does not necessarily need to be swingably and pivotally supported to the fixation clasp 63 but may be coupled with the main shoot 61 through a hinge and configured to return to the standby position by a spring member.

As described above, a product discharged in the product housing path 43 by the product discharge device 5 is provided with fall speed reduction and posture correction by the posture control plate 47 (refer to FIG. 1) before falling on the landing surface 621 (refer to FIG. 14) of the sub shoot 62 of the product discharge shoot 6. When the product falls on the landing surface 621 of the sub shoot 62, the cushion 65 shrinks to allow the sub shoot 62 to move down and absorb a fall impact (component force in the perpendicular direction) of the product. Then, the product, the fall impact (component force in the perpendicular direction) of which when the product falls on the sub shoot 62 is absorbed by the cushion 65, rolls or slides from the sub shoot 62 to the main shoot 61 by a component force of moving toward the front side, and then is sent from the main shoot 61 to the product take-out port 2a of the outer door 2 after the product presses and opens the take-out port flapper 3b of the inner-door discharge port 3a provided to the heat-insulating inner door 3 illustrated in FIG. 1. After the product moves from the sub shoot 62 to the main shoot 61, the sub shoot 62 is moved up and returned to the standby position by the restoring force of the cushion 65. Since the cushion 65 is low-rebounding, the product does not rebound when falling on the sub shoot 62, thereby suppressing foaming generation of drink in which carbon dioxide gas is mixed.

Figure 19:
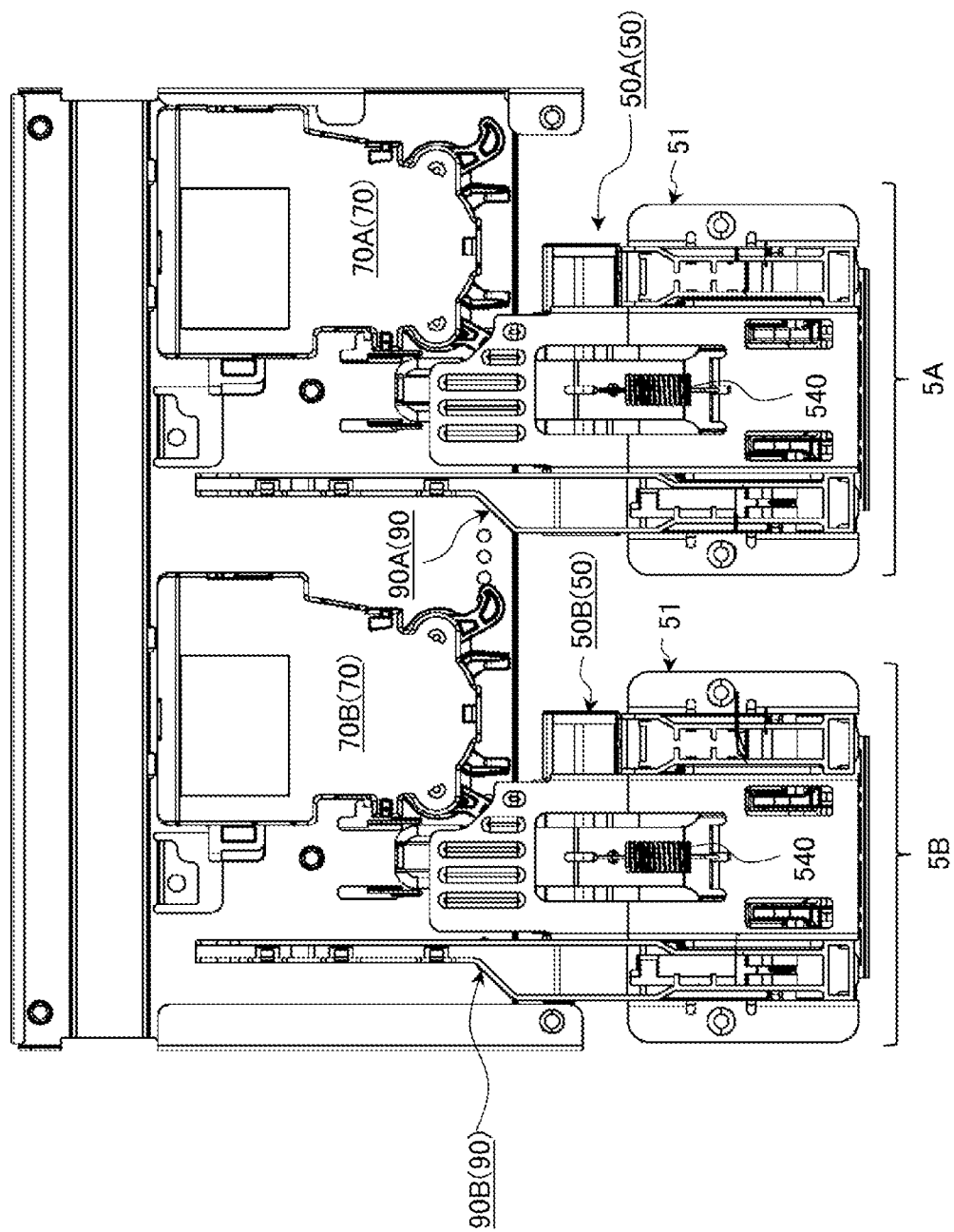
FIG. 19 is a plan view of the product discharge device in FIG. 8.
Figure 20:
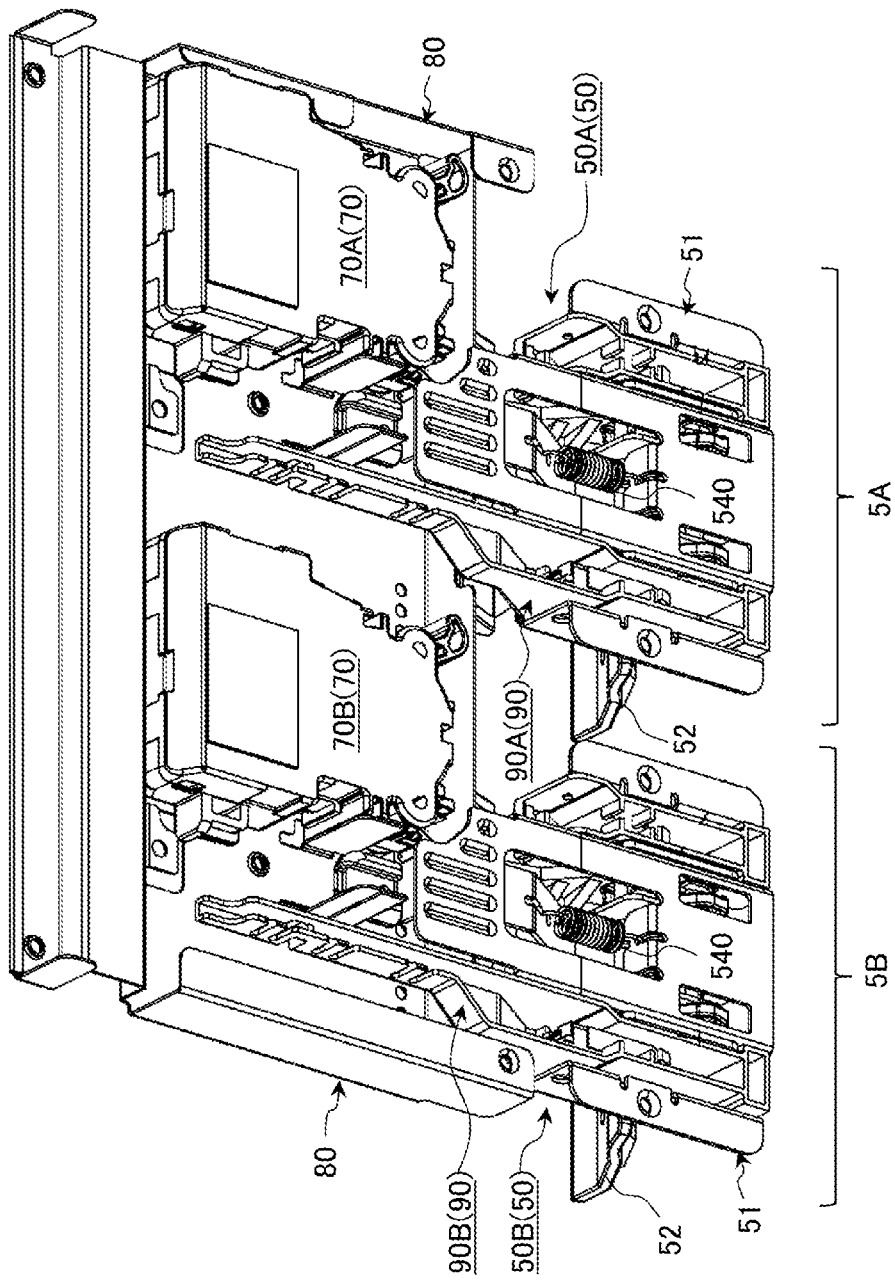
FIG. 20 is a perspective view of the product discharge device in FIG. 19 when viewed obliquely to the right from the upper side.
Figure 21:
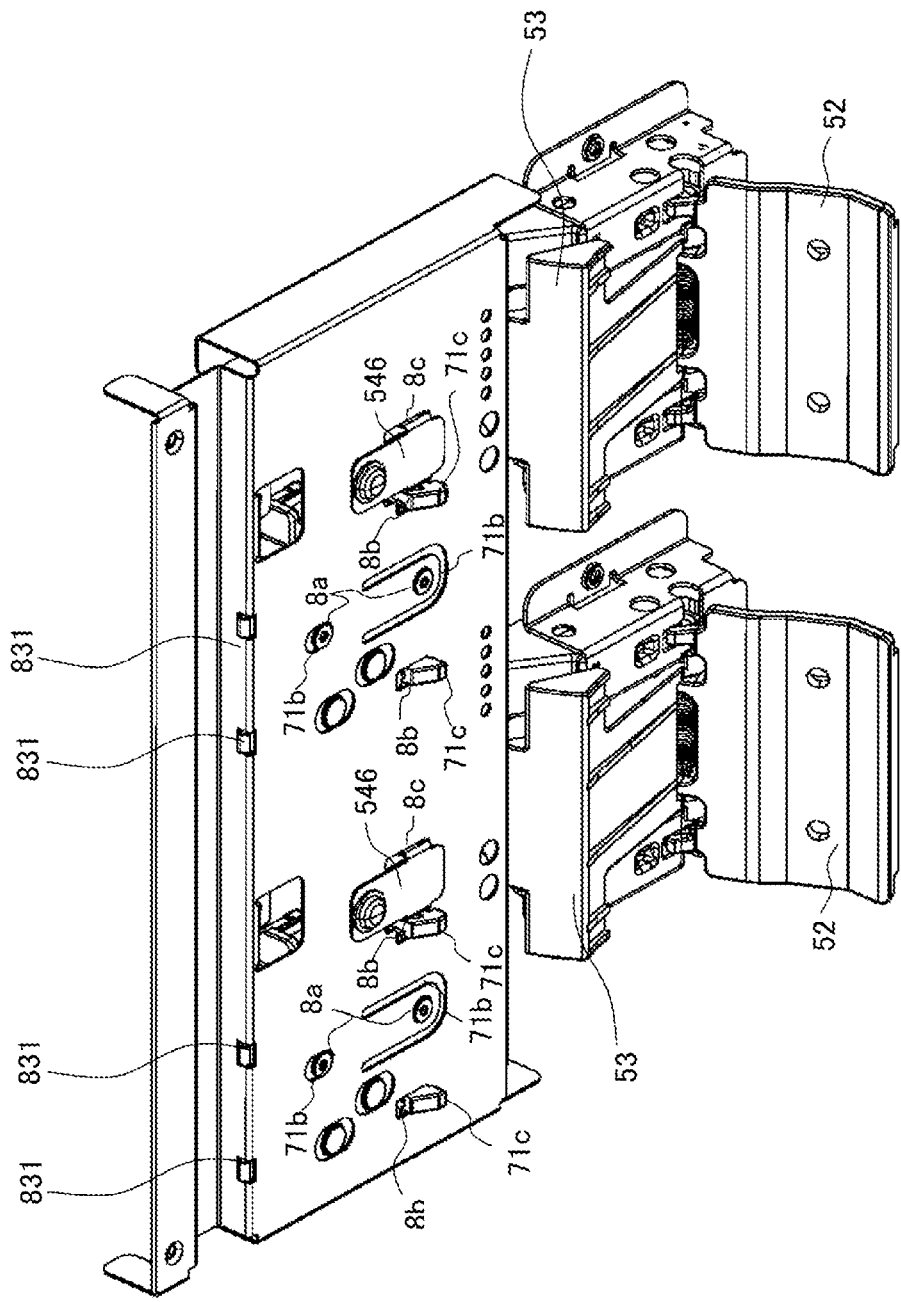
FIG. 21 is a perspective view of the product discharge device in FIG. 19 when viewed from the back surface.

The following describes the configuration of the product discharge device 5 with reference to FIGS. 19 to 27. In the present embodiment, the product discharge device 5 includes product discharge devices 5A and 5B as illustrated in FIGS. 19 and 20. The product discharge devices 5A and 5B of the present embodiment are applicable to a case in which a product housing path (product column) corresponding to the length of a long-size product or two lines of product housing paths (product columns) each having a width corresponding to a half-size product having substantially half the length of a long-size product are partitioned and set on the product housing shelf 10 by operating the partition members 42 described above as appropriate. The product discharge devices 5A and 5B respectively include delivery mechanisms 50A and 50B, motor drive units (drive devices) 70A and 70B configured to drive the delivery mechanisms 50A and 50B, and wiring guides 90A and 90B including sold-out detection switches 91 for the delivery mechanisms 50A and 50B. Each pair of the delivery mechanisms 50A and 50B, the motor drive units (drive devices) 70A and 70B, and the wiring guides 90A and 90B including the sold-out detection switches 91 have identical configurations between the product discharge devices 5A and 5B, and thus in the following, the components on the delivery mechanism 50A side will be mainly described, and the reference signs "A" and "B" are omitted for any component identical to both members, but the reference signs "A" and "B" are attached to the component when both members are to be distinguished.

Figure 32:
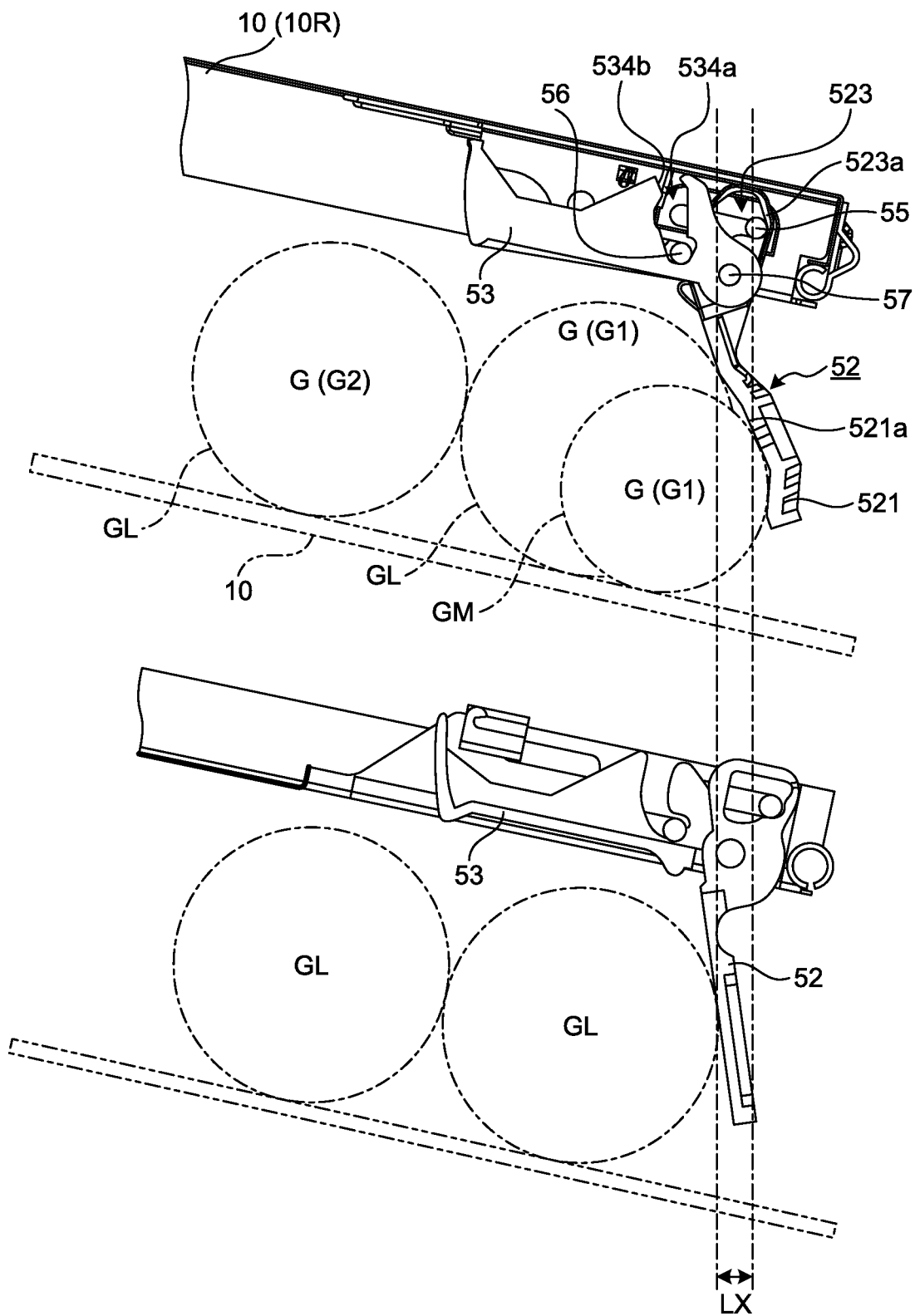
FIG. 32 illustrates the operation of the delivery mechanism in the product discharge device in a vending standby state: the upper part is an operation explanatory diagram of the present embodiment; and the lower part is an operation explanatory diagram of a comparative example.

The delivery mechanism 50 of the product discharge device 5 includes a first stopper member 52 (refer to FIGS. 21 and 22, for example) pivotally supported to a rotation shaft 57 (refer to FIG. 22, for example) to be capable of freely appearing in the product housing path 43 and provided to be movable between a protrusion position where the first stopper member 52 protrudes in the product housing path 43 to hold a product of the first vending order (product at the rearmost end as illustrated in FIG. 32 to be described later, and also referred to as a product G) and a retracted position where the first stopper member 52 is retracted from the product housing path 43 to release holding of the product G, a second stopper member 53 (refer to FIGS. 21 and 22, for example) pivotally supported to the rotation shaft 57 to be capable of freely appearing in the product housing path 43 and provided to be movable between a retracted position where the second stopper member 53 is retracted from the product housing path 43 and a protrusion position where the second stopper member 53 protrudes in the product housing path 43 to hold a product of the second vending order (product following the product at the rearmost end and also referred to as a next product) following the product G, and a link mechanism 54 that supports a front part link pin 56 (refer to FIG. 22, for example) and a rear part link pin 55 (refer to FIG. 22, for example) configured to move each of the first stopper member 52 and the second stopper member 53 to the protrusion position and the retracted position and is pressed toward a rear position by a return spring 540 (refer to FIGS. 19 and 22, for example). The delivery mechanism 50 also includes a mechanism unit holder 51 for holding the rotation shaft 57, the rear part link pin 55, and the front part link pin 56. The first stopper member 52 and the second stopper member 53 are rotatably attached through the rotation shaft 57 held by the mechanism unit holder 51, and the link mechanism 54 is attached to be freely movable in the front-and-rear direction through the rear part link pin 55 and the front part link pin 56 held by the mechanism unit holder 51.

Figure 23A:
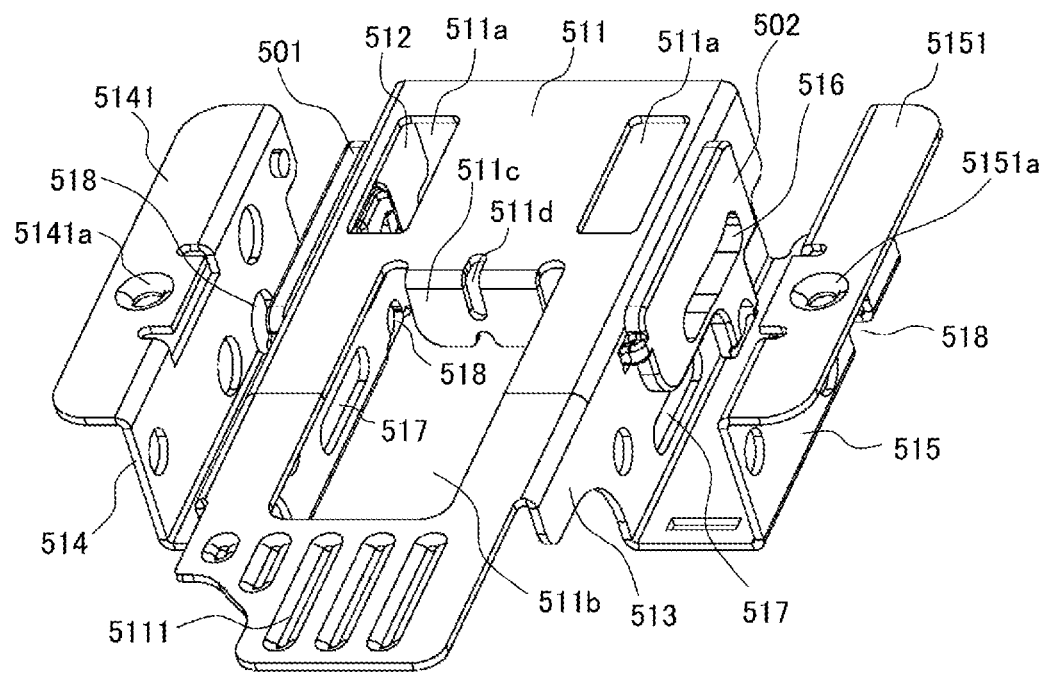
FIGS. 23A and 23B illustrate a mechanism unit holder of the product discharge device.
Figure 23B:
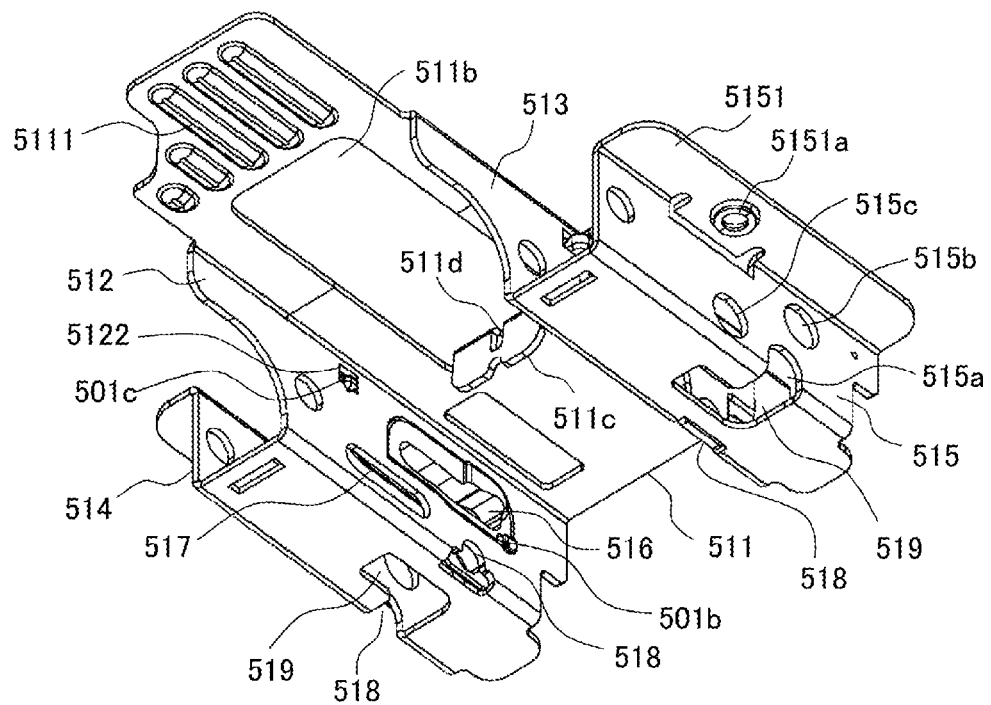

As illustrated in FIGS. 23A and 23B, the mechanism unit holder 51 has a box shape having a bottom surface and a front-and-rear surface opened, and includes a ceiling wall 511 and right and left sidewalls 512 and 513. A guide wall 514 is provided continuously with the left sidewall 512 to form a concave groove together with the left sidewall 512. A leading end side (free end side) of the guide wall 514 is formed as an attachment piece 5141 bent outward at a right angle in a horizontal flat surface, and a screw hole 5141a is drilled through the attachment piece 5141. A guide wall 515 is provided to the right side wall 513 to form a concave groove together with the right side wall 513. A leading end side (free end side) of the guide wall 515 is formed as an attachment piece 5151 bent outward at a right angle in a horizontal flat surface, and a screw hole 5151a is drilled through the attachment piece 5151.

Elongate holes 516 and 517 extending in the front-and-rear direction are provided in a step shape to each of the right and left sidewalls 512 and 513. The elongate holes 517 are directly formed through the right and left sidewalls 512 and 513, but the elongate holes 516 are formed at bearing members 501 and 502 made of synthesis resin and fitted to windows 5121 and 5131 (refer to FIGS. 24A and 24B) opened the right and left sidewalls 512 and 513. The elongate holes 516 and 517 slidably support, in the front-and-rear direction, the rear part link pin 55 and the front part link pin 56, respectively, supported by the link mechanism 54 related to the delivery mechanism 50 of the product discharge device 5. In addition, a support shaft hole 518 is formed at a position on the rear side of the elongate hole 516 and below the elongate hole 517 on each of the right and left sidewalls 512 and 513 and the guide walls 514 and 515. The support shaft hole 518 extends to a bottom wall of a concave groove formed between each of the right and left sidewalls 512 and 513 and the corresponding one of the guide walls 514 and 515. The support shaft holes 518 support the common rotation shaft 57 related to the first stopper member 52 and the second stopper member 53.

Figure 24A:
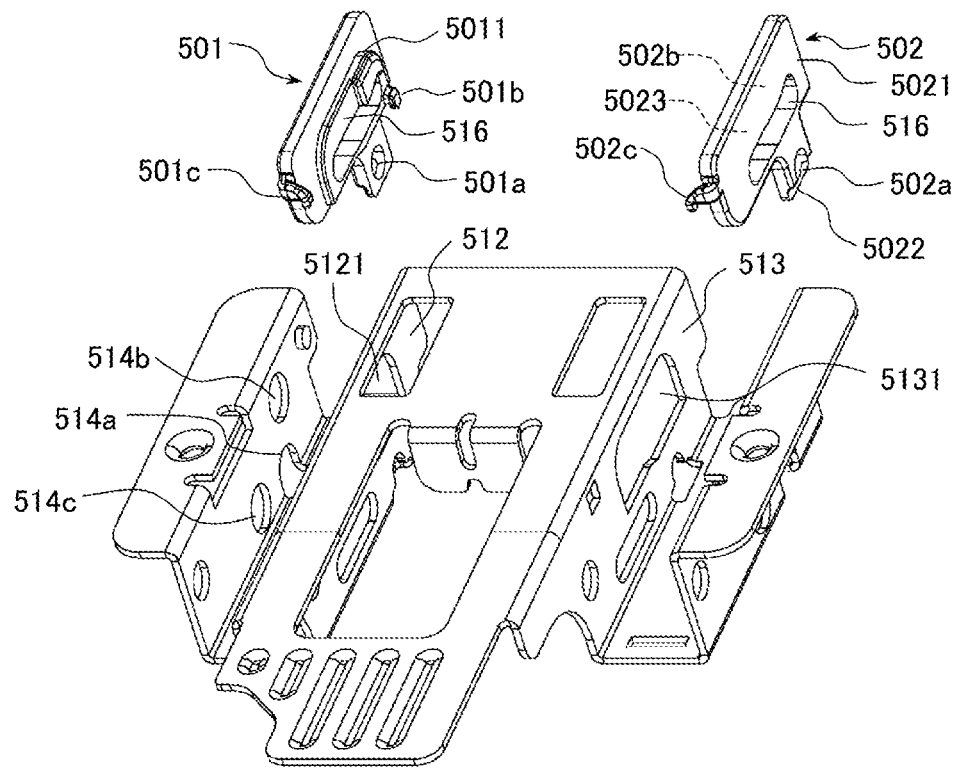
FIGS. 24A and 24B illustrate the mechanism unit holder.
Figure 24B:
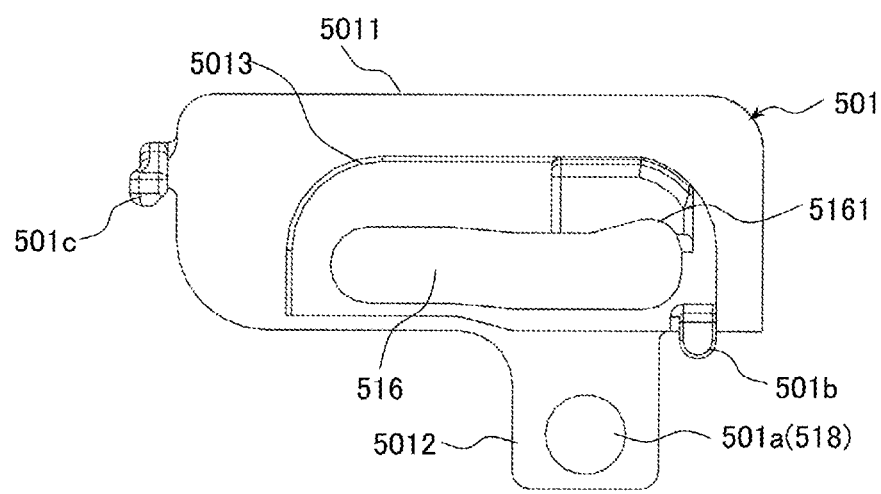

As illustrated in FIG. 24B, the bearing member 501 includes a body part 5011 and a leg piece part 5012, the elongate hole 516 is formed at the body part 5011, and a shaft insertion hole 501a is formed at the leg piece part 5012. One side surface (front-view right side surface) of the body part 5011 at which the elongate hole 516 is formed includes an engagement part 5013 matching the shape of the window 5121 opened through the left sidewall 512 of the mechanism unit holder 51 and has a height corresponding to the plate thickness of the left sidewall 512, and a hook click 501b facing downward is formed at a rear-end lower part of the engagement part 5013. In addition, a hook click 501c facing right is formed at a front edge of the body part 5011. The bearing member 501 is locked and fixed to the left sidewall 512 when the engagement part 5013 is engaged with the window 5121 by hooking the hook click 501b to a window edge of the window 5121 of the left sidewall 512 and the hook click 501c is engaged with a rectangular lock hole 5122 (refer to FIG. 23B) formed at the left sidewall 512. In this case, the shaft insertion hole 501a provided at the leg piece part 5012 and the support shaft hole 518 formed at the left sidewall 512 are coaxially positioned, and the bearing member 501 is prevented from falling off when the rotation shaft 57 is inserted to the shaft insertion hole 501a. The bearing member 502 has a configuration symmetric to that of the bearing member 501 in the right-left direction, and as illustrated in FIG. 24A, includes an engagement part 5023, a shaft insertion hole 502a, a hook click 502b, and a hook click 502c (in the drawing, the engagement part 5023 and the hook click 502c are hidden behind a body part 5021, and thus a pullout line is illustrated with a dotted line). The bearing member 502 is locked and fixed to the right side wall 513 through work same as that for the bearing member 501.

As illustrated in FIG. 24B, the elongate holes 516, 516 formed at each of the bearing members 501 and 502 are provided, at a rear side part (part corresponding to the rear position of the rear part link pin 55 slidable in the front-and-rear direction) in the front-and-rear direction, with load reduction parts 5161 curved in a direction separating from the shaft insertion holes 501a and 502a corresponding to the support shaft holes 518. The load reduction parts 5161 reduce a product load on the rear part link pin 55 holding (locking), at the protrusion position where the first stopper member 52 protrudes in the product housing path 43, the first stopper member 52 that rotates, as a pivot, the rotation shaft 57 moved to the rear position (rear side part of the elongate hole 516) and inserted into the support shaft holes 518, by moving the rear part link pin 55 in a direction separating from the rotation shaft 57 inserted into the support shaft holes 518. In addition, force that cancels the lock state can be reduced as the product load on the rear part link pin 55 is reduced.

In addition, an opening 519 is formed near the support shaft hole 518 on the bottom wall of the concave groove formed between each of the right and left sidewalls 512 and 513 and the corresponding one of the guide walls 514 and 515. The opening 519 faces a protrusion 525 of the first stopper member 52 illustrated in FIG. 25 to be described later.

The hole periphery of each of the elongate holes 517 and the support shaft holes 518 provided to the mechanism unit holder 51 is provided with Hemming fabrication or barring fabrication to reduce friction between the front part link pin 56 and the rotation shaft 57. In the embodiments, the elongate holes 516 are formed at bearing members 5132 made of synthesis resin but may be directly formed at the right and left sidewalls 512 and 513 like the elongate holes 517.

A pair of right and left openings 511a, 511a are formed on a rear end side of the ceiling wall 511 of the mechanism unit holder 51, and a top window 511b is formed closer to a front side of the ceiling wall 511. Each of the openings 511a, 511a is a clearance hole of a bearing 522 (refer to FIG. 25 to be described later) of the first stopper member 52 to be described later, and the top window 511b is provided to avoid interference with the return spring 540 that presses the link mechanism 54 toward the rear position. A tongue piece 511c extending downward is formed at a rear edge of the top window 511b and provided with a lock hole 511d formed across the ceiling wall 511 and the tongue piece 511c. One end of the return spring 540 is locked to the lock hole 511d. In addition, ribs 5111 (five ribs in the present embodiment) protruding downward are formed on the ceiling wall 511 in a front side region of the top window 511b and extend in the front-and-rear direction.

A guide hole 514a (refer to FIGS. 24A and 24B) drilled through the guide wall 514 provided continuously with the left sidewall 512, and a guide hole 515a (refer to FIG. 23B) drilled through the guide wall 515 provided continuously with the right side wall 513 are used when the rotation shaft 57 is installed across the support shaft hole 518 provided at the right and left sidewalls 512 and 513. In addition, guide holes 514b and 514c (refer to FIGS. 24A and 24B) drilled through the guide wall 514 provided continuously with the left sidewall 512, and guide holes 515b and 515c (refer to FIG. 23B) drilled through the guide wall 515 provided continuously with the right side wall 513 are used when the rear part link pin 55 and the front part link pin 56 are installed across the elongate holes 516 and 517 provided at the right and left sidewalls 512 and 513.

The mechanism unit holder 51 is directly attached to the product housing shelf 10 by pivotally supporting the first stopper member 52 and the second stopper member 53 through the rotation shaft 57 held in the support shaft holes 518 formed at the right and left sidewalls 512 and 513 and the guide walls 514 and 515, coupling the link mechanism 54 with the rear part link pin 55 and the front part link pin 56 inserted into the elongate holes 516 and 517 formed at the right and left sidewalls 512 and 513, contacting the attachment pieces 5141 and 5151 extending outward from the guide walls 514 and 515 with back surfaces of fixation parts 125 and 126 or fixation parts 127 and 128 (refer to FIGS. 7 and 9) formed as recessed parts closer to the rear side of the rear side shelf member 10R described above, and then screwing screws into the screw holes 5141*a* and 5151*a* provided at the attachment pieces 5141 and 5151 through screw insertion holes 125*a* and 126*a* or screw insertion holes 127*a* and 128*a* provided at bottom surfaces of the recessed parts.

Figure 25:
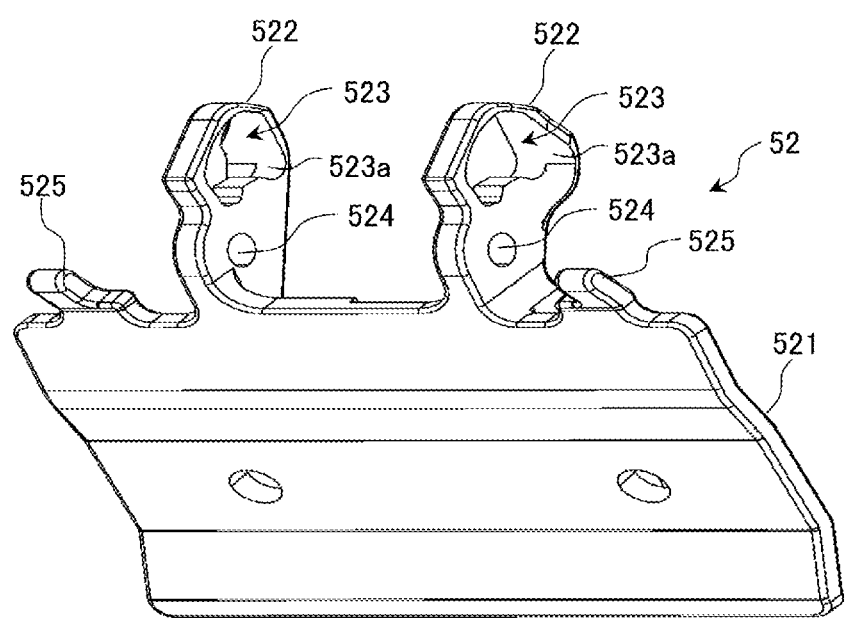
FIG. 25 is a perspective view illustrating a first stopper member.

As illustrated in FIG. 25, the first stopper member 52 included in the delivery mechanism 50 in the product discharge device 5 is made of synthesis resin (for example, polyacetal) and obtained by integrally forming a holding portion 521 having a longitudinal section in a concave shape, and the two bearings 522 extending from a base end side of the holding portion 521 in a direction opposite to the holding portion 521. The holding portion 521 having a longitudinal section in a concave shape includes a product receiving unit 521*a* recessed on a rear side. The product receiving unit 521*a* receives a large-diameter product and moves the position of a large-diameter product held by the first stopper member 52 closer to the rear end of the product housing shelf 10, thereby increasing the number of products housed in the product housing path 43. The dimension between the two bearings 522, 522 is determined to be smaller than the dimension between the right and left sidewalls 512 and 513 of the mechanism unit holder 51 described above. An odd-shaped hole 523 and a shaft insertion hole 524 are formed at each bearing 522. The rotation shaft 57 is inserted into the shaft insertion hole 524. A torsional coil spring 570 (refer to FIG. 22) is wound around the rotation shaft 57. The first stopper member 52 is constantly pressed toward the position of protrusion in the product housing path 43 by elastic pressing force of the torsional coil spring 570. The odd-shaped hole 523 allows slide movement of the rear part link pin 55 in the front-and-rear direction by allowing sliding of an end part of the rear part link pin 55 supported to the link mechanism 54, and regulates the operation range of the first stopper member 52 in cooperation with the rear part link pin 55. The odd-shaped hole 523 includes a lock groove part 523*a* (refer to FIGS. 31 and 32 to be described later as well) that contacts the rear part link pin 55 slid to the rear position (rear end positions of the elongate holes 516 provided at the right and left sidewalls 512 and 513 of the mechanism unit holder 51) and locks the first stopper member 52 to the position of protrusion in the product housing path 43.

In addition, the first stopper member 52 includes, outside the two bearings 522, 522 on the base end side of the holding portion 521, the protrusions 525 extending in the direction opposite to the holding portion 521. The interval between the protrusions 525, 525 is equal to the interval between the concave grooves formed between the right sidewall 512 and the guide wall 514 and between the left sidewall 513 and the guide wall 515 in the mechanism unit holder 51 described above. The protrusions 525, 525 enter the openings 519, 519 each formed at the bottom wall of the concave groove formed between the corresponding one of the right and left sidewalls 512 and 513 and the corresponding one of the guide walls 514 and 515 in the mechanism unit holder 51 described above when the first stopper member 52 rotates to protrude in the product housing path 43 about the rotation shaft 57 and becomes opened to the maximum opening degree.

Figure 26A:
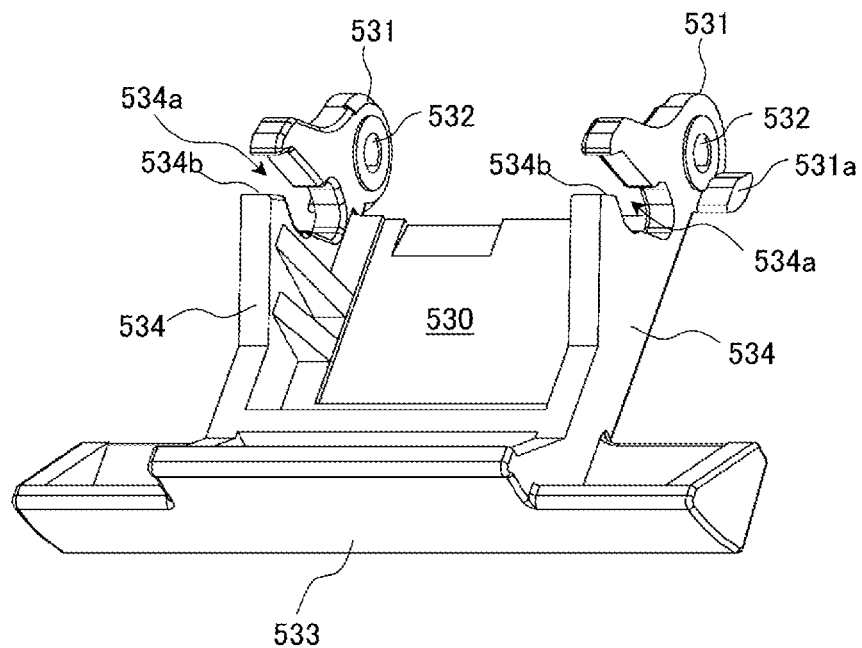
FIGS. 26A and 26B illustrate a second stopper member.
Figure 26B:
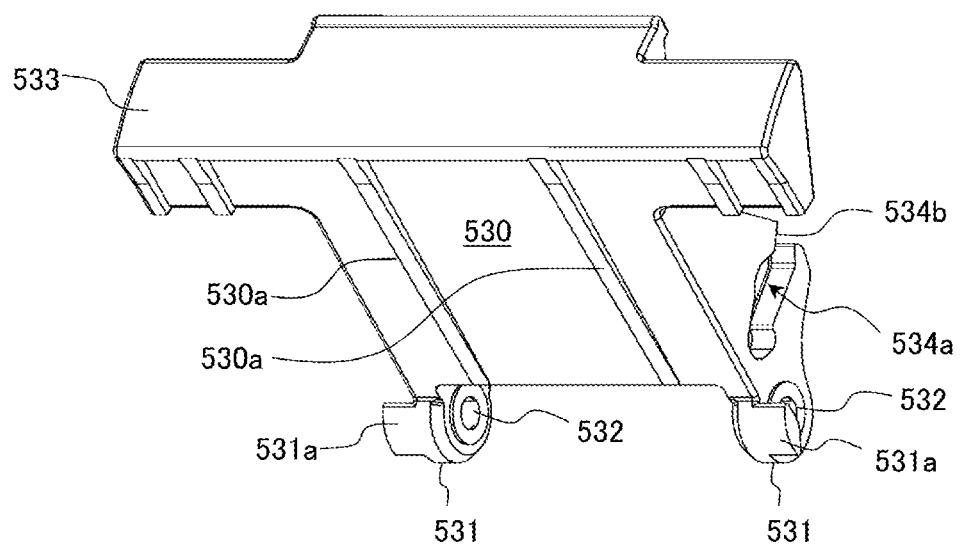

The second stopper member 53 included in the delivery mechanism 50 in the product discharge device 5 is made of synthesis resin (for example, polyacetal) and obtained by integrally shaping two pivotally support parts 531 including shaft insertion holes 532 formed on a base end part side, product holding portions 533 formed on a leading end side, and a pair of right and left stopper walls 534 formed at a shank 530 between the base end part and each holding portion 533 at the leading end as illustrated in FIGS. 26A and 26B. In each pair of right and left stopper walls 534, a slide groove 534*a* having a concave shape is formed, and a stopper surface 534*b* is formed continuously with the slide groove 534*a*. The dimension between the right and left pivotally support parts 531 is determined to be larger than the dimension between the two bearings 522 provided with the shaft insertion holes 524 of the first stopper member 52 and smaller than the dimension between the right and left sidewalls 512 and 513 of the mechanism unit holder 51 described above. In addition, a plurality of ribs 530*a* extending from the base end part toward the holding portions 533 are formed on a surface of the shank 530 adjacent to the product housing path 43.

The rotation shaft 57 is inserted into the shaft insertion holes 532 formed at the pivotally support parts 531. The holding portions 533 contact and hold a product when the second stopper member 53 protrudes in the product housing path 43. In addition, the concave slide grooves 534*a* formed at the stopper walls 534 allows sliding of the front part link pin 56 that slides in the front-and-rear direction, receive the front part link pin 56 having slid to the rear position (rear end positions of the elongate holes 517 formed at the right and left sidewalls 512 and 513 of the mechanism unit holder 51) to lock the second stopper member 53 to the position of retraction from the product housing path 43, and press the second stopper member 53 toward the product housing path 43 when the front part link pin 56 slides from the rear position to the front side. In addition, the stopper surfaces 534*b* that continue with the slide grooves 534*a* of the stopper walls 534 contact the front part link pin 56 having slid to a front position (front end positions of the elongate holes 517 formed at the right and left sidewalls 512 and 513 of the mechanism unit holder 51) to prevent the second stopper member 53 protruding in the product housing path 43 from moving toward the retracted position, and lock the second stopper member 53 to the protrusion position.

The ribs 530*a* formed at the shank 530 reduce the area of contact with the product G to support discharge of the product G at product vending. Specifically, it takes a longer time until the product G being held in a stationary state by the first stopper member 52 protruding in the product housing path 43 in the standby state starts rolling toward the product fall path 46 when the tilt angle of the product housing shelf 10 housed in the product storage is gradually reduced and the held state is canceled by the first stopper member 52 retracted from the product housing path 43 at product vending. Thus, when the number of product housing shelves 10 disposed in the up-down direction in the product storage is increased, the tilt angle of each product housing shelf 10 decreases, and accordingly, it takes a longer time until the product G starts rolling after cancellation of the stationary state. In such a case, simultaneously with retraction of the first stopper member 52 from the product housing path 43, the shank 530 of the second stopper member 53 protruding in the product housing path 43 presses the product G from the obliquely front upper side to prompt roll of the product G, which contributes to the discharge of the product G. However, when the shank 530 of the second stopper member 53 is a flat surface, the shank 530 contacts with the product G along a line in the longitudinal direction of the product G, and accordingly, the contact area increases.

In this case, when the container of the product G is made of thin plastic, the container deforms at contact of the product G with the shank 530 of the second stopper member 53, and accordingly, the contact area increases. When the area of contact between the second stopper member 53 and the product G increases in this manner, the product G potentially cannot move being sandwiched between the second stopper member 53 and the product housing shelves 10. However, when the ribs 530a are formed on the shank 530 of the second stopper member 53 as in the present embodiment, contact with the product G is made in substantially point contact, and accordingly, friction resistance is reduced, and thus when the shank 530 of the second stopper member 53 contacts the product G, the container of which is made of thin plastic, a gap is generated between the container and the shank 530 through the ribs 530a, which decreases the contact area and reduces the friction resistance so that the second stopper member 53 promotes the rolling of the product G and the product G can be smoothly discharged. A stopper 531a is formed on the outer periphery of each pivotally support part 531 in the second stopper member 53 and protrudes in the axial direction. The stopper 531a contacts the back surface of the concave groove formed between the right side wall 513 and the guide wall 515 of the mechanism unit holder 51 when the second stopper member 53 protrudes in the product housing path 43, thereby regulating the protrusion position of the second stopper member 53.

To assemble the rotation shaft 57 that pivotally supports the first stopper member 52 and the second stopper member 53 to the mechanism unit holder 51, the bearings 522, 522 of the first stopper member 52 and the pivotally support parts 531, 531 of the second stopper member 53 are disposed on predetermined positions on the right and left sidewalls 512 and 513 of the mechanism unit holder 51. In this case, at the predetermined positions, the two pivotally support parts 531, 531 provided to the second stopper member 53 are positioned outside the two bearings 522, 522 provided to the first stopper member 52, and the shaft insertion holes 524 of the two bearings 522, 522 provided to the first stopper member 52 and the shaft insertion holes 532 of the two pivotally support parts 531, 531 provided to the second stopper member 53 are positioned in line with the support shaft holes 518 formed at the right and left sidewalls 512 and 513 of the mechanism unit holder 51 and the guide walls 514 and 515. In this manner, the bearings 522, 522 of the first stopper member 52 and the pivotally support parts 531, 531 of the second stopper member 53 are disposed at the predetermined positions on the right and left sidewalls 512 and 513 of the mechanism unit holder 51, and then the rotation shaft 57 is installed by being inserted into the guide hole 514a formed at the guide wall 514 from outside the guide wall 514 of the mechanism unit holder 51 and sequentially inserted into the support shaft holes 518, 518 formed at the right and left sidewalls 512 and 513 and the guide walls 514 and 515, and as a result, the first stopper member 52 and the second stopper member 53 are pivotally supported to the rotation shaft 57.

Figure 27A:
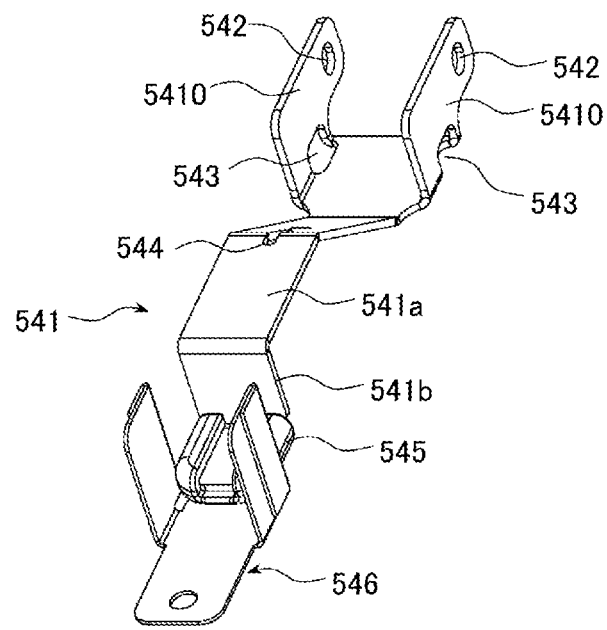
FIGS. 27A and 27B illustrate a link mechanism.
Figure 27B:
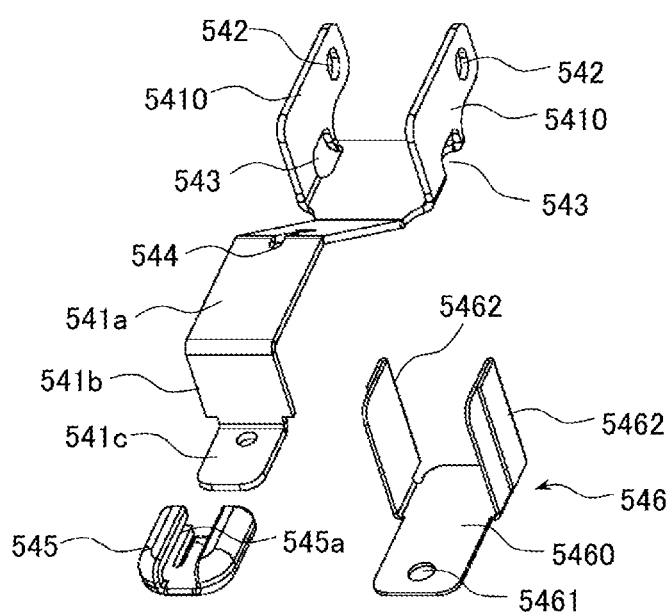

The link mechanism 54 included in the delivery mechanism 50 of the product discharge device 5 includes a link member 541 made of a steel plate as illustrated in FIGS. 27A and 27B. The link member 541 is bent and formed in a substantially convex shape having a central top surface 541a at a central part of a strip-shaped steel plate in the front-and-rear direction. The central top surface 541a is formed as a flat part and includes an engagement wall surface 541b bent at a right angle downward from a front edge of the central top surface 541a. The central top surface 541a is formed so that the engagement wall surface 541b is positioned over a rear flange 84 of a drive unit holder 80 to be described later and on the front side of the rear flange 84. The link member 541 includes support legs 5410, 5410 extending upward from right and left ends on the rear side, and the support legs 5410, 5410 include support parts 542, 542 made of through-holes through which the rear part link pin 55 penetrates and support parts 543, 543 positioned on the front side of the support parts 542, 542 and made of through-holes through which the front part link pin 56 penetrates. The support parts 542, 542 support both ends of the rear part link pin 55 and move the rear part link pin 55 in the front-and-rear direction along with reciprocation of the link member 541 in the front-and-rear direction. The support parts 543, 543 support both ends of the front part link pin 56 and move the front part link pin 56 in the front-and-rear direction along with reciprocation of the link member 541 in the front-and-rear direction.

Figure 22:
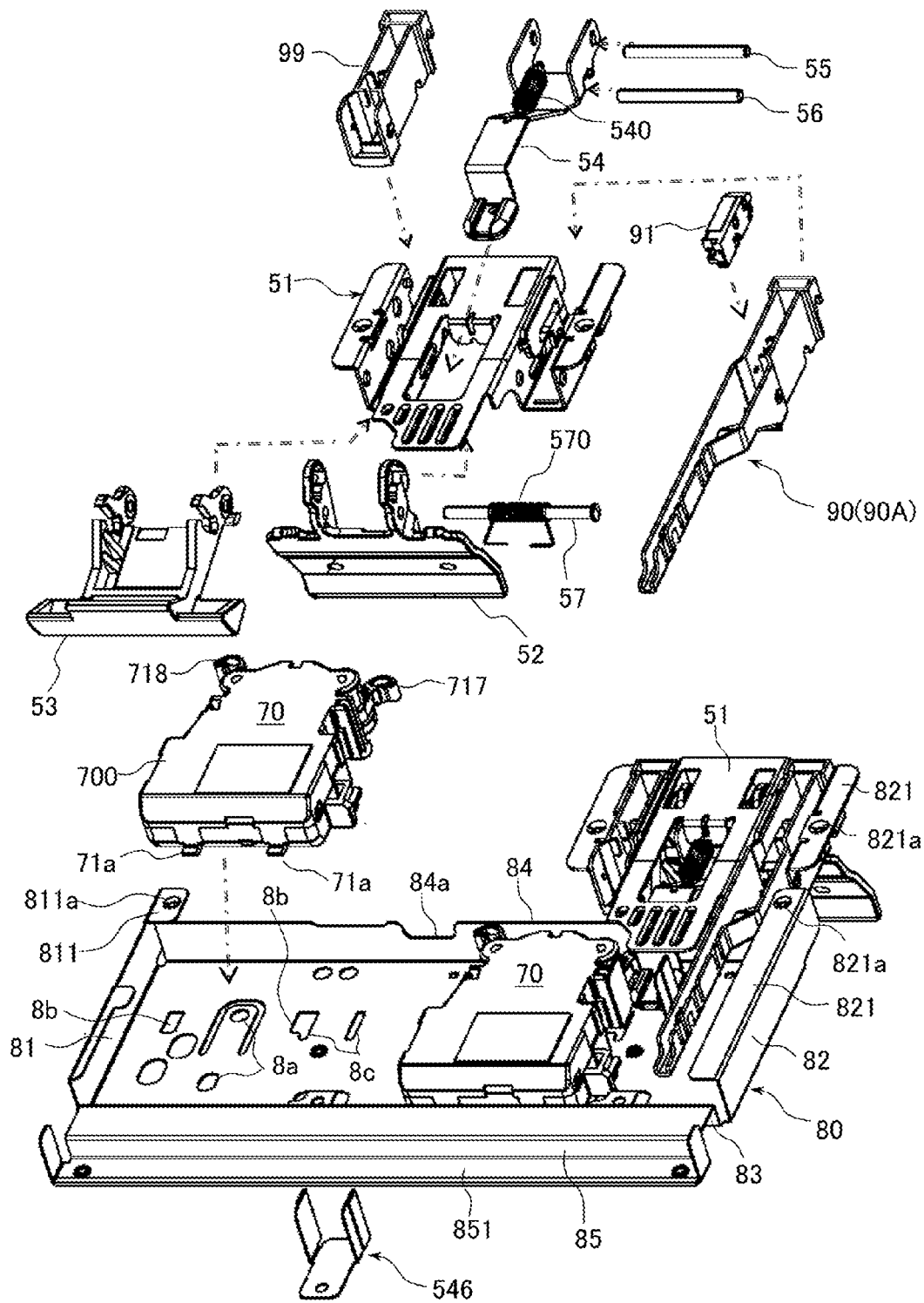
FIG. 22 is an exploded perspective view of the product discharge device in FIG. 19.

A fixation part 541c that fixes a slide member 545 guided by a guide 546 configured to guide reciprocating movement of the link member 541 in the front-and-rear direction is formed on the front side of the link member 541. The guide 546 is provided with guide legs 5462, 5462 extending upward from right and left ends of a central part of a base 5460 having a flat plate shape in the front-and-rear direction. The guide 546 includes a screw hole 5461 at the base 5460 and is firmly fixed to the drive unit holder 80 through the screw hole 5461 by positioning the guide 546 on a back surface (lower surface) side of the drive unit holder 80 for attaching a motor drive unit 70 to be described later, and inserting guide legs 5452, 5452 into a pair of right and left guiding grooves 8c, 8c extending in the front-and-rear direction of the drive unit holder 80. Among the pair of right and left guiding grooves 8c, 8c, the guiding groove 8c on the left side illustrated in FIG. 22 is formed integrally with a rectangular lock hole 8b. The slide member 545 is made of synthesis resin, includes, on right and left sides, insertion grooves 545a opened on the rear side, and is integrated with the link member 541 by engaging the insertion grooves 545a with the fixation part 541c.

A lock hole 544 is provided at a rear edge of the central top surface 541a of the link member 541. The hook-shaped other end of the return spring 540 that presses the link member 541 toward the rear position is hooked and locked to the lock hole 544.

The link member 541 is assembled to the mechanism unit holder 51 together with the rear part link pin 55 and the front part link pin 56. Specifically, after the first stopper member 52 and the second stopper member 53 are disposed between the right and left sidewalls 512 and 513 of the mechanism unit holder 51 and assembled through the rotation shaft 57 as described above, the rear part link pin 55 and the front part link pin 56 are assembled while the support legs 5410, 5410 of the link member 541 on the rear side are disposed between the two bearings 522 of the first stopper member 52.

In this case, while the support parts (through-holes) 542 provided to the right and left support legs 5410, 5410 of the link member 541 and the odd-shaped holes 523 provided to the two bearings 522, 522 of the first stopper member 52 are positioned in line with the elongate holes 516, 516 of the bearing members 501 and 502 attached to the right and left sidewalls 512 and 513 of the mechanism unit holder 51, the rear part link pin 55 is inserted from outside the guide hole 514b (refer to FIGS. 24A and 24B) drilled through the guide wall 514 of the mechanism unit holder 51 and is mounted and provided across the elongate holes 516, 516 of the bearing members 501 and 502 attached to the right and left sidewalls 512 and 513. Accordingly, the rear part link pin 55 is held across the elongate holes 516, 516 provided to the right and left sidewalls 512 and 513 while being supported to the support parts (through-holes) 542, 542 of the link member 541 and inserted into the odd-shaped holes 523, 523 provided to the two bearings 522, 522 of the first stopper member 52. While the support parts (through-holes) 543 provided to the right and left support legs 5410, 5410 of the link member 541 and the concave slide grooves 534a, 534a formed at the right and left stopper walls 534, 534 of the second stopper member 53 are positioned in line with the elongate holes 517, 517 formed at the right and left sidewalls 512 and 513 of the mechanism unit holder 51, the front part link pin 56 is inserted from outside the guide hole 514c (refer to FIG. 16) formed at the guide wall 514 of the mechanism unit holder 51 and is mounted and provided across the elongate holes 517, 517 formed at the right and left sidewalls 512 and 513. Accordingly, the front part link pin 56 is held across the elongate holes 517, 517 formed at the right and left sidewalls 512 and 513 while being supported to the support parts (through-holes) 543 and 544 of the link member 541 and inserted into the concave slide grooves 534a, 534a provided to the right and left stopper walls 534, 534 of the second stopper member 53.

In this manner, while the link member 541 is assembled to the mechanism unit holder 51, one end of the return spring 540 is locked to the lock hole 511d (refer to FIGS. 23A and 23B) provided at the ceiling wall 511 of the mechanism unit holder 51, and the other end of the return spring 540 is locked to the lock hole 544 provided at the central top surface 541a of the link member 541. Accordingly, in the standby state, the link member 541 is retracted by pressing force of the return spring 540 so that the rear part link pin 55 and the front part link pin 56 positioned at rear end positions of the elongate holes 516, 516 and 517, 517 provided at the right and left sidewalls 512 and 513 of the mechanism unit holder 51. The return spring 540 is positioned between the right and left stopper walls 534, 534 of the second stopper member 53 when the second stopper member 53 is retracted to the retracted position from the product housing path 43, and does not interfere with the second stopper member 53. In addition, the central top surface 541a of the link member 541 assembled to the mechanism unit holder 51 contacts the ribs 5111 protruding below the front side region of the ceiling wall 511, and the friction resistance is reduced by contact with the ribs 5111.

Figure 28A:
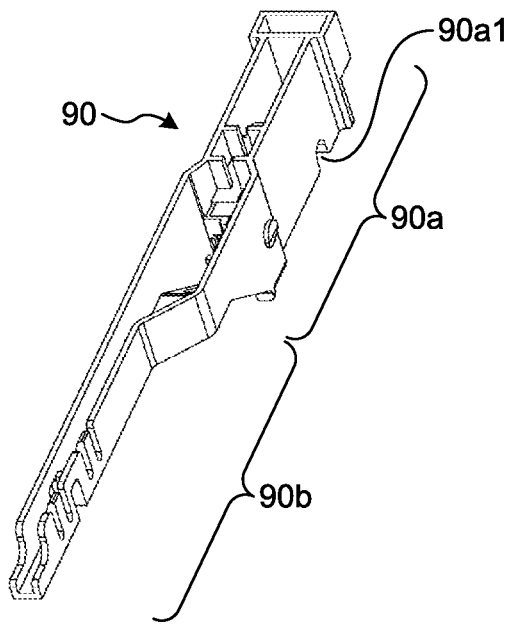
Figure 28B:
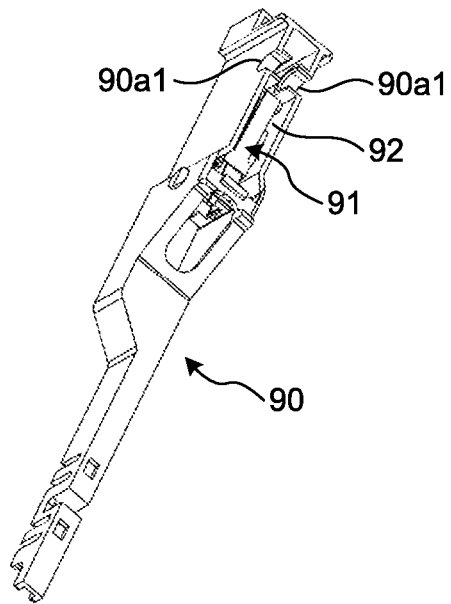
Figure 28C:
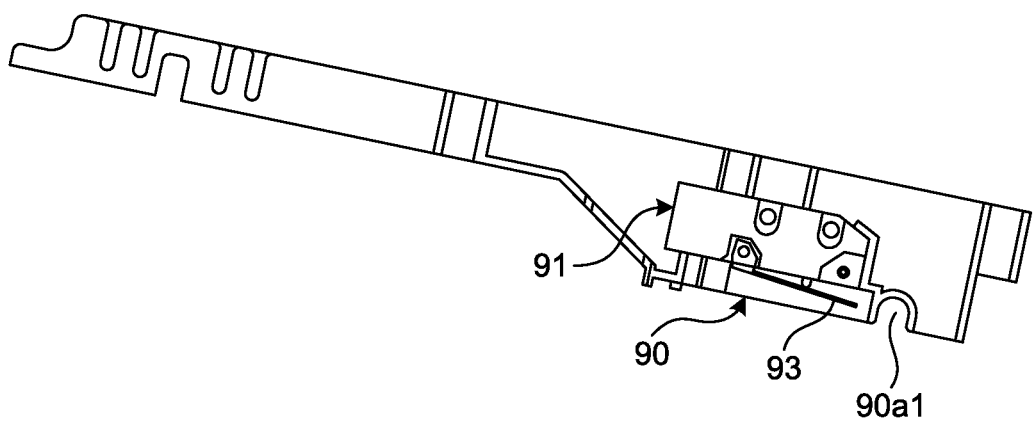
FIG. 28C is a side-surface cross-sectional view of FIG. 28A.

A wiring guide 90 including each sold-out detection switch 91 provided for the delivery mechanism 50 of the product discharge device 5 is made of synthesis resin, has a cross-section in a concave shape, extends in the front-and-rear direction as illustrated in FIGS. 28A, 28B and 28C, and includes a thick groove part 90a in which the sold-out detection switch 91 is provided, and a thin groove part 90b that guides wires of the sold-out detection switch 91. The thick groove part 90a is formed in a size that allows engagement with each of the concave grooves formed between the left sidewall 512 and the guide wall 514 and between the right side wall 513 and the guide wall 515 in the mechanism unit holder 51, and semicircular cutouts 90a1, 90a1 for avoiding interference with the rotation shaft 57 common to the first stopper member 52 and the second stopper member 53 are formed on right and left sidewalls of the thick groove part 90a on the bottom surface side. In addition, a bottom surface part of the thick groove part 90a is removed (opened) as a window 92, and the window 92 overlaps with the opening 519 formed at the bottom wall of the concave groove of the mechanism unit holder 51 when the thick groove part 90a is engaged with the concave groove of the mechanism unit holder 51. When the thick groove part 90a is fitted into the concave groove and the wiring guide 90 is assembled to the mechanism unit holder 51, the thick groove part 90a functions to prevent removal of the rear part link pin 55 and the front part link pin 56 held by the link mechanism 54 (link member 541). A removal prevention member 99 (refer to FIG. 22) having a shape similar to that of the thick groove part 90a of the wiring guide 90 is fitted to the other concave groove of the mechanism unit holder 51 in which the wiring guide 90 is not disposed. Accordingly, header-less pins can be employed as the rear part link pin 55 and the front part link pin 56.

Figure 29:
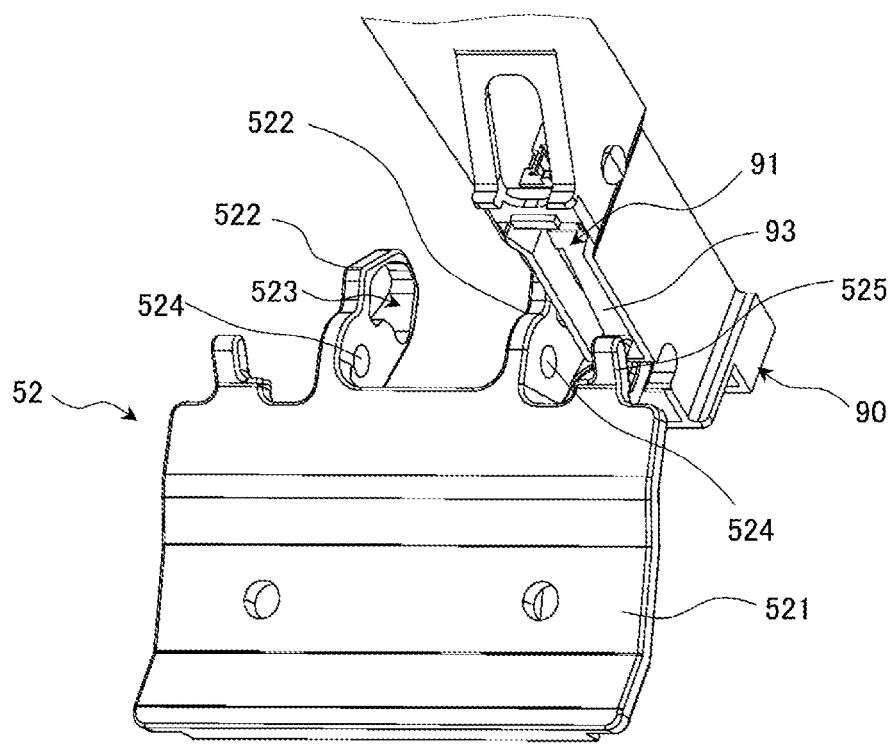
FIG. 29 is a perspective view illustrating the relation between a sold-out detection switch and the first stopper member.

Each sold-out detection switch 91 is made of a micro switch in the present embodiment and inserted into and locked and fixed to a concave groove of the thick groove part 90a of the wiring guide 90. In this case, the sold-out detection switches 91 is locked and fixed to the thick groove part 90a so that an actuator 93 is adjacent to the window 92 as the bottom surface part formed at the thick groove part 90a of the wiring guide 90. As described above, the window 92 as the bottom surface part formed at the thick groove part 90a of the wiring guide 90 overlaps with the opening 519 formed at the bottom wall of a concave groove of the mechanism unit holder 51, and the opening 519 faces the protrusion 525 of the first stopper member 52. The actuator 93 of the sold-out detection switch 91 mounted on the thick groove part 90a of the wiring guide 90 is pressed by the protrusion 525 of the first stopper member 52 having entered the opening 519 and the window 92 when the first stopper member 52 rotates about the rotation shaft 57 by pressing force of the torsional coil spring 570 to protrude in the product housing path 43 and becomes opened at the maximum opening degree. This relation between the first stopper member 52 and the sold-out detection switch 91 is illustrated in FIG. 29. FIG. 29 illustrates a situation in which the protrusion 525 of the first stopper member 52 presses the actuator 93 of the sold-out detection switch 91 when the first stopper member 52 is opened at the maximum opening degree. The first stopper member 52 is opened at the maximum opening degree by pressing force of the torsional coil spring 570 when receiving no product load, and then upon reception of a product load when the product G contacts the holding portion 521 of the first stopper member 52, the first stopper member 52 rotates from the maximum opening degree in a direction in which the opening degree decreases and becomes locked by the rear part link pin 55, and accordingly, the pressing of the actuator 93 of the sold-out detection switch 91 by the protrusion 525 of the first stopper member 52 is canceled when the first stopper member 52 is rotated from the maximum opening degree to the lock position. In this case, a control unit configured to process a signal from the sold-out detection switch 91 performs processing of determining "sold-out" when an "on" signal from the sold-out detection switch 91 continues for a predetermined time.

As a motor 711 (refer to FIGS. 30A and 30B) built in a unit case 700 is driven in normal rotation by a vending command based on an operation of a product selection button, the motor drive unit 70 mounted on the product discharge device 5 moves forward the link mechanism 54 (link member 541) of the delivery mechanism 50 through a link lever 717 by the normal rotation of the motor 711. In the example of the product discharge device 5 of the present embodiment illustrated in FIG. 19, the motor 711 is driven in normal rotation, but the motor 711 may be driven in reverse rotation to drive a link lever 718.

Figure 30A:
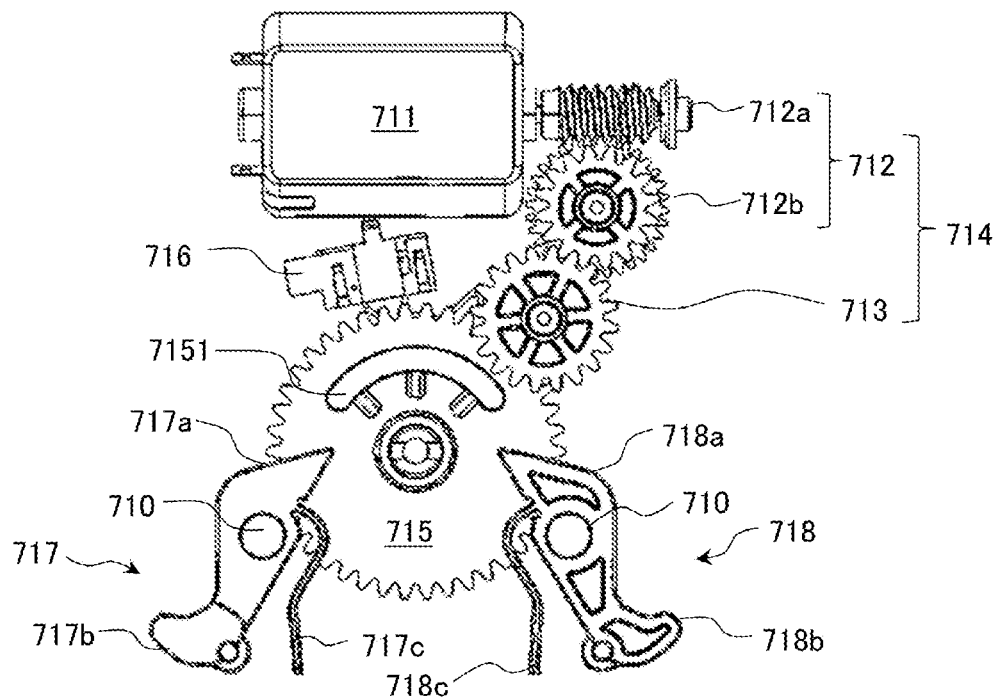
FIGS. 30A and 30B illustrate a main-part configuration and operation of a motor drive unit.
Figure 30B:
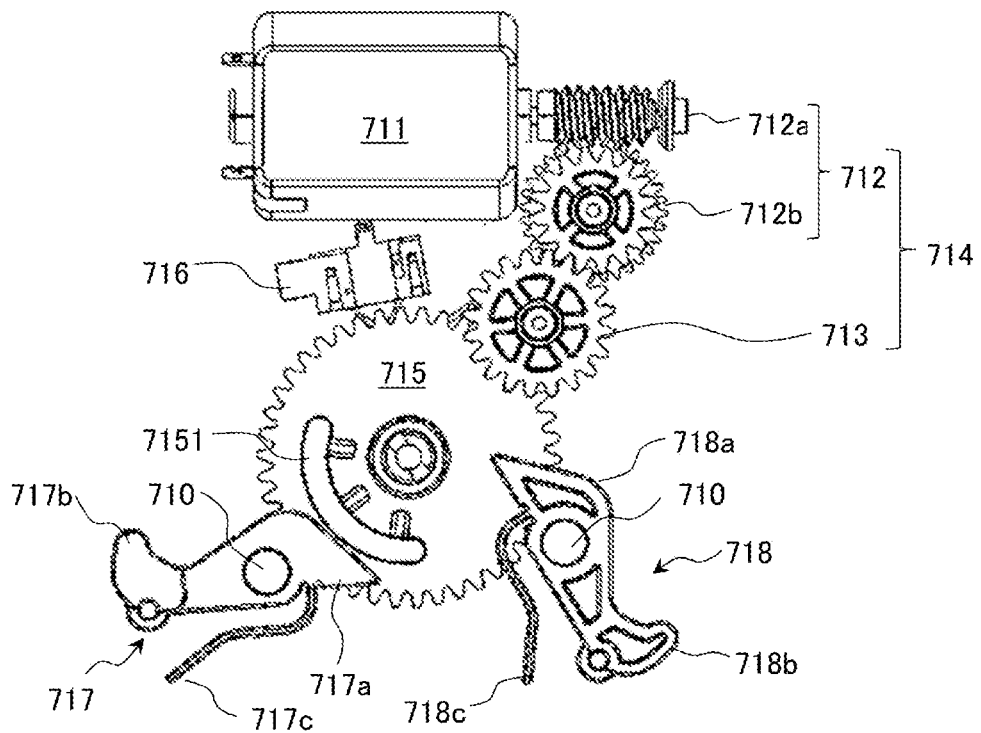

The unit case 700 of the motor drive unit 70 is made of a base member and a cover member and includes the motor 711, a gear transmission mechanism 714, an output gear 715, a carrier switch 716, and the link levers 717 and 718 as illustrated in FIGS. 30A and 30B. The motor drive unit 70 is assembled to the drive unit holder 80 when click pieces 71*a*, 71*a* (refer to FIG. 22) provided at a head of the base member of the unit case 700 are locked to engagement holes 831, 831 (refer to FIG. 21) formed at a front flange 83 of the drive unit holder 80, and engagement protrusions 71*b*, 71*b* and lock protrusions 71*c*, 71*c* (refer to FIG. 21) protruding from a back surface of the base member of the unit case 700 are engaged with engagement holes 8*a*, 8*a* and the rectangular lock holes 8*b*, 8*b* (refer to FIG. 21) drilled through a plate surface of the drive unit holder 80.

The motor 711 included in the unit case 700 of the motor drive unit 70 is a direct-current motor that can perform normal rotation or reverse rotation in accordance with a vending command, and is held at the base member of the unit case 700.

The gear transmission mechanism 714 includes a worm gear 712 made of a worm 712*a* and a worm wheel 712*b*, and a middle gear 713. The worm 712*a* of the worm gear 712 is attached to an output shaft of the motor 711. In the worm wheel 712*b*, a first wheel meshed with the worm 712*a* and a second wheel meshed with the middle gear 713 are provided in a step shape in the front-and-rear direction. In the middle gear 713, a first middle gear meshed with the second wheel of the worm wheel 712*b* and a second middle gear meshed with the output gear 715 are provided in a step shape in the front-and-rear direction. The worm gear 712 and the middle gear 713 are rotatably disposed through the base member of the unit case 700 and a bearing of the cover member.

The output gear 715 is formed as a wheel meshed with the second middle gear of the middle gear 713, a cam protrusion 7151 is formed on one plate surface (upper surface) thereof, and a pressing piece (not illustrated in FIGS. 30A and 30B) configured to control the carrier switch 716 is formed on the other plate surface (upper part). The cam protrusion 7151 protrudes in an arc shape in the direction of separating from the plate surface of the output gear 715. The cam protrusion 7151 is formed so that the length of the arc shape is sufficient to hold a state for a predetermined time after the link member 541 of the link mechanism 54 is moved forward. The pressing piece configured to control the carrier switch 716 is positioned on a plate surface opposite to the cam protrusion 7151, protrudes in a substantially V shape in a direction separating from the plate surface, and presses a contact of the carrier switch 716 in the state of FIG. 30A. The output gear 715 is rotatably disposed through the base member of the unit case 700 and the bearing of the cover member.

The carrier switch 716 is what is called a press button switch and includes the contact (not illustrated). The carrier switch 716 is disposed slightly above the output gear 715 while being held by the base member of the unit case 700. The carrier switch 716 is turned on when the contact is pressed by the pressing piece of the output gear 715 or is turned off when the contact is separated from the pressing piece of the output gear 715 and not pressed, and controls the motor 711 driven by a vending command so that the output gear 715 rotates once.

The link lever 717 is a resin molded product. The link lever 717 drives the link mechanism 54 of the delivery mechanism 50 in the product discharge device 5. The link lever 717 is rotatably and pivotally supported to a lever shaft 710 provided to the cover member of the unit case 700 and penetrating through a base part 717*a*. A leading end part 717*b* of the link lever 717 has a hook shape curved upward and externally protrudes from an opening (not illustrated) formed by cutting out the base member of the unit case 700 and the cover member. A lock piece 717*c* provided to the base part 717*a* of the link lever 717 is an elastic member that has a plate shape, is elastically deformable, and extends rearward from a rear side of the base part 717*a*. The lock piece 717*c* sets the standby posture of the link lever 717 in a normal state to a position illustrated in FIGS. 30A and 30B when a free end of the lock piece 717*c* contacts a protrusion piece (not illustrated) provided to the cover member. The link lever 718 is made of components identical to those of the link lever 717, equivalent to the inverted link lever 717, and rotatably and pivotally supported to the lever shaft 710 provided to the cover member of the unit case 700 and penetrating through a base part 718*a*, and includes a hook-shaped leading end part 718*b* and a lock piece 718*c* made of an elastic member that has a plate shape and is elastically deformable. Description of an operation in which the link mechanism 54 of the delivery mechanism 50 is driven by the motor drive unit 70 to perform product delivery is omitted.

The drive unit holder 80 to which the motor drive unit 70 is locked and fixed is made of a thin steel plate, and a left flange 81, a right flange 82, the front flange 83, and the rear flange 84 extending toward the upper rung side are formed at the periphery of a rectangular flat plate surface of the drive unit holder 80 as illustrated in FIG. 22. The front flange 83 has a height lower than those of the right and left flanges 81 and 82, and a harness holding portion 85 having a downward stair shape is integrally formed from a free end of the front flange 83. In addition, attachment pieces 811 and 821 bent in directions facing each other and having horizontal flat surfaces are formed at the left flange 81 and the right flange 82, and screw holes 811*a* and 821*a* are drilled through the attachment pieces 811 and 821, respectively. In addition, two right and left cutouts 84*a*, 84*a* (the cutout on the right side is not illustrated in the drawing) are formed at the rear flange 84. The cutouts 84*a*, 84*a* are provided to avoid interference with the above-described wiring guide 90. The harness holding portion 85 guides the motor 711 of the motor drive unit 70 (70A and 70B), wires of the carrier switch 716, and wires of the sold-out detection switches 91, and is provided with a placement part 851 at which wires are placed in a bundle. The wires of the motor 711, the carrier switch 716, and the sold-out detection switches 91 are collectively connected with a coupler (not illustrated), and the coupler is firmly fixed to the coupler attachment hole 121 provided at the suspending part 120 of the rear side shelf member 10R described above.

While being assembled to the motor drive unit 70 by inserting the click pieces 71*a*, 71*a* (refer to FIG. 22) provided at the head of the base member of the unit case 700 of the motor drive unit 70 into the engagement holes 831, 831 (refer to FIG. 21) formed at the front flange 83 of the drive unit holder 80, and then engaging the engagement protrusions 71*b*, 71*b* and the lock protrusions 71*c*, 71*c* (refer to FIG. 21) protruding from the back surface of the base member of the unit case 700 with the engagement holes 8*a*, 8*a* and the rectangular lock holes 8*b*, 8*b* (refer to FIG. 22) of the drive unit holder 80, the drive unit holder 80 is directly attached to the product housing shelf 10 as follows. In this case, as the previous process, the mechanism unit holder 51 is directly attached to the product housing shelf 10 as described above.

Specifically, the two right and left cutouts 84a, 84a provided at the rear flange 84 of the drive unit holder 80 are positioned at the two right and left wiring guides 90 assembled to the two right and left mechanism unit holders 51, respectively, directly attached to the product housing shelf 10, and the leading end parts 717b of the link levers 717 of the two right and left motor drive units 70 are positioned behind (on the rear side of) the engagement wall surfaces 541b bent downward at a right angle from the front edges of the central top surfaces 541a of the two right and left link members 541 assembled to the two right and left mechanism unit holders 51. Then, each coupler (not illustrated) collecting the wires of the motor 711, the carrier switch 716, and the sold-out detection switches 91 is firmly fixed to the coupler attachment hole 121 provided at the suspending part 120 of the rear side shelf member 10R, and the attachment pieces 811 and 821 provided at the right and left flanges 81 and 82 of the drive unit holder 80 are made to contact with the back surfaces of the fixation parts 124 and 129 formed as recessed parts at the rear side shelf member 10R included in the product housing shelf 10, and then screws are screwed to the screw holes 811a and 821a provided at the attachment pieces 811 and 821 through the screw insertion holes 124a and 129a provided at the bottom surfaces of the recessed parts. Accordingly, the drive unit holder 80 to which the motor drive units 70 are locked and fixed is directly attached to the rear side shelf member 10R (the product housing shelf 10).

Figure 31:
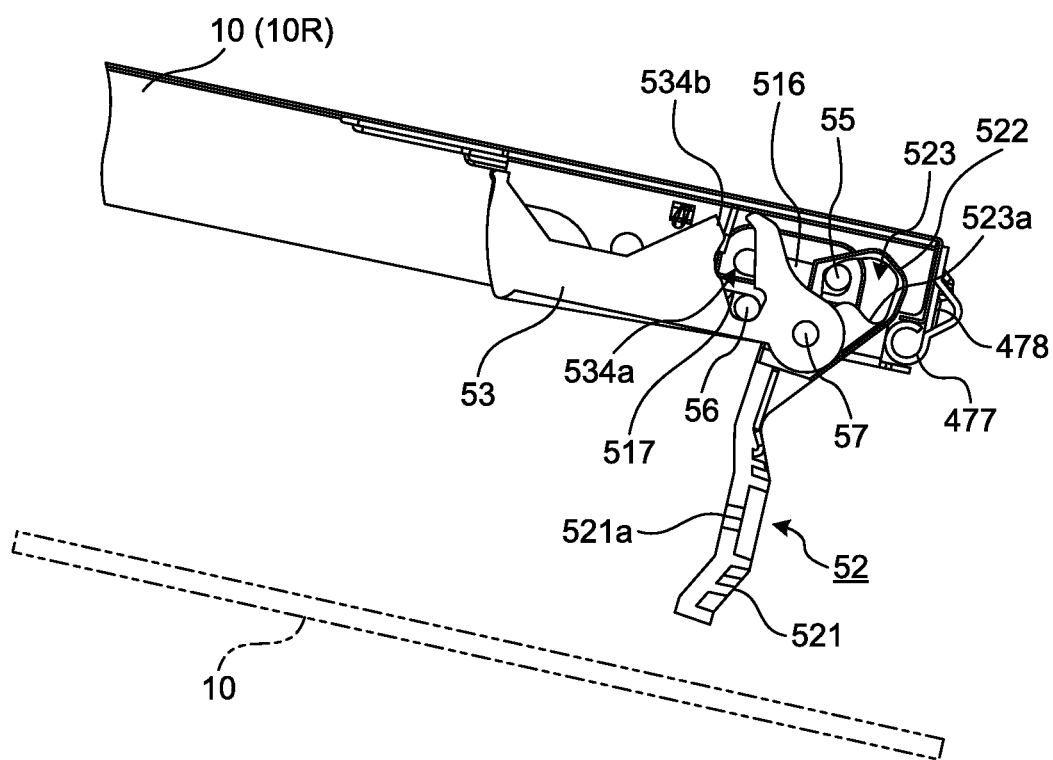
FIG. 31 is an operation explanatory diagram of a main part of a delivery mechanism in the product discharge device before product loading.
Figure 33:
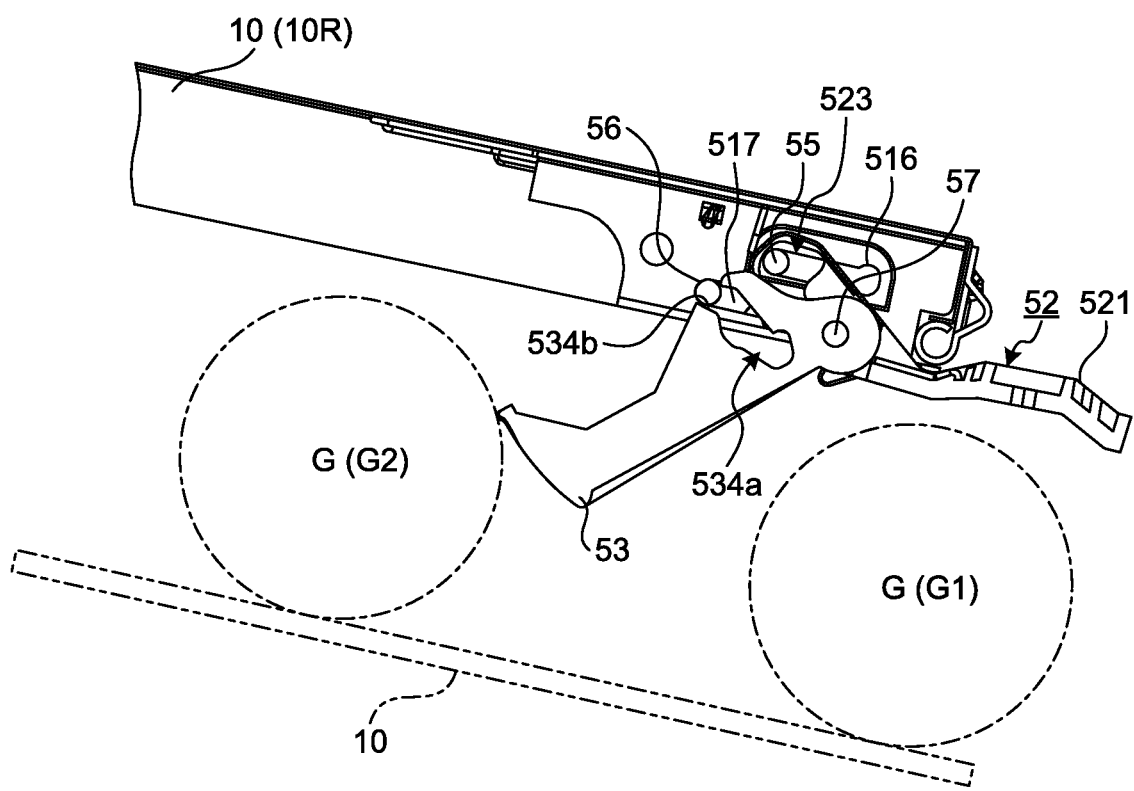
FIG. 33 is an operation explanatory diagram of the delivery mechanism in the product discharge device at vending.

The following describes an operation in which the link mechanism 54 in the delivery mechanism 50 of the product discharge device 5 is driven by the motor drive unit 70 to perform product delivery with reference to FIGS. 31 to 33. FIGS. 31 to 33 illustrate a main part of the product discharge device 5, FIG. 31 is an operation explanatory diagram before product loading, FIG. 32 is an operation explanatory diagram of a vending standby state, and FIG. 33 is an operation explanatory diagram of vending. In the operation explanatory diagram of the vending standby state in FIG. 32, an operation explanatory diagram of the present embodiment is illustrated on the upper side, and an operation explanatory diagram of a comparative example is illustrated on the lower part side.

As illustrated in FIG. 31, before product loading, the first stopper member 52 of the delivery mechanism 50 protrudes in the product housing path 43 by pressing force of the torsional coil spring 570 (refer to FIG. 22), and the second stopper member 53 is retracted from the product housing path 43. In this case, the cam protrusion 7151 of the output gear 715 of the motor drive unit 70 is positioned on the most front side (refer to FIG. 30A). In addition, the pressing piece of the carrier switch 716 provided at the back surface of the output gear 715 is positioned on the most front side and the carrier switch 716 is on. Accordingly, the motor 711 is stopped, and the leading end part 717b of the link lever 717 is separated on the rear side from the engagement wall surface 541b of the link member 541. Thus, the link member 541 is retracted by pressing force of the return spring 540. In addition, the first stopper member 52 is at the protrusion position where the first stopper member 52 protrudes in the product housing path 43 by pressing force of the torsional coil spring 570 and is opened at the maximum opening degree (for example, the angle relative to the second stopper member 53 retracted from the product housing path 43 is substantially 90°). The operation range of the first stopper member 52 is regulated in cooperation with the rear part link pin 55 inserted into the odd-shaped holes 523 provided to the bearings 522 of the first stopper member 52 so that the first stopper member 52 does not open beyond the maximum opening degree, and there is a gap between the lock groove part 523a of each odd-shaped hole 523 and the rear part link pin 55 while the first stopper member 52 is opened at the maximum opening degree. In this manner, while the first stopper member 52 is opened at the maximum opening degree, the protrusion 525 of the first stopper member 52 faces the window 92 at the bottom surface part of the thick groove part 90a of the wiring guide 90, and the actuator 93 of the sold-out detection switch 91 mounted on the thick groove part 90a of the wiring guide 90 through the opening 519 formed at the bottom wall of the concave groove of the mechanism unit holder 51 is pressed so that the sold-out detection switch 91 is on. The second stopper member 53 is maintained at the position of retraction from the product housing path 43 while the front part link pin 56 having moved to the rear position is received by the concave slide grooves 534a formed at the stopper walls 534.

In such a standby state, the product G first loaded contacts the holding portion 521 of the first stopper member 52 opened at the maximum opening degree and positioned at the protrusion position. In contact with the product G, the first stopper member 52 rotates toward the retracted position. Through the rotation, the lock groove parts 523a of the odd-shaped holes 523 of the bearings 522 of the first stopper member 52 contact the rear part link pin 55 having moved to the rear position, and the first stopper member 52 is locked at the position of protrusion in the product housing path 43, and accordingly, the product G held by the first stopper member 52 changes to a product (product G1) of the first vending order (refer to FIG. 32). In this manner, when the first stopper member 52 rotates from the maximum opening degree so that the first stopper member 52 is locked to the state of protrusion in the product housing path 43 at an opening degree (for example, the angle at the second stopper member 53 retracted from the product housing path 43 is substantially 95°) smaller than the maximum opening degree, the protrusion 525 of the first stopper member 52 cancels pressing of the actuator 93 of the sold-out detection switch 91, and accordingly, the sold-out detection switch 91 is turned off. A subsequently loaded product is stacked as a next product G2 on the product G1 held by the first stopper member 52, and subsequently loaded products are sequentially stacked on the next product G2.

The product receiving unit 521a configured to receive a large-diameter product is formed at the holding portion 521 of the first stopper member 52, and when a large-diameter product GL is loaded, the product GL is held while being received by the product receiving unit 521a formed at the holding portion 521 of the first stopper member 52, and the position of the large-diameter product held by the first stopper member 52 moves closer to the rear end of the product housing shelf 10. However, when the first stopper member 52 has a straight line shape as illustrated in the comparative example illustrated on the lower part side in FIG. 32, the large-diameter product GL contacts a substantially middle part of the first stopper member 52, and accordingly, the held position of the large-diameter product GL held by the first stopper member 52 is positioned on the product insertion port 44 side. As understood from comparison with the comparative example, when the first stopper member 52 of the present embodiment is used, the held position of the large-diameter product GL held by the first stopper member 52 can be moved closer to the rear end of the product housing shelf 10 by a dimension LX. The dimension LX is smaller than the diameter of the large-diameter product GL, but with the first stopper member 52 of the comparative example, when the product GL at the end of line is positioned on the front side of the product insertion port 44, the product GL interferes with the heat-insulating inner door 3 and the heat-insulating inner door 3 cannot be closed, and thus the product GL at the end of line cannot be housed, whereas with the first stopper member 52 of the present embodiment, the retracted position of the product GL can be moved closer to the rear side by the dimension LX, and thus the product GL at the end of line can be housed. Accordingly, the number of products housed in the product housing path 43 can be increased. A small-diameter product GM is held on the leading end side of the holding portion 521 of the first stopper member 52.

The product G housed in the product housing rack 4 as described above is cooled or heated by the cooling-heating unit 7, stored in a cold or hot state suitable for vending, and becomes a vending possible state (vending standby state). Although not illustrated, the automatic vending machine includes a main control unit configured to govern entire control. The main control unit includes a ROM storing various execution programs, a RAM storing various kinds of data, and a CPU configured to execute various execution programs based on various input signals, and controls drive of the cooling-heating unit 7 in accordance with computer programs of zone cooling, zone heating, entire cooling, and or entire heating. In such a vending standby state, when a vending command is provided to the motor drive unit 70 based on an operation of a product selection switch, the motor 711 built in the motor drive unit 70 is driven in normal rotation, and the output gear 715 rotates in the anticlockwise direction in FIG. 30A through the gear transmission mechanism 714. As the output gear 715 rotates, the pressing piece provided at the back surface of the output gear 715 is removed from the contact of the carrier switch 716 and the carrier switch 716 is turned off, and then the motor 711 is driven in normal rotation until the carrier switch 716 is turned on next time (in other words, until the output gear 715 rotates once). When the cam protrusion 7151 contacts the base part 717a of the link lever 717 from the front side through the rotation of the output gear 715, the link lever 717 rotates in the clockwise direction in FIG. 30A while deforming the lock piece 717c made of an elastic member. Through the rotation of the link lever 717 in the clockwise direction, the leading end part 717b contacts the engagement wall surface 541b of the link member 541 and moves the link member 541 forward against pressing force of the return spring 540. The link member 541 is held in the forwardly moved state while the cam protrusion 7151 is slidably contacting the base part 717a of the link lever 717 (refer to FIG. 30B).

Along with the forward movement of the link member 541, the rear part link pin 55 supported to the link member 541 is moved forward along the elongate hole 516 provided at the mechanism unit holder 51 and removed from the lock groove parts 523a of the odd-shaped holes 523 of the first stopper member 52, and accordingly, locking of the first stopper member 52 to the protrusion position by the rear part link pin 55 is canceled. Then, the first stopper member 52 is moved toward the retracted position against pressing force of the torsional coil spring 570 by a product load (refer to FIG. 33). Through the movement of the first stopper member 52 to the retracted position, the product G1 passes by the first stopper member 52 and is discharged to the rear side. When the product G1 has passed by the first stopper member 52, the first stopper member 52 is automatically returned to the protrusion position by pressing force of the torsional coil spring 570.

The second stopper member 53 maintained at the retracted position with the front part link pin 56 held by the link member 541 being received by the concave slide grooves 534a in the vending standby state is pressed toward the protrusion position as the front part link pin 56 moving forward together with the link member 541 slidably contacts the wall surface of the slide groove 534a (refer to FIG. 33). Then, the front part link pin 56 moves forward to a position where the front part link pin 56 faces the stopper surfaces 534b of the stopper walls 534 of the second stopper member 53, and contacts the stopper surfaces 534b, and the movement of the second stopper member 53 to the retracted position is regulated. When moving toward the protrusion position, the second stopper member 53 contacts and presses the product G1. In this case, since the ribs 530a extending from the base end part toward the holding portions 533 are formed on the surface of the shank 530 of the second stopper member 53 adjacent to the product housing path 43, the area of contact with the product G1 is small (the friction resistance is small), and thus the second stopper member 53 promotes the rolling of the product G1 and the product G1 can be smoothly discharged. Then, the second stopper member 53 having moved to the protrusion position contacts and holds the next product G2 moving toward the rear side as the product G1 is discharged, thereby regulating the next product G2 from moving toward the rear side.

The operation of retracting the first stopper member 52 to the retracted position to deliver the product G1 and moving the second stopper member 53 from the retracted position to the protrusion position to hold the next product G2 is executed while the cam protrusion 7151 of the output gear 715 slidably contacts the base part 717a of the link lever 717.

Then, when the contact between the cam protrusion 7151 and the base part 717a of the link lever 717 is canceled through rotation of the output gear 715, the link lever 717 returns to the standby posture in FIG. 30A by restoring force of the lock piece 717c being elastically deformed, and the link member 541 is retracted by pressing force of the return spring 540. Through the retraction of the link member 541, the front part link pin 56 supported to the link member 541 enters the slide grooves 534a from the stopper surfaces 534b of the second stopper member 53 and moves the second stopper member 53 toward the retracted position. Through the movement of the second stopper member 53 to the retracted position, the next product G2 held by the second stopper member 53 moves toward the rear side and contacts the first stopper member 52 opened at the maximum opening degree. Thereafter, the lock groove parts 523a of the odd-shaped holes 523 of the bearings 522 of the first stopper member 52 contact the rear part link pin 55 moved to the rear position, and accordingly, the first stopper member 52 is locked to the position of protrusion in the product housing path 43 and holds the next product G2 as the product G1. Then, when the cam protrusion 7151 returns to the position in the standby state through rotation of the output gear 715, the contact of the carrier switch 716 is pressed by the pressing piece and the carrier switch 716 is turned on. Accordingly, drive of the motor 711 is stopped, and the state returns to the vending standby state.

Since the elongate holes 516, 516 of the bearing members 501 and 502 attached to the right and left sidewalls 512 and 513 of the mechanism unit holder 51 for guiding movement of the rear part link pin 55 in the front-and-rear direction include, at a rear side part (part corresponding to the rear position of the rear part link pin 55 that slides in the front-and-rear direction) in the front-and-rear direction, the load reduction parts 5161 curved in the direction of separating from shaft insertion holes 5122a through which the rotation shaft 57 penetrates as illustrated in FIG. 24B, force for canceling locking of the first stopper member 52 at the protrusion position by the rear part link pin 55 can be reduced. Specifically, while the rear part link pin 55 moved to the rear positions of the elongate holes 516 contacts the lock groove parts 523a of the odd-shaped holes 523 provided to the first stopper member 52 and the first stopper member 52 is locked at the position of protrusion in the product housing path 43, a product load at a contact point (effort point) between the holding portion 521 of the first stopper member 52 at the protrusion position and the product G1 is applied to a contact point (action point) of the rear part link pin 55 with the lock groove parts 523a of the odd-shaped holes 523 of the first stopper member 52 with, as a pivot, the rotation shaft 57 inserted into the support shaft holes 518. In this case, it is clear that the product load applied to the action point reduces as the position from the action point moves away from the effort point. In the present embodiment, since the load reduction parts 5161 curved in the direction of separating from the pivot of the rotation shaft 57 inserted into the support shaft holes 518 are provided at rear side parts of the elongate holes 516 to receive the rear part link pin 55 moved to the rear positions, the product load received by the action point is reduced. The reduction of the product load received by the action point means that removing force for locking of the first stopper member 52 protruding in the product housing path 43 can be reduced and downsizing of the motor 711 that drives the link member 541 can be achieved.

The wires of the motor 711, the carrier switch 716, and the sold-out detection switches 91 of the product discharge device 5 are collected and connected with the coupler (not illustrated), and the coupler is firmly fixed to the coupler attachment hole 121 provided at the suspending part 120 of the rear side shelf member 10R described above. The coupler being firmly fixed to the coupler attachment hole 121 provided at the suspending part 120 of the rear side shelf member 10R is connected and cut off by a coupler (not illustrated) connected with wires routed on the back surface side of the front side shelf member 10F. FIGS. 34 to 38 illustrate the cover member 95 and the wire pullout member 96 disposed on the back surface side of the front side shelf member 10F to protect the wires routed on the back surface side of the front side shelf member 10F and pull the wires out of the rack side plate 41.

Figure 34:
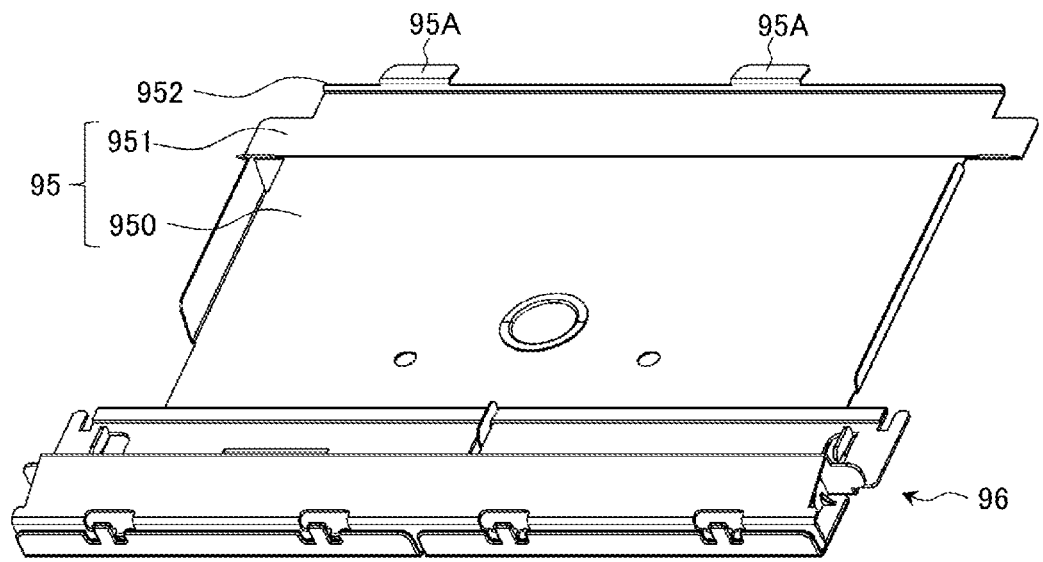
FIG. 34 is a perspective view illustrating a cover member and a wire pullout member in a coupled state.
Figure 35:
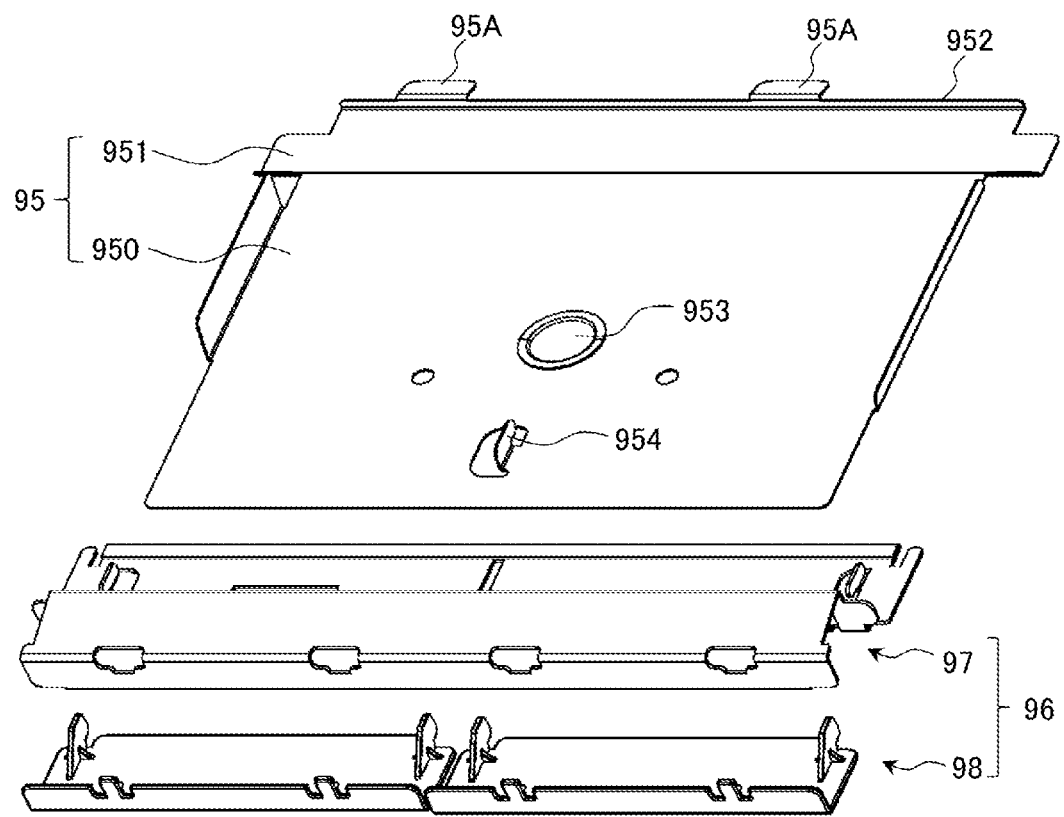
FIG. 35 is a perspective view illustrating the cover member and the wire pullout member in a coupling canceled state.
Figure 36:
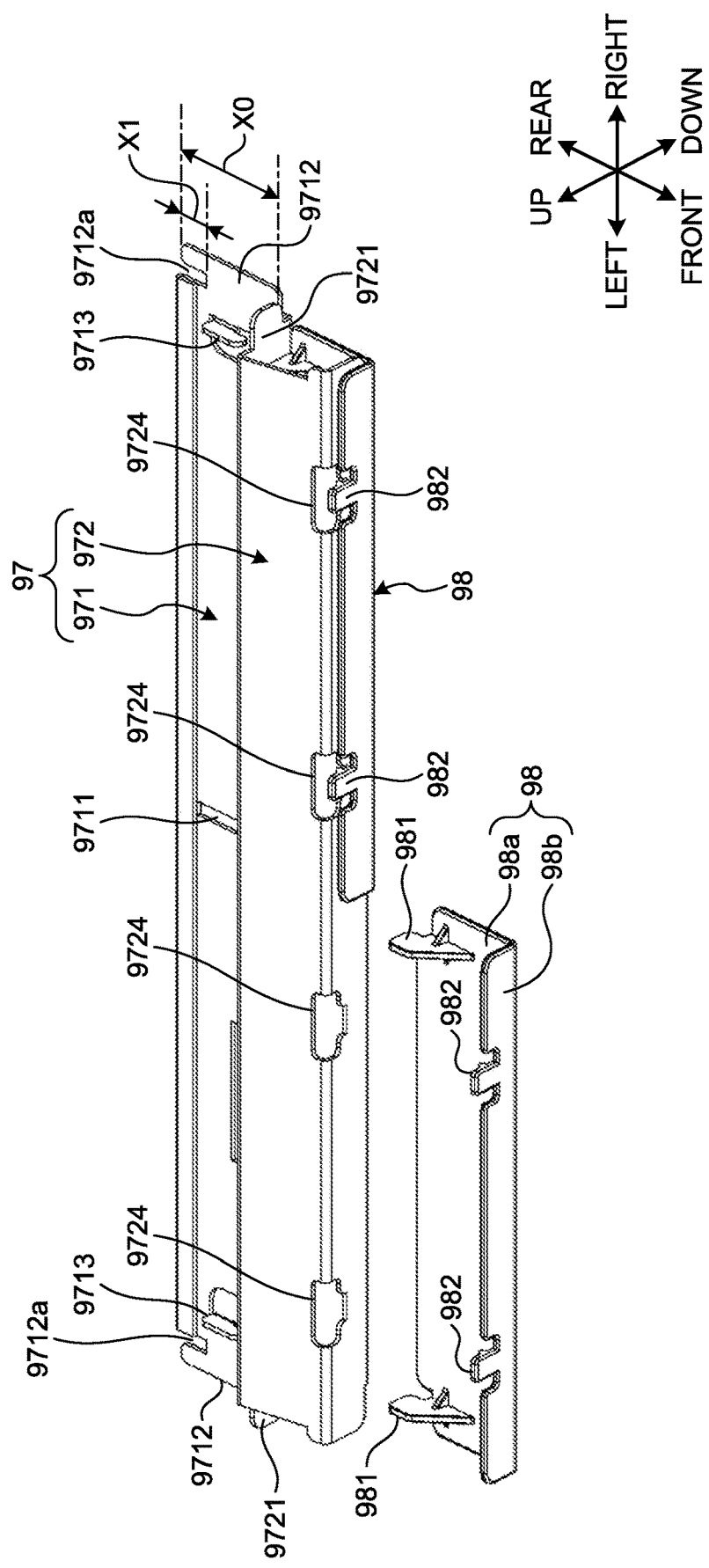
FIG. 36 is a partially exploded perspective view of the wire pullout member when viewed from above.
Figure 37:
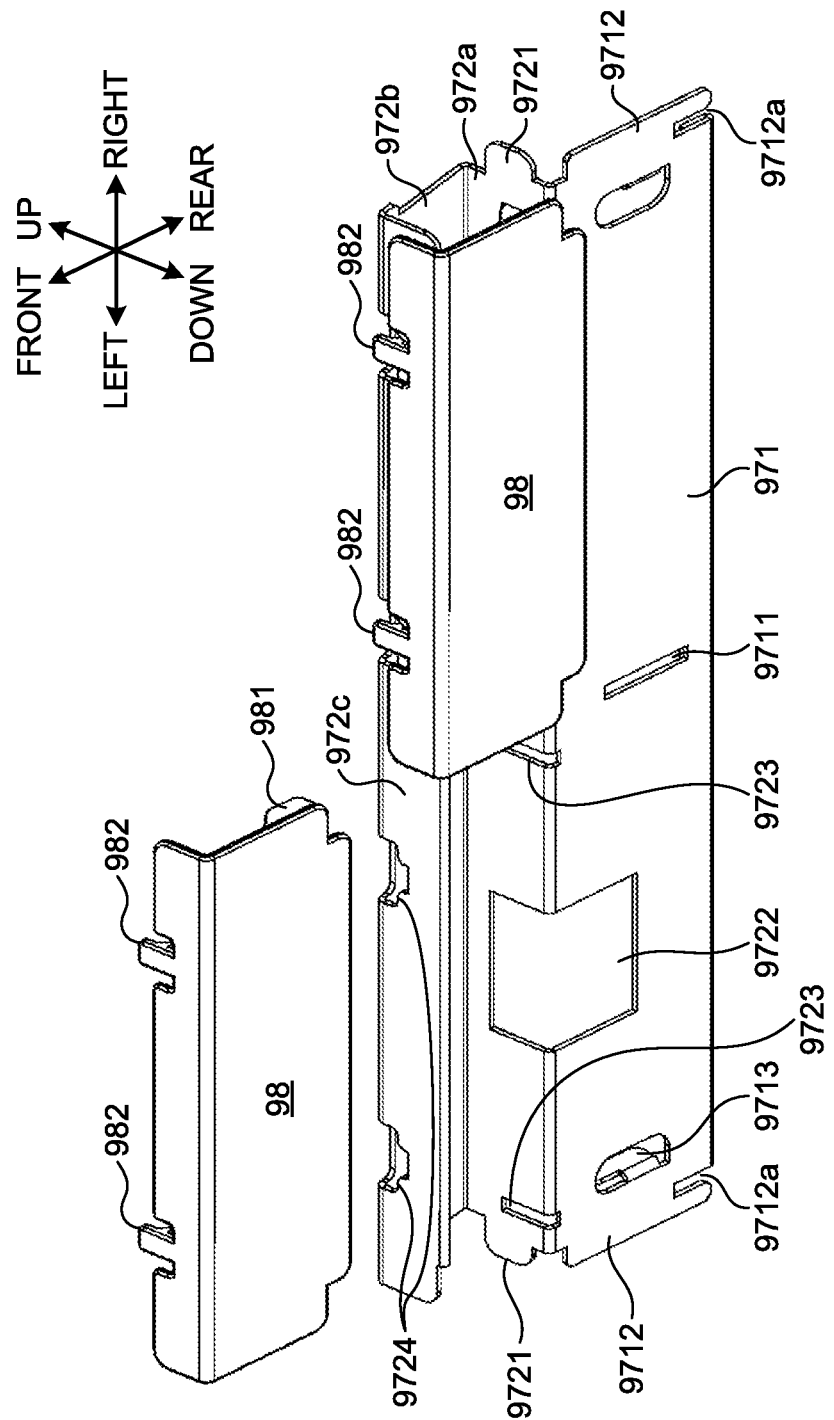
FIG. 37 is a partially exploded perspective view of the wire pullout member in FIG. 36 when viewed from the back surface.
Figure 38:
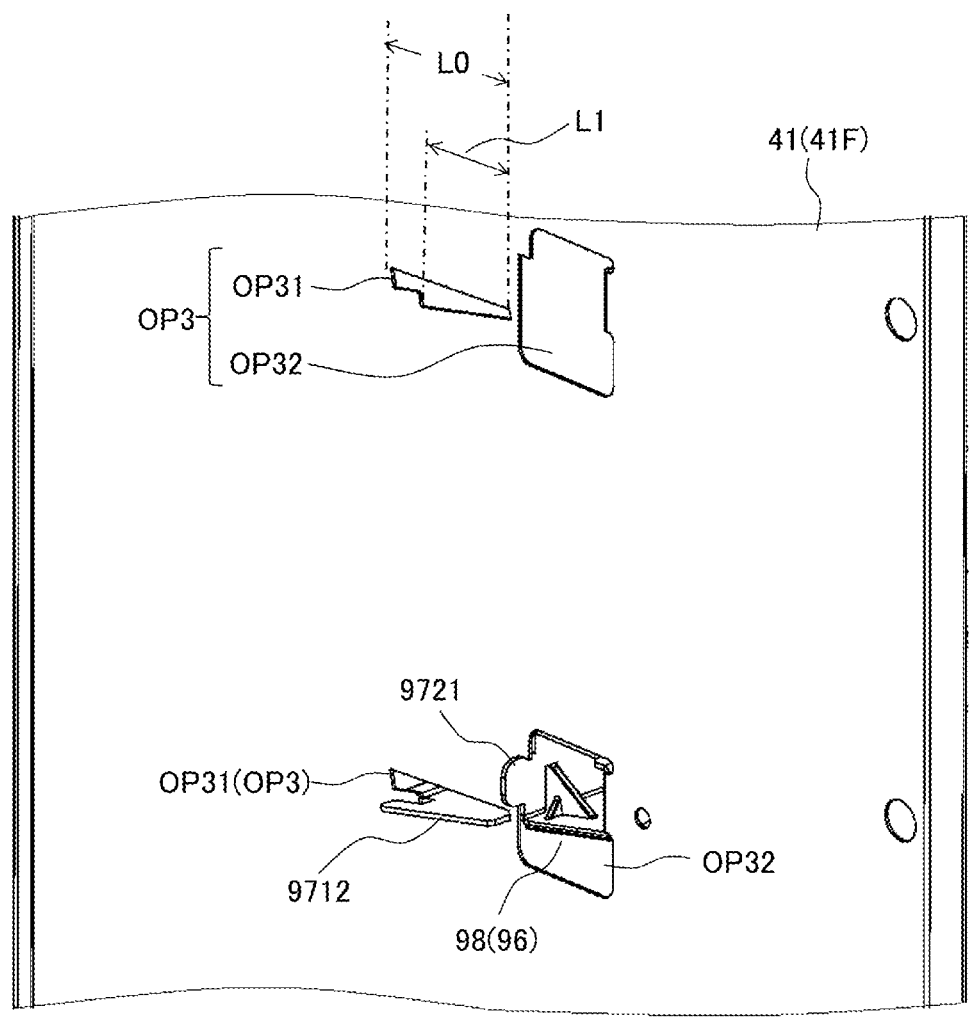
FIG. 38 is a main-part perspective view illustrating a state in which the wire pullout member is installed on a rack side surface.

FIG. 34 is a perspective view illustrating an assembled state of the cover member 95 and the wire pullout member 96, FIG. 35 is an exploded diagram of the cover member 95 and the wire pullout member 96, FIG. 36 is a perspective view of the wire pullout member 96 when viewed from above, FIG. 37 is a perspective view of the wire pullout member 96 when viewed from below, and FIG. 38 is an explanatory diagram of attachment of the wire pullout member 96 to the rack side plate 41.

The cover member 95 is made of a plate and includes a rectangular flat plate body 950 as illustrated in FIGS. 34 and 35. The body 950 includes an engagement part 951 bent to be lower on a rear end side. The two right and left engagement pieces 95A, 95A are provided at a rear flange 952 standing at a rear edge of the engagement part 951. The engagement pieces 95A, 95A are inserted into the two engagement holes 122, 122 provided at the suspending part 120 at the front end of the rear side shelf member 10R. The width (dimension) of the body 950 in the right-left direction is determined to be smaller than the interval between the lock piece parts 10F14, 10F14 (refer to FIGS. 9A and 9B) of the right and left flanges 10F1, 10F1 of the front side shelf member 10F, and the width (dimension) of the engagement part 951 in the right-left direction is determined to be the dimension across the contact pieces 10F13, 10F13 of the right and left flanges 10F1, 10F1 of the front side shelf member 10F. In addition, a finger hook hole 953 is formed at a substantially center of the body 950, and a hook piece 954 formed upward by cutting and erecting is provided on the front side of the finger hook hole 953. A hook leading end of the hook piece 954 faces the rear side.

The wire pullout member 96 includes a wiring pullout clasp 97 made of a plate, and a blockage member 98 made of synthesis resin and integrally assembled with the wiring pullout clasp 97. The wiring pullout clasp 97 includes a base part 971 placed on the body 950 of the cover member 95, and a routing part 972 formed continuously with the base part 971 as illustrated in FIG. 36. A slit lock hole 9711 extending in the front-and-rear direction is formed at a substantially center of the base part 971 in the right-left direction. The lock hole 9711 is formed to have a width and a length that allow insertion of the hook piece 954 provided to the body 950 of the cover member 95. In addition, engagement piece parts 9712, 9712 are formed through cutouts 9712a, 9712a on the rear side of right and left ends of the base part 971, and the hook pieces 9713, 9713 formed upward by cutting and erecting are provided at positions inside the engagement piece parts 9712, 9712 of the base part 971. The interval between the right and left cutouts 9712a, 9712a matches the interval between the right and left rack side plates 41, 41 (the front side rack member 41F) and is larger than the plate thickness of the front side rack member 41F. The engagement piece parts 9712, 9712 are inserted into the ten wiring insertion holes OP3 (refer to FIGS. 6A, 6B, 6C and 6D) formed in the up-down direction at the plate surface of the front side rack member 41F, and protrude outside the right and left rack side plates 41, 41. As illustrated in FIG. 38, the wiring insertion holes OP3 include a stepped hole OP31 extending in the front-and-rear direction and including a long side part on the upper side and a short side part on the lower side, and a relatively large wiring pullout window OP32, and the short side part of the wiring insertion hole OP3 is tilted at a tilt angle equal to the tilt angle of the product housing shelf 10. The engagement piece parts 9712, 9712 are inserted into the stepped holes OP31. In this case, a length X0 (refer to FIG. 36) of each of the engagement piece parts 9712, 9712 in the front-and-rear direction is longer than a length L1 (refer to FIG. 38) of the short side part of each stepped hole OP31 and shorter than a length L0 of the long side part, and the engagement piece part 9712 is formed in a size that allows insertion into the long side part of the stepped hole OP31. A depth X1 (length in the front-and-rear direction) of each of the cutouts 9712a, 9712a is larger than a value obtained by subtracting the length L1 of the short side part of the stepped hole OP31 from the length L0 of the long side part, in other words, "X1>L0−L1" holds. In addition, each of the hook pieces 9713, 9713 is formed in a size that allows insertion into the slit lock grooves 10F141, 10F141 provided at the lock piece parts 10F14, 10F14 of the right and left flanges 10F1, 10F1 of the front side shelf member 10F illustrated in FIGS. 9A and 9B.

The routing part 972 includes a rear wall 972a, a ceiling wall 972b, and a front wall 972c and has a box shape having an opened bottom surface and opened right and left side surfaces. The width of the rear wall 972*a* is determined to be slightly smaller than the interval between the right and left rack side plates 41, 41. Stopper pieces 9721 protruding outward are provided at right and left ends of the rear wall 972*a*. Each stopper piece 9721 is inserted into the window OP32 described above and contacts a rear edge of the window OP32. In addition, the rear wall 972*a* is provided with an opening 9722 (refer to FIG. 37) across the base part 971. Wires from the product discharge device 5 routed through the cover member 95 pass through the opening 9722. In addition, right and left pairs of slits 9723, 9723 (refer to FIG. 37) provided across the base part 971 are formed at the rear wall 972*a*. In FIG. 37, the pair of slits 9723, 9723 on the right side (front-view left side) are illustrated, but the other pair of slits 9723, 9723 are hidden behind the blockage member 98. Hook pieces 981, 981 of the blockage member 98 are locked to the pairs of slits 9723, 9723. Engagement grooves 9724 are provided across the ceiling wall 972*b* and the front wall 972*c* of the routing part 972. The engagement grooves 9724 are formed in right and left pairs. Lock clicks 982, 982 of the blockage member 98 are locked to the pairs of engagement grooves 9724, 9724.

The blockage member 98 has a longitudinal section in an inverted L shape and includes a bottom wall 98*a* corresponding to a leg piece on the long side of the L shape, and a front surface wall 98*b* corresponding to a leg piece on the short side. Two blockage members 98 are provided in the present embodiment, and FIGS. 36 and 37 illustrate a state in which one (front-view right side) of the blockage members 98 is assembled to the wiring pullout clasp 97 and the other (front-view left side) of the blockage members 98 is removed from the wiring pullout clasp 97.

The bottom wall 98*a* of each blockage member 98 has a size sufficient to cover the opened bottom surface of the routing part 972 of the wiring pullout clasp 97. The pair of hook pieces 981, 981 are provided on right and left sides of the bottom wall 98*a* on the rear side. The hook pieces 981, 981 correspond to the pair of slits 9723, 9723 of the routing part 972, have hook leading ends facing the rear side, and are locked to the slits 9723, 9723 while the bottom wall 98*a* covers the opened bottom surface of the routing part 972. In addition, the pairs of lock clicks 982, 982 are provided at right and left positions at an upper edge of the front surface wall 98*b*. The lock clicks 982, 982 correspond to the pair of engagement grooves 9724, 9724 of the routing part 972 of the wiring pullout clasp 97, have engagement clicks facing the rear side, and are engaged with the engagement grooves 9724, 9724 while the bottom wall 98*a* of the blockage member 98 contacts a lower edge of the front wall 972*c* of the routing part 972.

While the blockage member 98 having such a configuration is positioned below the wiring pullout clasp 97, the pair of hook pieces 981, 981 of the bottom wall 98*a* are placed below the opened bottom surface of the routing part 972 of the wiring pullout clasp 97, and then, the bottom wall 98*a* is made to contact with the lower edge of the front wall 972*c* of the routing part 972 of the wiring pullout clasp 97 and a lower surface of the base part 971 of the wiring pullout clasp 97, and subsequently, the blockage member 98 is slid toward the rear side to insert the hook pieces 981, 981 into the pair of slits 9723, 9723 of the routing part 972. Simultaneously with the insertion of the hook pieces 981, 981 into the pair of slits 9723, 9723 of the routing part 972, the lock clicks 982, 982 formed at the front surface wall 98*b* of the blockage member 98 are deformed beyond walls of the pair of engagement grooves 9724, 9724 of the routing part 972 of the wiring pullout clasp 97 and then restored to the original state to be engaged with the engagement grooves 9724, 9724, and the blockage member 98 is integrally assembled with the wiring pullout clasp 97, whereby the wire pullout member 96 is completed. The wire pullout member 96 completed in this manner has an internal space in a tunnel shape. The blockage member 98 can be removed in a procedure opposite to the assembly procedure after the hook pieces 981, 981 engaged with the engagement grooves 9724, 9724 are removed.

The wire pullout member 96 is locked and fixed to the rack side plates 41, 41 when the engagement piece parts 9712, 9712 formed at right and left ends of the base part 971 of the wiring pullout clasp 97 are inserted into the wiring insertion holes OP3 (refer to FIG. 38) formed at the right and left rack side plates 41, 41 (the front side rack member 41F). Specifically, the engagement piece parts 9712 are placed opposite to the long side parts of the stepped holes OP31 on the upper side, and the stopper pieces 9721 protruding outward from right and left ends of the rear wall 972*a* of the routing part 972 are placed opposite to the windows OP32, and then the engagement piece parts 9712 and the stopper pieces 9721 are inserted into the long side parts of the stepped holes OP31 and the windows OP32 and protruded outside the rack side plates 41. In this state, the cutouts 9712*a* formed at right and left sides of the base part 971 of the wiring pullout clasp 97 are positioned above stepped parts of the stepped holes OP31, and since the cutouts 9712*a* have sizes sufficient to receive the stepped parts of the stepped holes OP31, the wire pullout member 96 is moved down to fit the cutouts 9712*a* into the stepped parts of the stepped holes OP31. Accordingly, the wire pullout member 96 is installed across the right and left rack side plates 41, 41 so that extended line parts of the cutouts 9712*a* at the base part 971 of the wiring pullout clasp 97 are placed on the short side parts of the stepped holes OP31. The wire pullout member 96 is locked and fixed to the right and left rack side plates 41, 41 by bending, along the rack side plates 41, the engagement piece parts 9712 protruding outside the rack side plates 41. While the wire pullout member 96 is locked and fixed to the right and left rack side plates 41, 41 in this manner, the tunnel space (space surrounded by the routing part 972 of the wiring pullout clasp 97 and the blockage member 98) of the wire pullout member 96 faces the windows OP32 (wiring insertion port OP3) formed at the rack side plates 41. Thus, wires of the product discharge device 5 can be pulled out of (or into) the rack side plates 41 through the windows OP32.

While the product housing shelf 10 assembled so that the product discharge device 5 is directly mounted on the rear side shelf member 10R included in the product housing shelf 10 is installed across the right and left rack side plates 41, 41, the cover member 95 is assembled as follows. Specifically, the cover member 95 is held with an index finger (or a middle finger) being hooked into the finger hook hole 953 provided at the body 950 of the cover member 95 and the thumb being placed on a front edge of the body 950, and then the hook piece 954 formed upward at the body 950 by cutting and erecting is inserted into the slit lock hole 9711 provided at the base part 971 of the wiring pullout clasp 97 of the wire pullout member 96 installed across the right and left rack side plates 41, 41, and subsequently, an upper surface of the body 950 is made to contact the lower surface of the base part 971 of the wiring pullout clasp 97 in a planar manner. In this state, the two right and left engagement pieces 95A, 95A provided at a rear end of the cover member 95 face the two engagement holes 122, 122 provided at the suspending part 120 at the front end of the rear side shelf member 10R. Then, the cover member 95 is slid toward the rear side to insert the two engagement pieces 95A, 95A into the engagement holes 122, 122 of the rear side shelf member 10R. When slid toward the rear side in this manner, the cover member 95 is straightly guided without tilt to the right and left sides by the lock hole 9711 since the lock hole 9711 provided at the base part 971 of the wiring pullout clasp 97 of the wire pullout member 96, into which the hook piece 954 is inserted, has a slit shape.

Simultaneously with the start of insertion of the two right and left engagement pieces 95A, 95A provided at the rear end of the cover member 95 into the engagement holes 122, 122 of the rear side shelf member 10R, a hook part of the hook piece 954 inserted into the lock hole 9711 provided at the base part 971 of the wiring pullout clasp 97 of the wire pullout member 96 passes by a rear edge of the lock hole 9711 and faces an upper surface side of the base part 971. The length of the hook part of the hook piece 954 is substantially equal to the length of each engagement piece 95A provided at the rear end of the cover member 95, which allows insertion of the entire engagement pieces 95A, 95A into the engagement holes 122, 122 of the rear side shelf member 10R. When the engagement pieces 95A, 95A provided at the rear end of the cover member 95 are inserted into the engagement holes 122, 122 of the rear side shelf member 10R in this manner, the rear end of the cover member 95 is locked to the rear side shelf member 10R through the entire engagement pieces 95A, 95A, and the front side of the cover member 95 is locked to the base part 971 of the wiring pullout clasp 97 of the wire pullout member 96 through the hook piece 954, and accordingly, the cover member 95 is assembled to the product housing rack 4. The cover member 95 can be removed in a procedure opposite to the above-described assembly procedure.

The following describes routing of the wires of the coupler (not illustrated) that is connected with and cut off from the coupler firmly fixed to the coupler attachment hole 121 provided at the suspending part 120 of the rear side shelf member 10R, the wires being routed on the back surface side of the front side shelf member 10F (hereinafter, the wires are also referred to as control side wires), and the control side wires are pulled into the tunnel space of the wire pullout member 96 from outside the rack side plate 41 (for example, the rack side plate on the left side) through the wiring insertion hole OP3 (window OP32) formed at the rack side plate 41. In this case, one (for example, the blockage member 98 on the left side as illustrated in FIG. 36) of the two blockage members 98, 98 assembled to the wire pullout member 96 and the cover member 95 are removed. Since the blockage member 98 on the left side is removed, the opening 9722 provided at the routing part 972 of the wire pullout member 96 can be visually recognized from the front surface side, the control side wires pulled in through the wiring insertion holes OP3 (the window OP32) of the rack side plate 41 can be easily routed to the rear side through the opening 9722. The coupler (not illustrated) of the control side wires routed to the rear side through the opening 9722 is connected with the coupler firmly fixed to the coupler attachment hole 121 provided at the suspending part 120 of the rear side shelf member 10R. Thereafter, the cover member 95 and the blockage member 98 on the left side being removed are assembled through the above-described procedure. Accordingly, the control side wires are not exposed in the product housing path 43 but routed while being covered and protected by the cover member 95 and the wire pullout member 96.

In the product housing rack (slant rack) 4 of this kind, at product loading (automatic vending machine installation or product replacement), product clogging potentially occurs that, while a product rolls or slides in the product housing path 43, the axis line of the product tilts from a direction orthogonal to the traveling direction (the front-and-rear direction) of the product in posture change and the product stops halfway in the product housing path 43. In addition, a product first loaded (automatic vending machine installation or product replacement) in the product housing path 43 is held by the first stopper member 52 of the product discharge device 5 disposed at the product discharge port 45 of the product housing path 43, but product clogging potentially occurs that, when a product G (product G1) first loaded is subjected to posture change and held by the first stopper member 52 while being tilted, protrusion of the second stopper member 53 holding the next product G2 into the product housing path 43 is interfered and locked by the product G1. When product clogging has occurred in this manner, the product clogging can be solved as follows while the product housing rack 4 is mounted inside since, in the present embodiment, the product housing shelf 10 is made of the front side shelf member 10F and the rear side shelf member 10R divided from each other in the front-and-rear direction, the rear side shelf member 10R is installed across the pair of right and left rack side plates 41, 41, and the front side shelf member 10F is detachably disposed on the pair of right and left rack side plates 41, 41.

Specifically, when products G are placed on the front side shelf member 10F, a hand is put into the product housing path 43 to take out the products G one by one while visually recognizing the products G housed in the product housing path 43 from the front side of the product housing path 43. When the products G placed on the front side shelf member 10F are completely taken out but the product clogging is not solved (when the product clogging occurs in the region of the rear side shelf member 10R), the front side shelf member 10F is removed from the rack side plates 41, 41 through a procedure opposite to the above-described procedure of mounting the front side shelf member 10F on the rack side plates 41, 41. In this case, the engagement click 421b on the rear side among the pair of front and rear engagement clicks 421b, 421b provided to the partition member 42 is removed from the setting groove 112 drilled through the rear side shelf member 10R before the front side shelf member 10F is removed, and then the partition member 42 is removed from the product housing rack 4 together with the front side shelf member 10F. As described above, a hand can be put into the position of the rear side shelf member 10R when the front side shelf member 10F is removed. Thereafter, the product clogging is solved by taking out the products G placed on the rear side shelf member 10R. Since the product clogging can be solved by removing the front side shelf member 10F in this manner, it is possible to avoid cumbersome work of removing the product housing rack 4 housed and installed in the automatic vending machine and taking the product housing rack 4 out of the automatic vending machine to solve the product clogging.

Second Embodiment

Figure 39A:
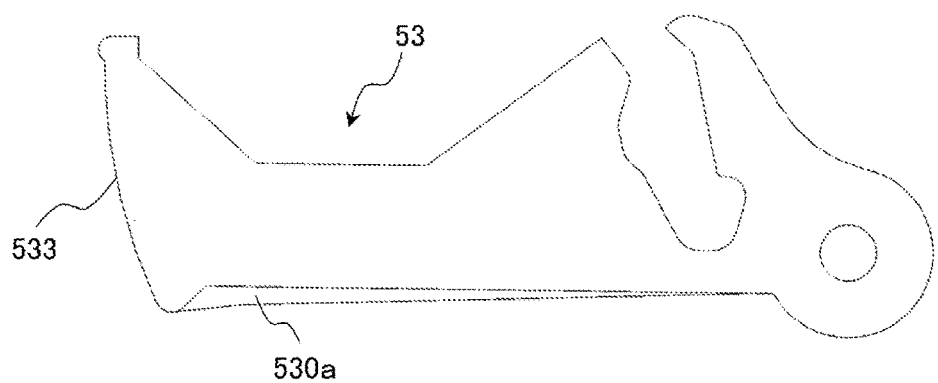
FIGS. 39A, 39B and 39C illustrate the second stopper member.
Figure 39B:
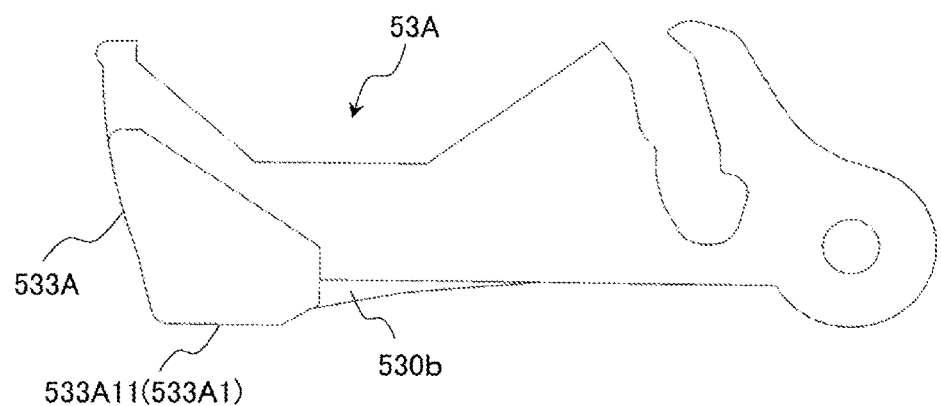
Figure 39C:
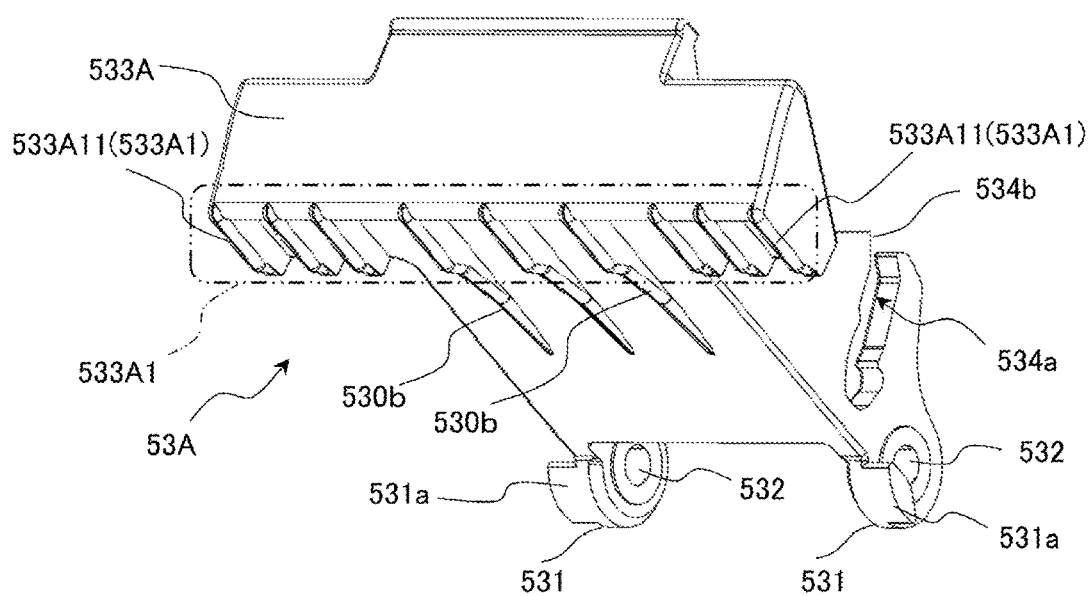
Figure 40:
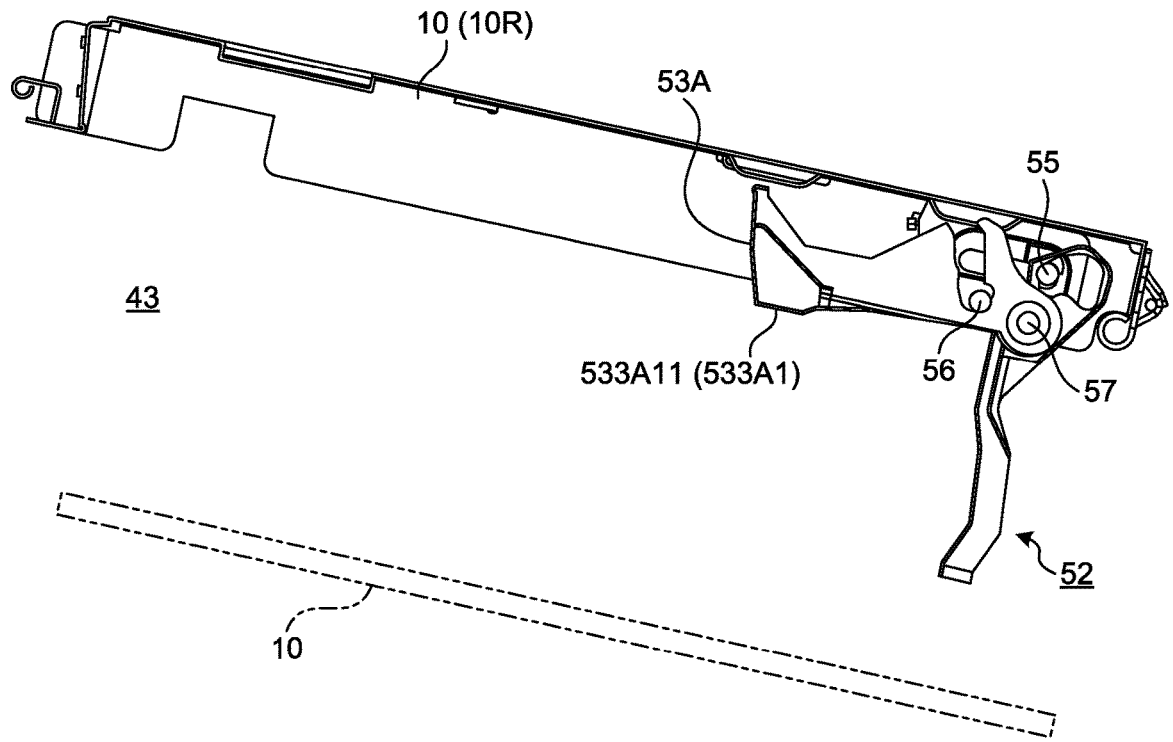
FIG. 40 is a main-part phase diagram of the delivery mechanism in the product discharge device in the second embodiment before product loading.
Figure 41:
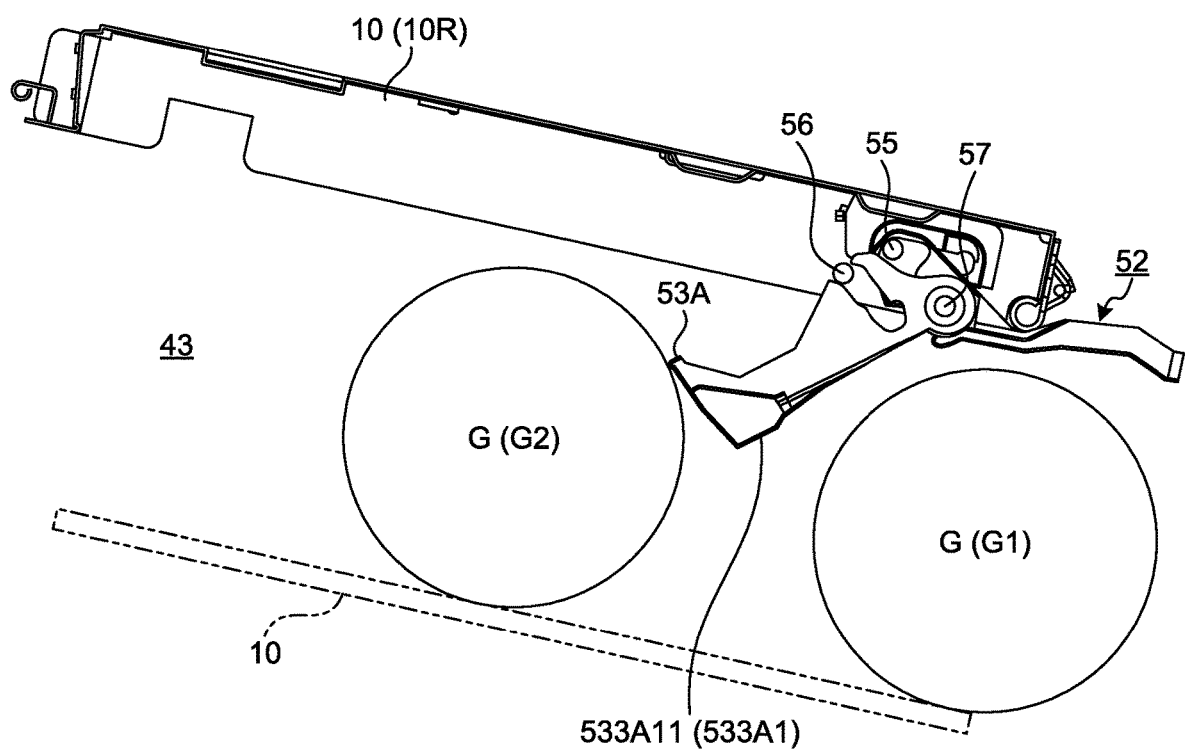
FIG. 41 is an operation state diagram of the delivery mechanism in the product discharge device in the second embodiment at product vending.

FIGS. 39 to 42 illustrate a second stopper member 53A according to a second embodiment. FIG. 39B is a cross-sectional view of the second stopper member 53A when viewed from a side surface, and FIG. 39C is a perspective view when viewed from a back surface. In addition, FIG. 39A illustrates a cross-sectional view of the second stopper member 53 according to the first embodiment when viewed from a side surface to clearly indicate shape difference between the second stopper member 53 according to the first embodiment and the second stopper member 53A. FIG. 40 is a main-part phase diagram of the delivery mechanism 50 in the product discharge device 5 in the second embodiment before product loading, and FIG. 41 is an operation state diagram of the delivery mechanism 50 in the product discharge device 5 in the second embodiment at product discharge. FIGS. 42A and 42B illustrate an operation state diagram of the delivery mechanism 50 in the product discharge device 5 in the process of starting product discharge, FIG. 42A illustrates an operation state diagram in the process of starting product discharge in the first embodiment, and FIG. 42B illustrates an operation state diagram in the process of starting product discharge in the second embodiment, FIGS. 42A and 42B further include vector diagrams of delivery force on a vending product.

The second embodiment is different from the first embodiment only in the shape of the holding portion 533 (533A) of the second stopper member 53 (53A) as illustrated in FIGS. 39A and 39B, and any other common site is denoted by the same reference sign. In addition, configurations and components other than the second stopper member 53 (53A) are identical to those in the first embodiment, and thus detailed description thereof will be omitted below.

In the second stopper member 53A according to the second embodiment, unlike the product holding portion 533 (refer to FIG. 39A) formed on the leading end side of the second stopper member 53 according to the first embodiment, the product holding portion 533A formed on the leading end side of the second stopper member 53A includes a convex portion 533A1 having a substantially trapezoid shape and including a flat part 533A11 on a surface adjacent to the product housing path 43 as illustrated in FIGS. 39B and 39C. In addition, as illustrated in FIG. 40, the flat part 533A11 of the convex portion 533A1 faces, in a substantially parallel manner, the product housing shelf 10 as a product placement surface of the product housing path 43 in the standby state before product loading. In addition, a plurality of ribs 530b extending from the base end side of the second stopper member 53A toward the holding portion 533A are formed continuously with the holding portion 533A.

Figure 42A:
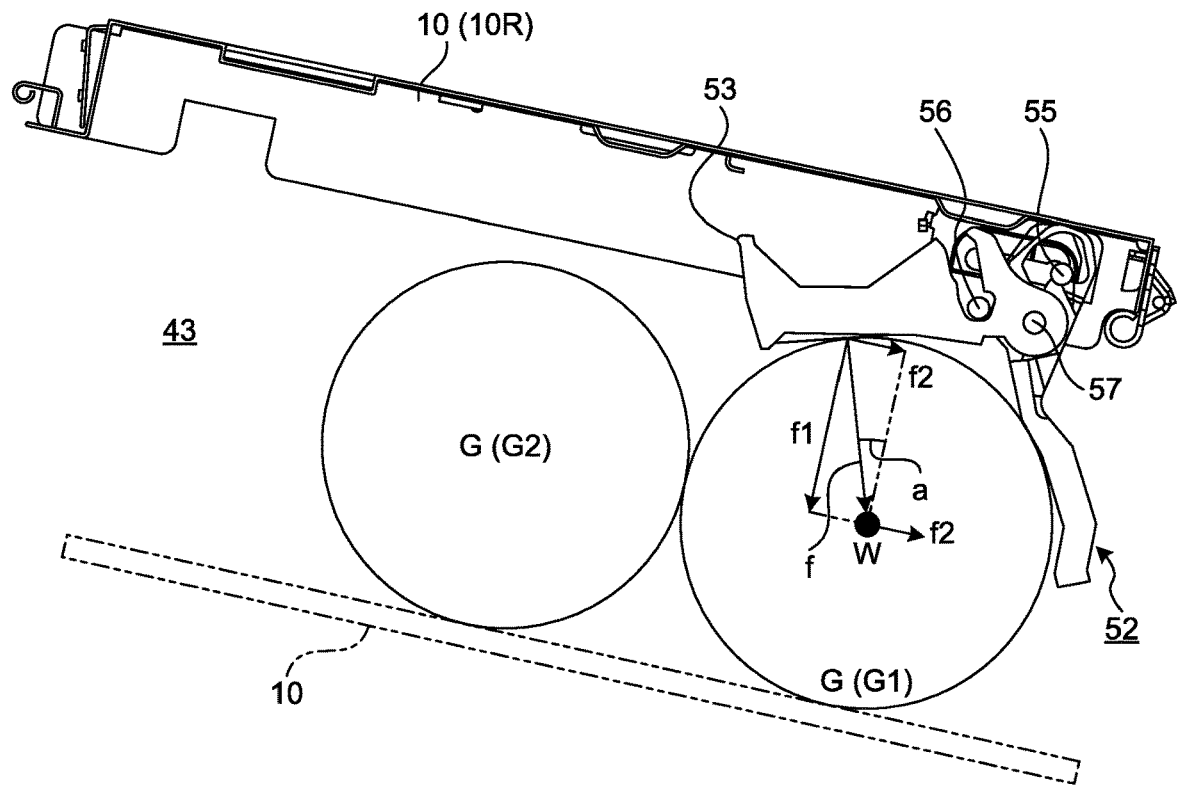
FIGS. 42A and 42B illustrate an operation state diagram of the delivery mechanism in the product discharge device in the process of starting product discharge.
Figure 42B:
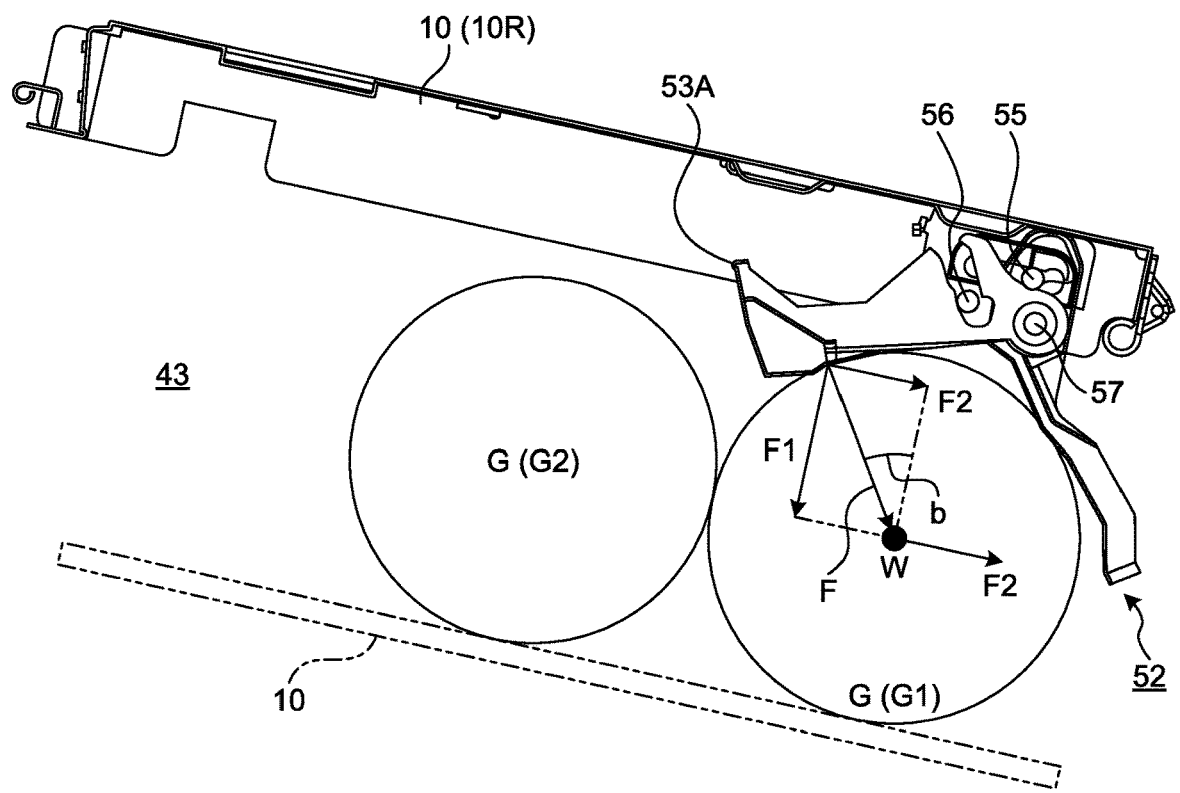

In this manner, since the convex portion 533A1 including the flat part 533A11 facing, in a substantially parallel manner, the product housing shelf 10 as the product placement surface of the product housing path 43 is provided, a component force (product pressing force) F2 (refer to FIG. 42B) of pressing force F with which the second stopper member 53A protruding in the product housing path 43 presses the vending product G1 in the product discharge direction, is larger than a component force (product pressing force) f2 (refer to FIG. 42A) of pressing force f with which the second stopper member 53 according to the first embodiment protruding in the product housing path 43 presses a vending product G1 in the product discharge direction as understood from operation state diagrams at vending start illustrated in FIGS. 42A and 42B.

Specifically, the second stopper member 53 (53A) has a function of protruding in the product housing path 43 to hold a product (next vending product G2) of the second vending order following a vending product G1 and rolling and discharging the vending product G1 toward the product discharge port 45 side while pressing the vending product G1, and a tilt angle a (b) of the pressing force f (F) applied to a barycenter W of the vending product G1 from a contact point at which the second stopper member 53 (53A) contacts the vending product G1 when protruding in the product housing path 43 relative to a perpendicular line of the product housing shelf 10 as the product placement surface of the product housing path 43 satisfies "a<b", and thus, in the pressing force f (F) generated when the second stopper member 53 (53A) contacts the vending product G1, a component force f1 (F1) in the perpendicular direction of the product housing shelf 10 as the product placement surface of the product housing path 43 satisfies "f1>F1", and the component force (product pressing force) f2 (F2) in a parallel direction of the product housing shelf 10 as the product placement surface of the product housing path 43 as the product discharge direction satisfies "f2<F2". Since the component forces in the product discharge direction satisfy "f2<F2", the product pressing force F2 of the second stopper member 53A is larger than the product pressing force f2 of the second stopper member 53, whereby the performance of product discharging toward the product discharge port 45 side improves.

In addition, since the ribs 530b (refer to FIG. 39C) extending from the pivotally support parts 531 of the second stopper member 53A toward the holding portion 533A are formed continuously with the holding portion 533A on the surface of the second stopper member 53A according to the second embodiment adjacent to the product housing shelf 10 as the product placement surface of the product housing path 43, the area of contact between the second stopper member 53A and the vending product G1 decreases and the friction resistance reduces as the second stopper member 53A contacts the vending product G1 and discharges the vending product G1, and thus the performance of product discharging toward the product discharge port 45 side improves.

As described above, since the automatic vending machine according to the first embodiment is an automatic vending machine including a product housing rack 4 including: product housing shelves 10 tilted so that a product discharge port 45 is lower than a product insertion port 44, the product housing shelves 10 being disposed at multiple rungs in an up-down direction and each including a product housing path 43 defined to house products arrayed in a sideways posture in line in a front-and-rear direction; and a product discharge device 5 disposed near the product discharge port 45 of each product housing shelf 10 and above the product housing path 43 and configured to separate and discharge each product housed in the product housing path 43, the automatic vending machine including: a first stopper member 52 capable of freely appearing in the product housing path 43 from above the product housing path 43 and provided to be movable between a protrusion position where the first stopper member 52 protrudes in the product housing path 43 to hold a product (vending product G1) of the first vending order and a retracted position where the first stopper member 52 is retracted from the product housing path 43 to release holding of the vending product G1, the first stopper member 52 tilting, when protruding in the product housing path 43, so that a free end side of a holding portion 521 configured to hold the product is positioned at the product discharge port 45 relative to rotational pivot side; a second stopper member 53 capable of freely appearing in the product housing path 43 from above the product housing path 43 and provided to be movable between a retracted position where the second stopper member 53 is retracted from the product housing path 43 and a protrusion position where the second stopper member 53 protrudes in the product housing path 43 to hold a product (next vending product G2) of the second vending order following the vending product, the second stopper member 53 being configured to press the vending product G1 when protruding in the product housing path 43; a link mechanism 54 configured to move each of the first stopper member 52 and the second stopper member 53 to the protrusion position and the retracted position; and a drive device (motor drive unit 70) configured to drive the link mechanism 54, and a plurality of ribs 530*a* extending from a base end part toward the holding portions 533 are formed on a surface of the second stopper member 53 adjacent to the product housing path 43, the ribs 530*a* contact the vending product G1 when the second stopper member 53 protrudes in the product housing path 43 and presses the vending product G1, and thus the area of contact with the vending product G1 decreases and the friction resistance reduces, and as a result, the second stopper member 53 promotes the rolling of the vending product G1 and the product G1 can be smoothly discharged.

In addition, since the automatic vending machine according to the first embodiment is an automatic vending machine including a product housing rack 4 including: product housing shelves 10 tilted so that a product discharge port 45 is lower than a product insertion port 44, the product housing shelves 10 being disposed at multiple rungs in an up-down direction and each including a product housing path 43 defined to house products arrayed in a sideways posture in line in a front-and-rear direction; and a product discharge device 5 disposed near the product discharge port 45 of each product housing shelf 10 and above the product housing path 43 and configured to separate and discharge each product housed in the product housing path 43, the automatic vending machine including: a first stopper member 52 capable of freely appearing in the product housing path 43 from above the product housing path 43 and provided to be movable between a protrusion position where the first stopper member 52 protrudes in the product housing path 43 to hold a product (vending product G1) of the first vending order and a retracted position where the first stopper member 52 is retracted from the product housing path 43 to release holding of the vending product G1, the first stopper member 52 tilting, when protruding in the product housing path 43, so that a free end side of a holding portion 521 configured to hold the product is positioned at the product discharge port 45 relative to rotational pivot side; a second stopper member 53 capable of freely appearing in the product housing path 43 from above the product housing path 43 and provided to be movable between a retracted position where the second stopper member 53 is retracted from the product housing path 43 and a protrusion position where the second stopper member 53 protrudes in the product housing path 43 to hold a product (next vending product G2) of the second vending order following the vending product, the second stopper member 53 being configured to press the vending product G1 when protruding in the product housing path 43; a link mechanism 54 configured to move each of the first stopper member 52 and the second stopper member 53 to the protrusion position and the retracted position; and a drive device (motor drive unit 70) configured to drive the link mechanism 54, and the first stopper member 52 includes a base end part into which the rotation shaft 57 as the rotational pivot is inserted, the holding portion 521 configured to hold the product, and a product receiving unit 521*a* formed to have a longitudinal section in a concave shape recessed on a rear side of a line connecting a base end part of the holding portion 521 and a leading end of the holding portion 521, a product (also referred to as a small-diameter product) having such a size that the product is separated from a base end side of the first stopper member 52 can be made to contact closer to a free end separated from a base end side of the holding portion 521 of the first stopper member 52 protruding in the product housing path 43, the product receiving unit 521*a* receives a product (large-diameter product) having such a size that the product is near the base end side of the holding portion 521 of the first stopper member 52 protruding in the product housing path 43 so that the large-diameter product can be positioned close to the product discharge port 45, and thus the total length of the product housing path 43 can be effectively used irrespective of the size of a vending product to increase the number of products housed in the product housing paths 43.

In addition, since the automatic vending machine according to second embodiment is an automatic vending machine including a product housing rack 4 including: product housing shelves 10 tilted so that a product discharge port 45 is lower than a product insertion port 44, the product housing shelves 10 being disposed at multiple rungs in an up-down direction and each including a product housing path 43 defined to house products arrayed in a sideways posture in line in a front-and-rear direction; and a product discharge device 5 disposed near the product discharge port 45 of each product housing shelf 10 and above the product housing path 43 and configured to separate and discharge each product housed in the product housing path 43, the automatic vending machine including: a first stopper member 52 capable of freely appearing in the product housing path 43 from above the product housing path 43 and provided to be movable between a protrusion position where the first stopper member 52 protrudes in the product housing path 43 to hold a product (vending product G1) of the first vending order and a retracted position where the first stopper member 52 is retracted from the product housing path 43 to release holding of the vending product G1, the first stopper member 52 tilting, when protruding in the product housing path 43, so that a free end side of a holding portion configured to hold the product is positioned at the product discharge port 45 relative to rotational pivot side; a second stopper member 53A capable of freely appearing in the product housing path 43 from above the product housing path 43 and provided to be movable between a retracted position where the second stopper member 53 is retracted from the product housing path 43 and a protrusion position where the second stopper member 53 protrudes in the product housing path 43 to hold a product (next vending product G2) of the second vending order following the vending product, the second stopper member 53 being configured to press the vending product G1 when protruding in the product housing path 43; a link mechanism 54 configured to move each of the first stopper member 52 and the second stopper member 53A to the protrusion position and the retracted position; and a drive device (motor drive unit 70) configured to drive the link mechanism 54, and the second stopper member 53A includes a holding portion 533A formed as a convex portion 533A1 in a substantially trapezoid shape including a flat part 533A11 on a surface adjacent to the product housing path 43, the convex portion 533A1 including the flat part 533A11 on the product housing path 43 side contacts the vending product G1 when the second stopper member 53A protrudes in the product housing path 43 and presses the vending product G1, and thus a component force (product pressing force) F2 of pressing force F with which the second stopper member 53A protruding in the product housing path 43 presses the vending product G1 in a product discharge direction can be increased, and accordingly, the performance of product discharging toward the product discharge port 45 side improves, and stable product discharge operation can be performed.

In addition, since a plurality of ribs extending from a base end part of the second stopper member 53A toward the holding portion are continuously formed on a surface of the second stopper member 53A adjacent to the product housing path 43, a component force (product pressing force) F2 of pressing force F with which the second stopper member 53A protrudes in the product housing path 43 and presses the vending product G1 in a product discharge direction can be increased, and the area of contact between the second stopper member 53A and the vending product G1 decreases and the friction resistance reduces in a discharge process in which the second stopper member 53A contacts the vending product G1 and then discharges the vending product G1, and accordingly, the performance of product discharging toward the product discharge port 45 side improves, and more stable product discharge operation can be performed.

In the above-described embodiments, the drive device configured to drive the link mechanism 54 is the motor drive unit 70, but a solenoid may be used in place of the motor drive unit 70, and thus the present disclosure is not limited to the configurations in the embodiments.

In some embodiments of the present disclosure, an automatic vending machine includes: a product housing rack including: product housing shelves tilted such that a product discharge port is lower than a product insertion port, the product housing shelves being disposed at multiple rungs in a vertical direction and each including a product housing path defined to house products arrayed in a sideways posture in line in a front-and-rear direction; and a product discharge device provided near the product discharge port of each product housing shelf and at an upper side of the product housing path, the product discharge device being configured to separate and discharge each product housed in the product housing path; a first stopper member that is able to appear in each product housing path from the upper side of the product housing path, the first stopper member being configured: to be movable between a protrusion position where the first stopper member protrudes in the product housing path to hold a product of the first vending order, that is a vending product, and a retract position where the first stopper member is retracted from the product housing path to release holding of the vending product; and to tilt such that a free end side of a holding portion of the first stopper member, the holding portion of the first stopper member being configured to hold the product, is positioned at the product discharge port relative to rotational pivot side when protruding in the product housing path; a second stopper member that is able to appear in each product housing path from the upper side of the product housing path, the second stopper member being configured: to be movable between a retract position where the second stopper member is retracted from the product housing path and a protrusion position where the second stopper member protrudes in the product housing path to hold a product of the second vending order, that is a next vending product, following the vending product; and to press the vending product when protruding in the product housing path; a link mechanism configured to move each of the first stopper member and the second stopper member to the protrusion position and the retract position; and a drive device configured to drive the link mechanism, wherein the second stopper member includes ribs formed on a surface facing the product housing path, the ribs being configured to extend from a base end part toward a holding portion of the second stopper member. Consequently, the ribs contacts the vending product when the second stopper member protrudes in the product housing path and presses the vending product, and thus the area of contact with the vending product decreases and the friction resistance reduces, and as a result, the second stopper member promotes the rolling of the vending product and the vending product can be smoothly discharged.

In some embodiments of the present disclosure, an automatic vending machine includes: a product housing rack including: product housing shelves tilted such that a product discharge port is lower than a product insertion port, the product housing shelves being disposed at multiple rungs in a vertical direction and each including a product housing path defined to house products arrayed in a sideways posture in line in a front-and-rear direction; and a product discharge device provided near the product discharge port of each product housing shelf and at an upper side of the product housing path, the product discharge device being configured to separate and discharge each product housed in the product housing path; a first stopper member that is able to appear in each product housing path from the upper side of the product housing path, the first stopper member being configured: to be movable between a protrusion position where the first stopper member protrudes in the product housing path to hold a product of the first vending order, that is a vending product, and a retract position where the first stopper member is retracted from the product housing path to release holding of the vending product; and to tilt such that a free end side of a holding portion of the first stopper member, the holding portion of the first stopper member being configured to hold the product, is positioned at the product discharge port relative to rotational pivot side when protruding in the product housing path; a second stopper member that is able to appear in each product housing path from the upper side of the product housing path, the second stopper member being configured: to be movable between a retract position where the second stopper member is retracted from the product housing path and a protrusion position where the second stopper member protrudes in the product housing path to hold a product of the second vending order, that is a next vending product, following the vending product; and to press the vending product when protruding in the product housing path; a link mechanism configured to move each of the first stopper member and the second stopper member to the protrusion position and the retract position; and a drive device configured to drive the link mechanism, wherein the first stopper member includes: a bearing into which a rotation shaft as the rotational pivot is inserted; the holding portion configured to hold the product; and a product receiving portion formed to have a longitudinal section in a concave shape that is recessed to a rear side of a line connecting a base end and a leading end of the holding portion. Consequently, a product (also referred to as a small-diameter product) having such a size that the product is separated from a base end side of the first stopper member can be made to contact closer to a free end separated from a base end side of the holding portion of the first stopper member protruding in the product housing path, the product receiving unit receives a product (large-diameter product) having such a size that the product is near the base end side of the holding portion of the first stopper member protruding in the product housing path so that the large-diameter product can be positioned close to the product discharge port, and thus the total length of the product housing path can be effectively used irrespective of the size of a vending product to increase the number of products housed in the product housing path.

In some embodiments of the present disclosure, an automatic vending machine includes: a product housing rack including: product housing shelves tilted such that a product discharge port is lower than a product insertion port, the product housing shelves being disposed at multiple rungs in a vertical direction and each including a product housing path defined to house products arrayed in a sideways posture in line in a front-and-rear direction; and a product discharge device provided near the product discharge port of each product housing shelf and at an upper side of the product housing path, the product discharge device being configured to separate and discharge each product housed in the product housing path; a first stopper member that is able to appear in each product housing path from the upper side of the product housing path, the first stopper member being configured: to be movable between a protrusion position where the first stopper member protrudes in the product housing path to hold a product of the first vending order, that is a vending product, and a retract position where the first stopper member is retracted from the product housing path to release holding of the vending product; and to tilt such that a free end side of a holding portion of the first stopper member, the holding portion of the first stopper member being configured to hold the product, is positioned at the product discharge port relative to rotational pivot side when protruding in the product housing path; a second stopper member that is able to appear in each product housing path from the upper side of the product housing path, the second stopper member being configured: to be movable between a retract position where the second stopper member is retracted from the product housing path and a protrusion position where the second stopper member protrudes in the product housing path to hold a product of the second vending order, that is a next vending product, following the vending product; and to press the vending product when protruding in the product housing path; a link mechanism configured to move each of the first stopper member and the second stopper member to the protrusion position and the retract position; and a drive device configured to drive the link mechanism, wherein a holding portion of the second stopper member is formed as a convex portion in a substantially trapezoid shape including a flat part facing the product housing path. Consequently, the convex portion including the flat part on the product housing path side contacts the vending product when the second stopper member protrudes in the product housing path and presses the vending product, and thus a component force (product pressing force) of force with which the second stopper member protruding in the product housing path presses the vending product in a product discharge direction can be increased, and accordingly, stable product discharge operation can be performed.

In some embodiments of the present disclosure, the second stopper member includes ribs continuously formed on a surface facing the product housing path, the ribs being configured to extend from a base end part toward a holding portion of the second stopper member. Consequently, the component force (product pressing force) of force with which the second stopper member protruding in the product housing path presses the vending product in the product discharge direction can be increased, and the area of contact between the second stopper member and the vending product decreases and friction resistance reduces in a discharge process in which the second stopper member contacts the vending product and then discharges the vending product, and thus more stable product discharge operation can be performed.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An automatic vending machine comprising:
a product housing rack including:
product housing shelves tilted such that a product discharge port is lower than a product insertion port, the product housing shelves being disposed at multiple rungs in a vertical direction and each including a product housing path defined to house products arrayed in a sideways posture in line in a front-and-rear direction; and
a product discharger provided near the product discharge port of each product housing shelf and at an upper side of the product housing path, the product discharger being configured to separate and discharge each product housed in the product housing path;
a first stopper that is able to appear in each product housing path from the upper side of the product housing path, the first stopper being configured:
to be movable between a protrusion position where the first stopper protrudes in the product housing path to hold a product of a first vending order, that is a vending product, and a retract position where the first stopper is retracted from the product housing path to release holding of the vending product; and
to tilt such that a free end side of a holding portion of the first stopper, the holding portion of the first stopper being configured to hold the product, is positioned at the product discharge port relative to a rotational pivot side when protruding in the product housing path;
a second stopper that is able to appear in each product housing path from the upper side of the product housing path, the second stopper being configured:
to be movable between a retract position where the second stopper is retracted from the product housing path and a protrusion position where the second stopper protrudes in the product housing path to hold a product of the second vending order, that is a next vending product, following the vending product; and
to press the vending product when protruding in the product housing path;
a link configured to move each of the first stopper and the second stopper to the protrusion position and the retract position; and
a driver configured to drive the link, wherein
the second stopper includes ribs formed on a surface facing the product housing path, the ribs being configured to extend from a base end part toward a holding portion of the second stopper.

2. An automatic vending machine comprising:
a product housing rack including:
product housing shelves tilted such that a product discharge port is lower than a product insertion port, the product housing shelves being disposed at multiple rungs in a vertical direction and each including a product housing path defined to house products arrayed in a sideways posture in line in a front-and-rear direction; and
a product discharger provided near the product discharge port of each product housing shelf and at an upper side of the product housing path, the product discharger being configured to separate and discharge each product housed in the product housing path;

a first stopper that is able to appear in each product housing path from the upper side of the product housing path, the first stopper being configured:
- to be movable between a protrusion position where the first stopper protrudes in the product housing path to hold a product of a first vending order, that is a vending product, and a retract position where the first stopper is retracted from the product housing path to release holding of the vending product; and
- to tilt such that a free end side of a holding portion of the first stopper, the holding portion of the first stopper being configured to hold the product, is positioned at the product discharge port relative to a rotational pivot side when protruding in the product housing path;

a second stopper that is able to appear in each product housing path from the upper side of the product housing path, the second stopper being configured:
- to be movable between a retract position where the second stopper is retracted from the product housing path and a protrusion position where the second stopper protrudes in the product housing path to hold a product of the second vending order, that is a next vending product, following the vending product; and
- to press the vending product when protruding in the product housing path;

a link configured to move each of the first stopper and the second stopper to the protrusion position and the retract position; and a driver configured to drive the link, wherein the first stopper includes:
- a bearing into which a rotation shaft as a rotational pivot is inserted;
- the holding portion configured to hold the product; and
- a product receiving portion formed to have a longitudinal section in a concave shape that is recessed to a rear side of a line connecting a base end and a leading end of the holding portion.

3. An automatic vending machine comprising:

a product housing rack including:
- product housing shelves tilted such that a product discharge port is lower than a product insertion port, the product housing shelves being disposed at multiple rungs in a vertical direction and each including a product housing path defined to house products arrayed in a sideways posture in line in a front-and-rear direction; and
- a product discharger provided near the product discharge port of each product housing shelf and at an upper side of the product housing path, the product discharger being configured to separate and discharge each product housed in the product housing path;

a first stopper that is able to appear in each product housing path from the upper side of the product housing path, the first stopper being configured:
- to be movable between a protrusion position where the first stopper protrudes in the product housing path to hold a product of a first vending order, that is a vending product, and a retract position where the first stopper is retracted from the product housing path to release holding of the vending product; and
- to tilt such that a free end side of a holding portion of the first stopper, the holding portion of the first stopper being configured to hold the product, is positioned at the product discharge port relative to rotational pivot side when protruding in the product housing path;

a second stopper that is able to appear in each product housing path from the upper side of the product housing path, the second stopper being configured:
- to be movable between a retract position where the second stopper is retracted from the product housing path and a protrusion position where the second stopper protrudes in the product housing path to hold a product of the second vending order, that is a next vending product, following the vending product; and
- to press the vending product when protruding in the product housing path;

a link configured to move each of the first stopper and the second stopper to the protrusion position and the retract position; and a driver configured to drive the link, wherein a holding portion of the second stopper is formed as a convex portion in a substantially trapezoid shape including a flat part facing the product housing path.

4. The automatic vending machine according to claim 3, wherein the second stopper includes ribs continuously formed on a surface facing the product housing path, the ribs being configured to extend from a base end part toward a holding portion of the second stopper.

\* \* \* \* \*